US008953026B2

(12) United States Patent
Takahashi et al.

(10) Patent No.: US 8,953,026 B2
(45) Date of Patent: Feb. 10, 2015

(54) STEREOSCOPIC IMAGE DISPLAY DEVICE

(75) Inventors: Shuichi Takahashi, Kanagawa (JP);
Takuya Ooi, Tokyo (JP)

(73) Assignee: Sony Corporation, Tokyo (JP)

( * ) Notice: Subject to any disclaimer, the term of this patent is extended or adjusted under 35 U.S.C. 154(b) by 334 days.

(21) Appl. No.: 13/335,526

(22) Filed: Dec. 22, 2011

(65) Prior Publication Data
US 2012/0182290 A1     Jul. 19, 2012

(30) Foreign Application Priority Data

Jan. 14, 2011 (JP) ................................ 2011-005853

(51) Int. Cl.
*H04N 13/04* (2006.01)
*G02B 27/22* (2006.01)

(52) U.S. Cl.
CPC ....... *H04N 13/0447* (2013.01); *H04N 13/0404* (2013.01); *H04N 13/0409* (2013.01); *H04N 13/0415* (2013.01); *H04N 13/0422* (2013.01); *G02B 27/2214* (2013.01); *H04N 13/0468* (2013.01)
USPC ......................................................... 348/51

(58) Field of Classification Search
CPC .......... H04N 13/0011; H04N 13/0445; H04N 13/0404; H04N 13/0409; H04N 13/0456; H04N 13/0497; H04N 13/0434; H04N 13/0055; H04N 13/026; H04N 13/0022
USPC ......................................... 348/40, 42, 46, 51
See application file for complete search history.

(56) References Cited

U.S. PATENT DOCUMENTS

| 5,315,377 | A | 5/1994 | Isono et al. |
| 5,986,804 | A | 11/1999 | Mashitani et al. |
| 5,991,073 | A | 11/1999 | Woodgate et al. |
| 2002/0054430 | A1 | 5/2002 | Takikawa et al. |
| 2002/0118452 | A1* | 8/2002 | Taniguchi et al. ............. 359/463 |
| 2007/0052729 | A1* | 3/2007 | Fukushima et al. .......... 345/629 |
| 2010/0189413 | A1 | 7/2010 | Yoshino |
| 2012/0019635 | A1* | 1/2012 | Jian ................................ 348/54 |

FOREIGN PATENT DOCUMENTS

| EP | 0354851 | A2 | 2/1990 |
| EP | 0540137 | A1 | 5/1993 |
| EP | 0786912 | A2 | 7/1997 |
| JP | 05-122733 | | 5/1993 |
| JP | 2000047139 | | 2/2000 |

(Continued)

OTHER PUBLICATIONS

Domonkos et al., "Multi-view Isosurface Ray-casting", XP-002695972, 2007, retrieved from the Internet http://sirkan.iit.bme.hu/-szirmay/103.

(Continued)

*Primary Examiner* — Tat Chio
(74) *Attorney, Agent, or Firm* — K&L Gates LLP

(57) ABSTRACT

An autostereoscopic image display device in which an image of each viewpoint can be observed in each one of a plurality of observation areas, wherein one or both of a pair of images having relationship of a reverse view near an end portion of the observation area are displayed by using first image data and added image data acquired by weighting values of the first image data and second image data based on relationship of parallax between the second image data different from the first image data and the first image data and adding the weighted values.

8 Claims, 49 Drawing Sheets

(56) References Cited

FOREIGN PATENT DOCUMENTS

| | | |
|---|---|---|
| JP | 3565391 | 9/2004 |
| JP | 2007-163709 | 6/2007 |
| JP | 2009-239665 | 10/2009 |
| JP | 2012-080261 | 4/2012 |

OTHER PUBLICATIONS

European Search Report issued May 13, 2013 for corresponding European Appln. No. 12000055.9.

Japanese Office Action issued May 7, 2014, for corresponding Japanese Appln. No. 2011-005853.

* cited by examiner

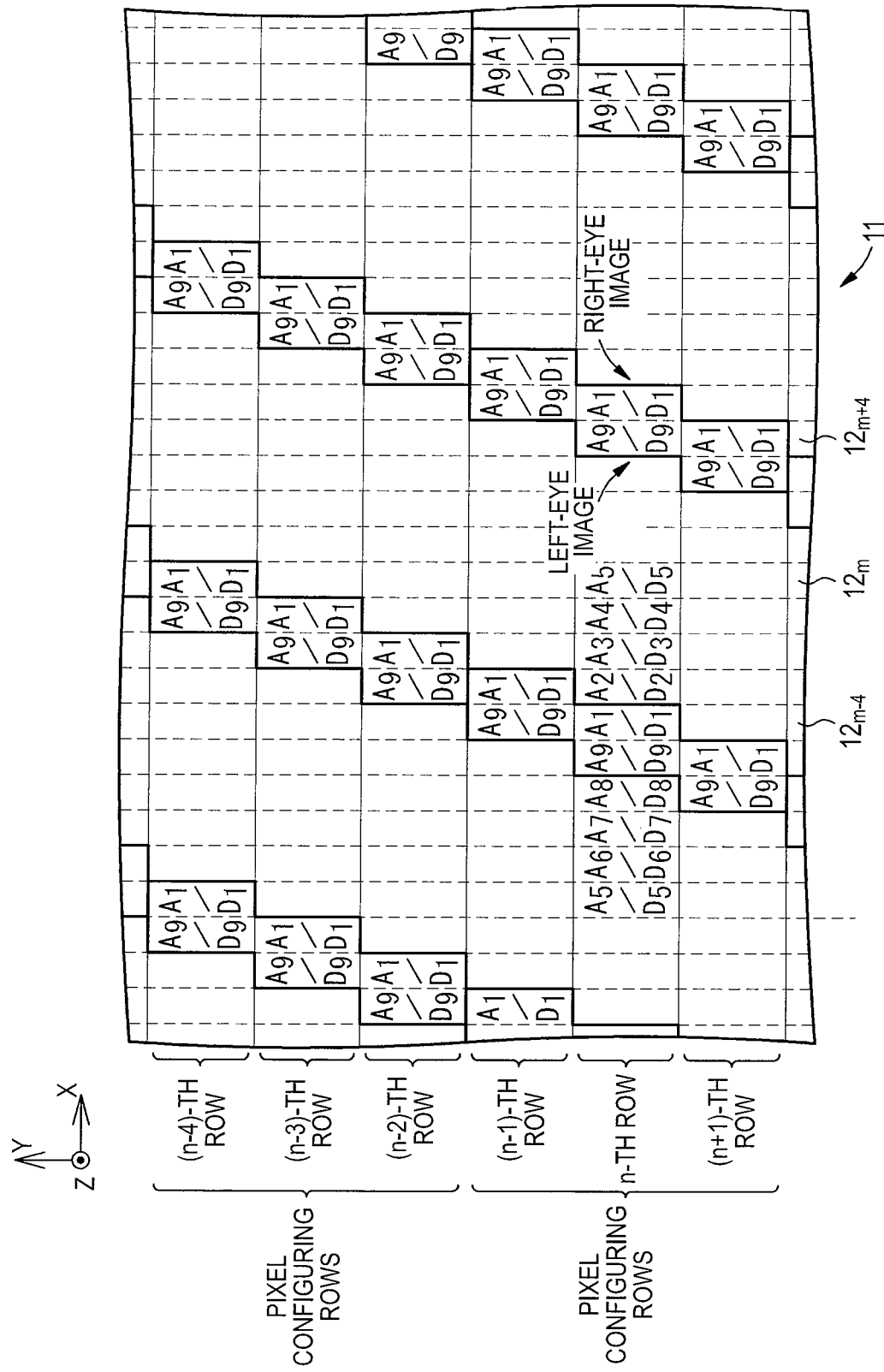

$$D_{WG}(j,k) = \begin{cases} \text{WHEN } dJ(j,k) = 0, \\ \quad D_9(j,k) \\ \text{WHEN } 0 < dJ(j,k) < dJ_{th} \\ \quad (dJ(j,k)/dJ_{th}) \cdot D_1(j,k) + \\ \quad (1 - dJ(j,k)/dJ_{th}) \cdot D_9(j,k) \\ \text{WHEN } dJ_{th} \leqq dJ(j,k) = 0, \\ \quad D_1(j,k) \end{cases}$$

IMAGE OBSERVED AT VIEWPOINT $A_9$

IMAGE OBSERVED AT VIEWPOINT $A_1$

*FIG.32A*

IMAGE OBSERVED AT VIEWPOINT $A_9$

*FIG.32B*

IMAGE OBSERVED AT VIEWPOINT $A_1$

FIG.34A

IMAGE OBSERVED AT VIEWPOINT $A_9$

FIG.34B

IMAGE OBSERVED AT VIEWPOINT $A_1$

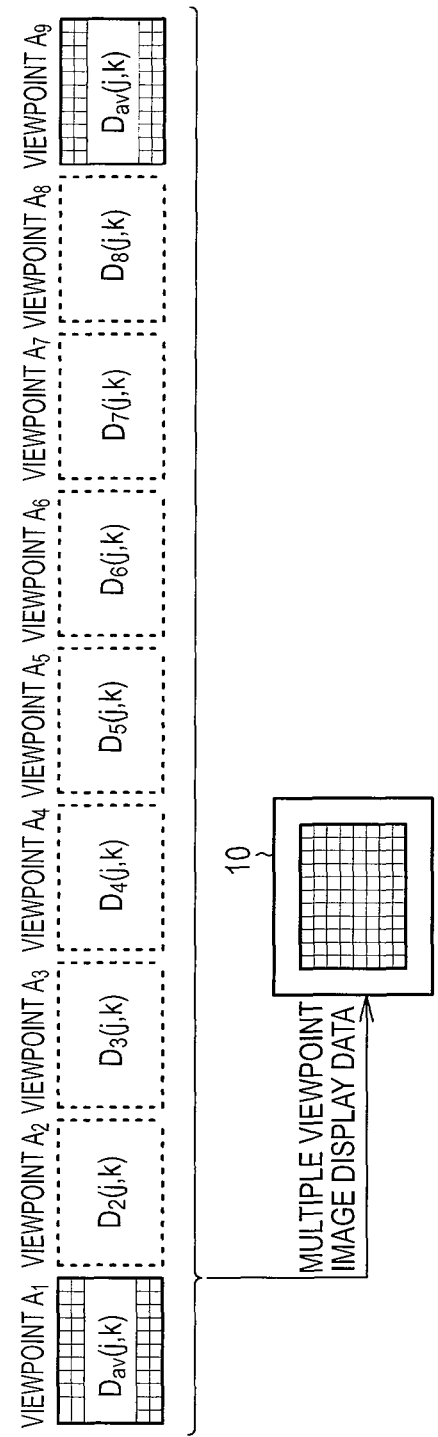

IMAGE OBSERVED AT VIEWPOINT $A_9$

IMAGE OBSERVED AT VIEWPOINT $A_1$

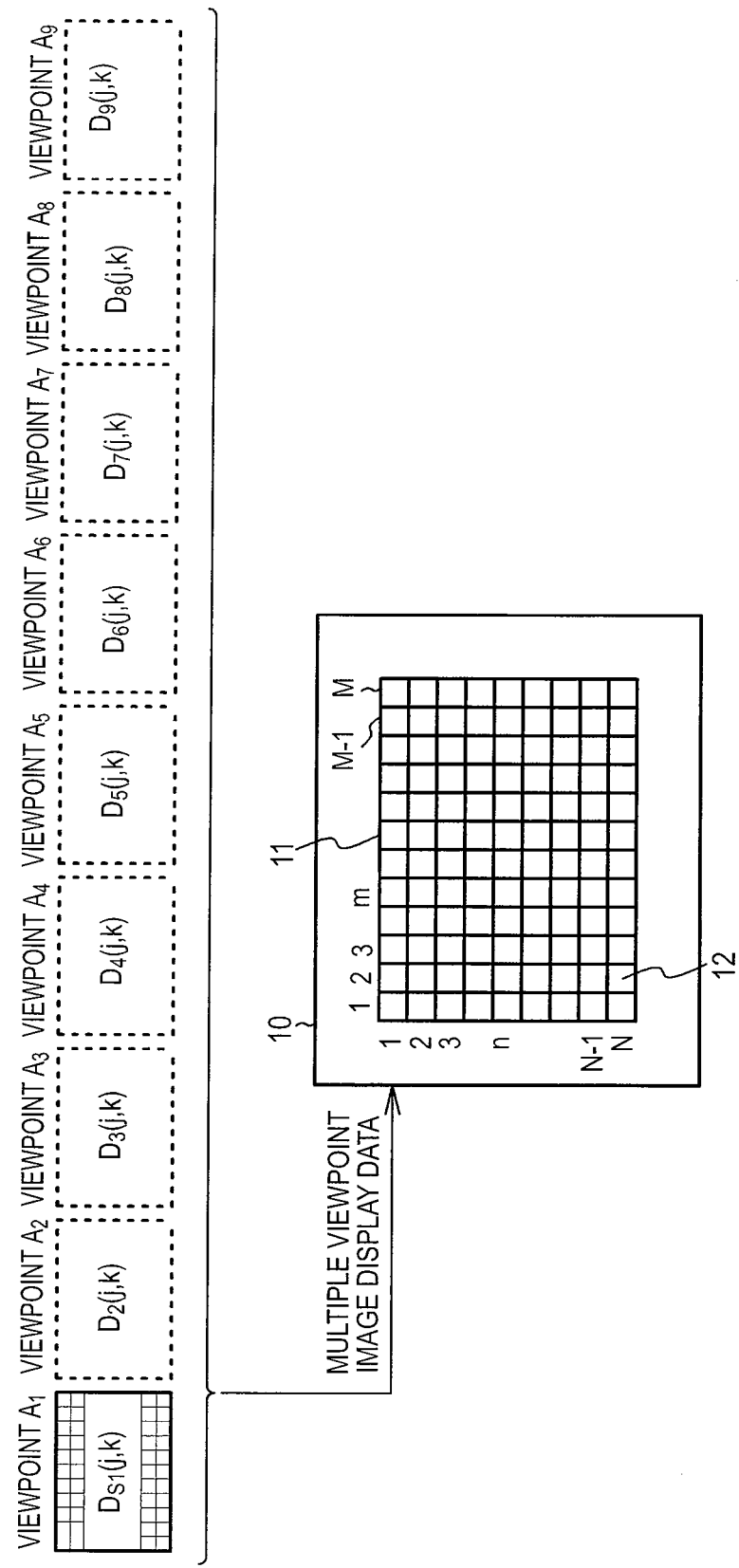

FIG.38A

IMAGE OBSERVED AT VIEWPOINT $A_9$

FIG.38B

IMAGE OBSERVED AT VIEWPOINT $A_1$

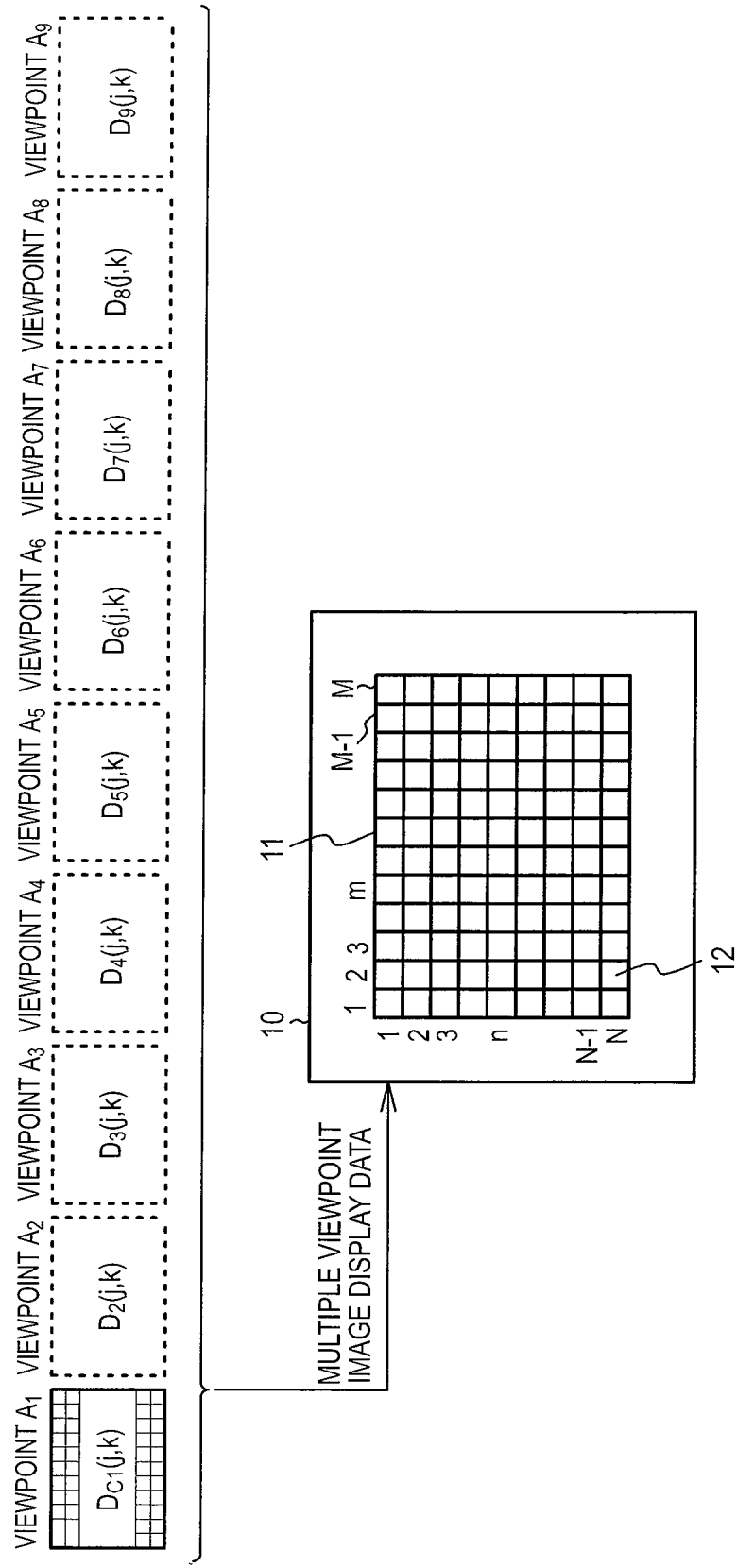

FIG.40A

IMAGE OBSERVED AT VIEWPOINT $A_9$

[Grid 912: all cells labeled $D_9$]

FIG.40B

IMAGE OBSERVED AT VIEWPOINT $A_1$

[Grid 112: cells alternating between $D_{WG}$ and $D_9$ in checkerboard pattern]

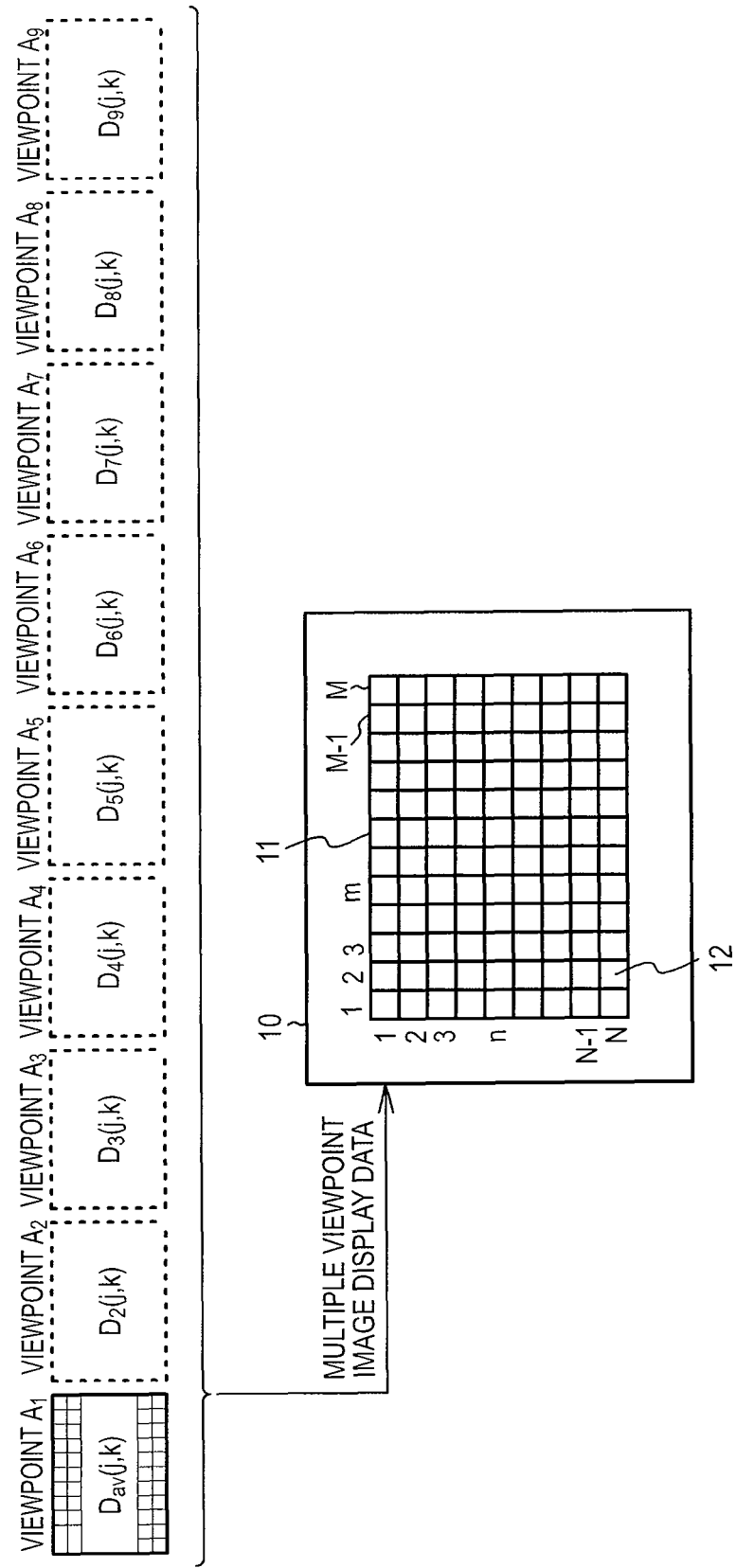

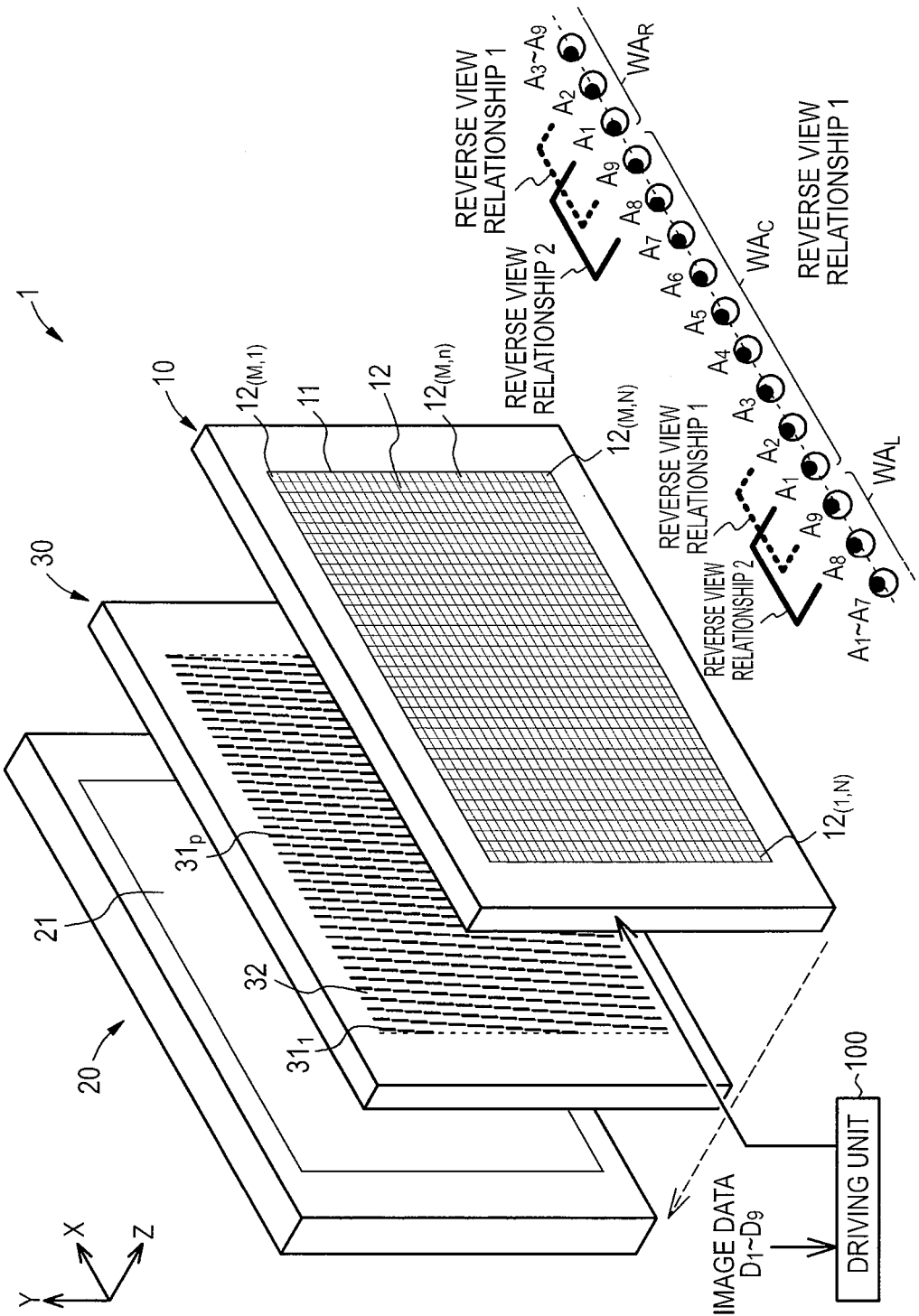

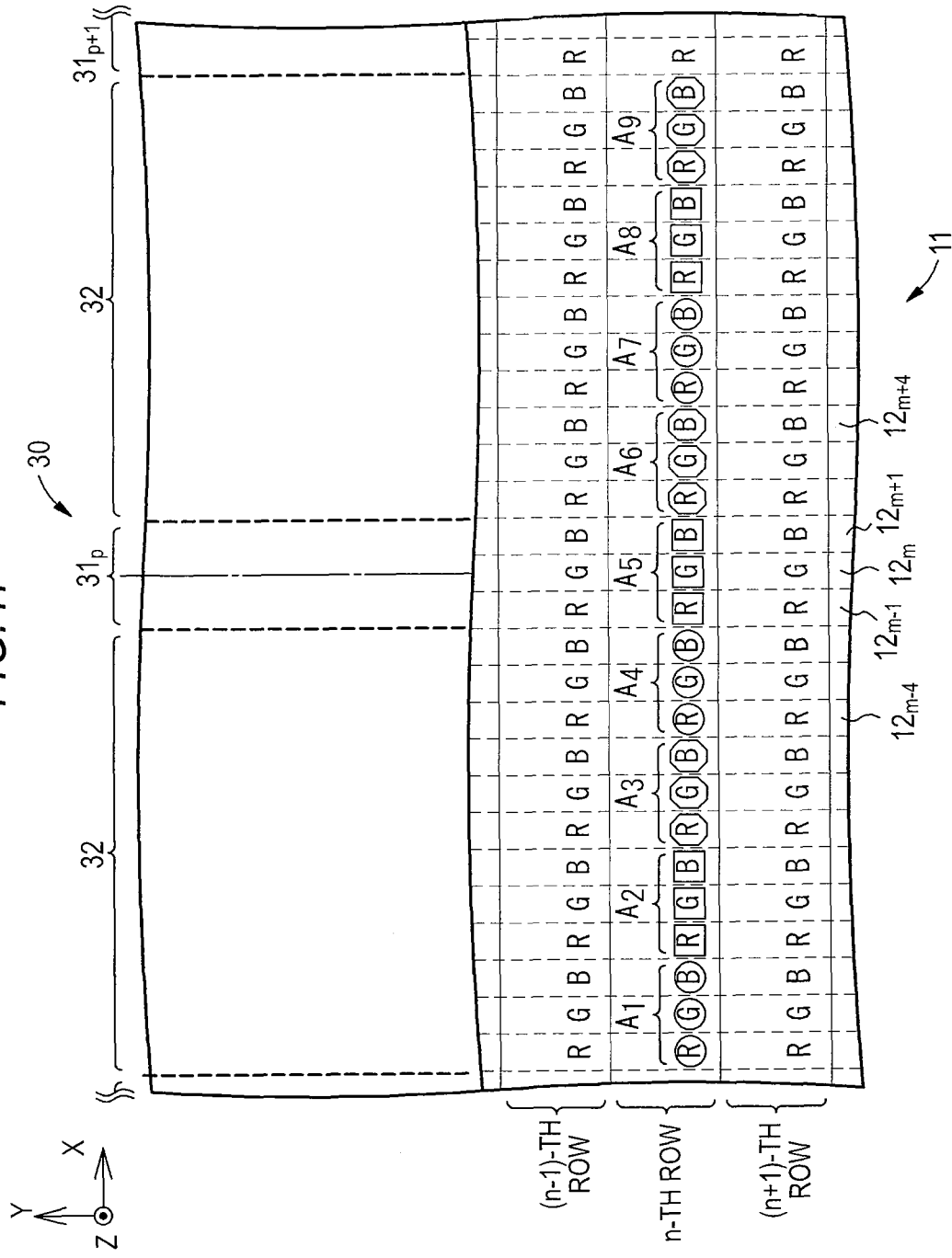

STEREOSCOPIC IMAGE DISPLAY DEVICE

CROSS REFERENCES TO RELATED APPLICATIONS

The present application claims priority to Japanese Priority Patent Application JP 2011-005853 filed in the Japan Patent Office on Jan. 14, 2011, the entire content of which is hereby incorporated by reference.

BACKGROUND

The present disclosure relates to a three-dimensional image display device, and more particularly, to a three-dimensional image display device capable of alleviating unnaturalness and discomfort caused by a so-called reverse view.

Various three-dimensional image display devices are known which realize a stereoscopic view for an image observer observing two images having parallax. The system of the stereoscopic image display devices is largely divided into a glass system in which a parallax image is divided and input to the left and right eyes by using glasses and an unaided eye system in which a parallax image is input to the left and right eyes without using glasses.

As the three-dimensional image display devices of the unaided eye system, three-dimensional image display devices, that is, "autostereoscopic image display devices", each acquired by combining an optical splitting unit that is formed by a parallax barrier or a lens sheet including a lens array, and an image display unit (two-dimensional image display device) haven been started to be practically used.

For example, an autostereoscopic image display device that uses a parallax barrier as the optical splitting unit is configured by an image display unit that is formed by a display panel including a plurality of pixels arranged in a two-dimensional matrix pattern in the horizontal direction and the vertical direction or the like and a parallax barrier including openings extending substantially in the vertical direction.

The autostereoscopic image display devices each including the optical splitting unit is largely divided into a type in which an optical splitting unit is arranged between an image display unit and an image observer, for example, as illustrated in FIG. 7 of JP-A-5-122733 and a type in which an image display unit includes an image display section such as a transmission-type liquid crystal display panel and an illumination section, and an optical splitting unit is arranged between the image display section and the illumination section, for example, as illustrated in FIG. 10 of Japanese Patent No. 3565391.

Conceptual diagrams of autostereoscopic image display devices in which the optical splitting unit is arranged between the image display section and the illumination section are illustrated in FIGS. 48A and 48B. The optical splitting unit is formed by a parallax barrier in the autostereoscopic image display device illustrated in FIG. 48A, and the optical splitting unit is formed by a lens sheet (lenticular lens) that includes a convex columnar lens array in the autostereoscopic image display device illustrated in FIG. 48B. In addition, the conceptual diagrams of autostereoscopic image display devices in which the optical splitting unit is arranged between the image display unit and an image observer are illustrated in FIGS. 49A and 49B. The optical splitting unit is formed by a parallax barrier in the autostereoscopic image display device illustrated in FIG. 49A, and the optical splitting unit is formed by a lenticular lens in the autostereoscopic image display device illustrated in FIG. 49B.

As illustrated in FIG. 48A, a group of rays of light emitted from pixel groups to which reference numerals L2, L4, L6, L8, and L10 are assigned reaches a viewpoint 1, and a group of rays of light emitted from pixel groups to which reference numerals R1, R3, R5, R7, and R9 are assigned reaches a viewpoint 2. As above, at a position located at a predetermined distance from the image display unit, an image of the viewpoint 1 and an image of the viewpoint 2 are alternately observed. This similarly applies to FIGS. 48B, 49A and 49B.

Here, it is assumed that the left eye and the right eye of the image observer are located at the viewpoint 1 and the viewpoint 2. When a left-eye image is displayed by the pixel groups to which the reference numerals L2, L4, L6, L8, and L10 are assigned, and a right-eye image is displayed by the pixel groups to which the reference numerals R1, R3, R5, R7, R9 are assigned, the image observer recognizes the images as a stereoscopic image. In other words, when located within an area in which the image of the viewpoint 1 is received in the left eye, and the image of the viewpoint 2 is received in the right eye, the image observer recognizes the images as a stereoscopic image.

However, when the image observer moves so as to be located within the area in which the image of the viewpoint 2 is received in the left eye, and the image of the viewpoint 1 is received in the right eye, a state called a "reverse view" in which the image of the left eye and the image of the right eye are viewed so as to be interchanged is formed. The image observer recognizes an image in which the front side and the inner side are reversed, whereby unnaturalness and discomfort are caused.

As attempts to alleviate unnaturalness and discomfort that are caused by a reverse view, for example, in JP-A-2000-47139, an autostereoscopic image display device in which the location of an image observer is detected, and the pattern shape of a mask pattern of an optical modulator corresponding to the optical splitting unit is changed or an autostereoscopic image display device in which the location of an image observer is detected, and the content of an image displayed on an image display unit is changed is proposed.

SUMMARY

The configuration or the control of an autostereoscopic image display device having a configuration in which the location of an image observer is detected so as to control an image display unit or an optical splitting unit is complicated, and accordingly, the cost of such an autostereoscopic image display device is high. In addition, there is a problem in that it is difficult to perform a control operation when a plurality of image observers observe one autostereoscopic image display device from different locations.

It is desirable to provide an autostereoscopic image display device that does not have a complicated configuration nor a complicated control process and can alleviate unnaturalness and discomfort caused by a reverse view without any difficulty even in a case where a plurality of image observers observe one autostereoscopic image display device from different locations.

An embodiment of the present disclosure is directed to an autostereoscopic image display device in which an image of each viewpoint can be observed in each one of a plurality of observation areas. One or both of a pair of images having relationship of a reverse view near an end portion of the observation area are displayed by first image data and using added image data acquired by weighting values of the first image data and second image data based on relationship of parallax between the second image data different from the first image data and the first image data and adding the weighted values.

According to the autostereoscopic image display device of the embodiment of the present disclosure, since an image display unit or the like is not controlled by detecting the location of an image observer, the degree of a reverse view occurring near an end portion of an observation area can be alleviated. In addition, even in a case where one autostereoscopic image display device is observed from different locations by a plurality of image observers, unnaturalness and discomfort caused by a reverse view can be alleviated without any difficulty.

Additional features and advantages are described herein, and will be apparent from the following Detailed Description and the figures.

BRIEF DESCRIPTION OF THE FIGURES

FIG. 9 is a table illustrating viewpoints for which light emitted from (1, 1)-th to (M, N)-th sub pixels is headed.

FIG. 15 is a table illustrating the value of "Q" at a viewpoint $A_Q$ toward which light emitted from the (1, 1)-th sub pixel to the (M, N)-th sub pixel is headed.

FIG. 16 is a table illustrating the value of "j" corresponding to the (1, 1)-th sub pixel to the (M, N)-th sub pixel.

FIG. 21 is a schematic plan view of a part of a display area illustrating pixels configuring an image observed in the left eye and pixels configuring an image observed in the right eye in a case where the viewpoints of the left eye and the right eye of an image observer are positioned at viewpoints $A_9$ and $A_1$.

FIGS. 32A and 32B are schematic plan views illustrating an image observed in the left eye and an image observed in the right eye in a case where the left eye and the right eye of an image observer are positioned at viewpoints $A_9$ and $A_1$.

FIGS. 34A and 34B are schematic plan views illustrating an image observed in the left eye and an image observed in the right eye in a case where the left eye and the right eye of an image observer are positioned at viewpoints $A_9$ and $A_1$.

FIG. 35A is a schematic diagram illustrating a method of generating data $D_{av}(j,k)$ according to a fifth embodiment.

FIG. 35B is a schematic diagram illustrating an operation of generating multiple viewpoint image display data according to the fifth embodiment.

FIG. 37 is a schematic diagram illustrating an operation of generating multiple viewpoint image display data according to a sixth embodiment.

FIGS. 38A and 38B are schematic plan views illustrating an image observed in the left eye and an image observed in the right eye in a case where the left eye and the right eye of an image observer are positioned at viewpoints $A_9$ and $A_1$.

FIG. 39 is a schematic diagram illustrating an operation of generating multiple viewpoint image display data according to a seventh embodiment.

FIGS. 40A and 40B are schematic plan views illustrating an image observed in the left eye and an image observed in the right eye in a case where the left eye and the right eye of an image observer are positioned at viewpoints $A_9$ and $A_1$.

FIG. 41 is a schematic diagram illustrating an operation of generating multiple viewpoint image display data according to an eighth embodiment.

FIG. 43 is a schematic perspective view when an autostereoscopic image display device is virtually divided.

FIG. 47 is a schematic perspective view illustrating the arrangement relation between opening portions and sub pixels.

DETAILED DESCRIPTION

Figure 1:
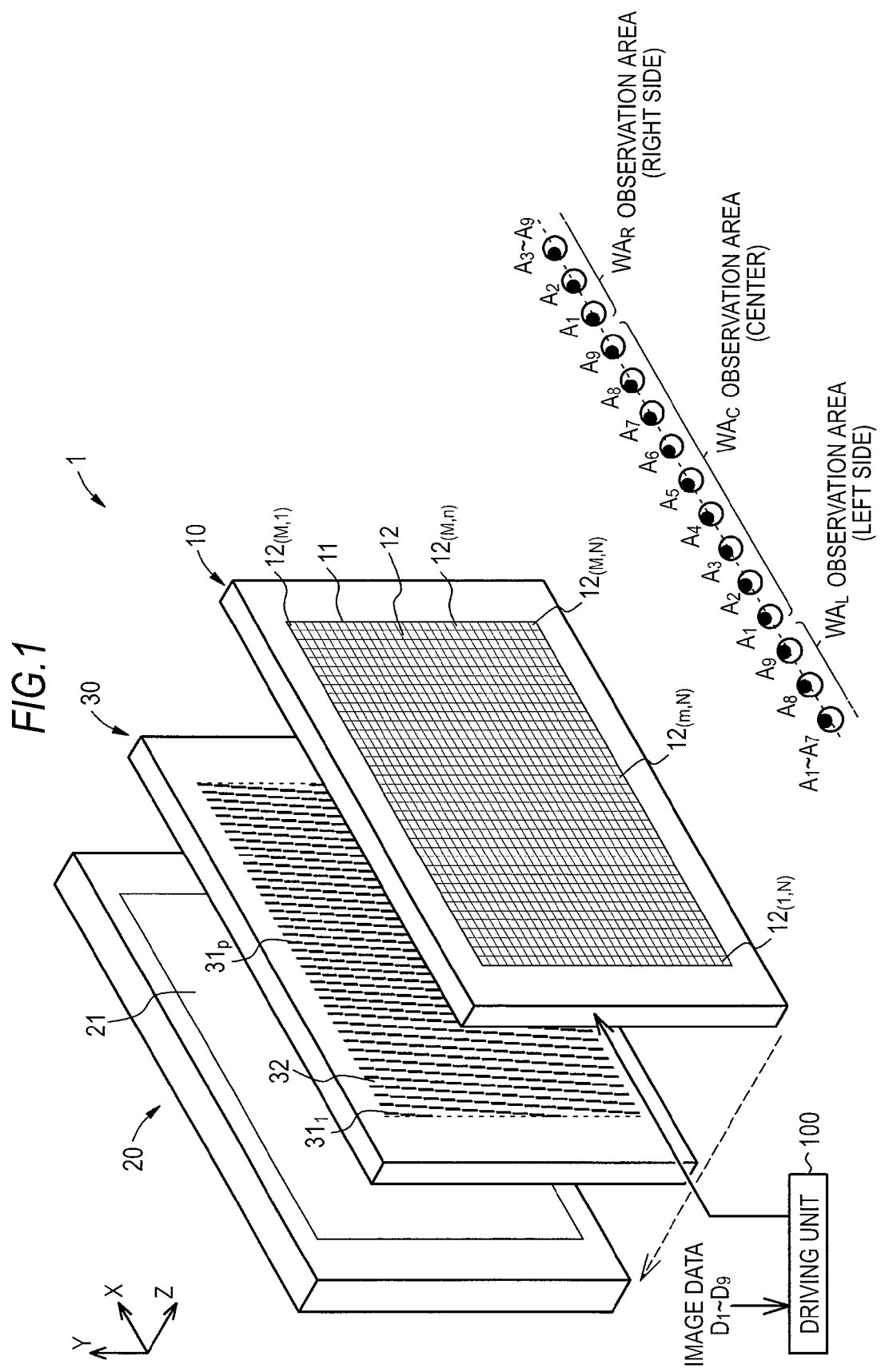
FIG. 1 is a schematic perspective view when an autostereoscopic image display device used in each embodiment is virtually divided.

Hereinafter, embodiments of the present disclosure will be described with reference to the drawings. However, the present disclosure is not limited to the embodiments, but various numeric figures and materials described in the embodiments are examples. In the description presented below, the same reference numeral is used for the same elements or elements having the same function, and duplicate description thereof will not be repeated. The description will be presented in the following order.
1. Autostereoscopic image display device According To Embodiment of Present Disclosure, Method of Driving Thereof, and Overview
2. Autostereoscopic image display device Used in Each Embodiment
3. Operation of Autostereoscopic image display device When Reverse View Is Not Alleviated
4. Embodiment of Reference Example and First Embodiment
5. Second Embodiment
6. Third Embodiment
7. Fourth Embodiment
8. Fifth Embodiment
9. Sixth Embodiment
10. Seventh Embodiment
11. Eighth Embodiment (Others)
[Autostereoscopic Image Display Device According to Embodiment of Present Disclosure and Overview]

As an autostereoscopic image display device according to an embodiment of the present disclosure, an autostereoscopic image display device in a wide range that displays an image for each viewpoint based on image data for a plurality of viewpoints, in which an image for each viewpoint can be observed in each one of a plurality of observation areas, can be used.

As described above, in the autostereoscopic image display device according to an embodiment of the present disclosure, both or one of a pair of images having the relationship of a reverse view around an end portion of an observation area are displayed by using first image data and added image data acquired by adding the weighted values of the first image data and second image data other than the first image data, which are weighted based on the parallax relationship between the second image data and the first image data. Accordingly, since the absolute value of the amount of parallax between a pair of images having the relationship of a reverse view can be decreased, the degree of the reverse view near the end portion of the observation area can be alleviated.

As the relationship of the parallax between the second image data and the first image data, for example, the distribution (histogram) of the amount of parallax of image data may be configured to be used. From the viewpoint of performing a data process at high speed, it is preferable that the added image data is configured so as to be generated by adding values of the first image data and the second image data that are weighted based on the amount of parallax between the first image data and the second image data.

The value of the added image data is preferably configured to be a value acquired by adding the values of the first image data and the second image data that are weighted such that the value of the added image data coincides with the value of the first image data, for example, in a case where the amount of parallax is zero, approaches the value of the second image data from the value of the first image data as the amount of parallax increases, and coincides with the value of the second image data in a case where the amount of parallax exceeds a threshold value.

From the simplification of the configuration of the autostereoscopic image display device, it is preferable to configure each of the first image data and the second image data to be image data for a different viewpoint. However, the present disclosure is not limited thereto. For example, a configuration may be employed in which image data acquired by modifying a part or the entirety of the viewpoint image data, image data corresponding to a virtual viewpoint, and the like are separately generated, and are used as the first image data and the second image data.

In the autostereoscopic image display device according to the embodiment of the present disclosure, both or one of a pair of images may be configured to be displayed based on data acquired by combining the first image data and the added image data. In such a case, the image displayed based on the data acquired by combining the first image data and the added image data may have a configuration formed by alternately arranging an element of the image of the first image data and an element of the image of the added image data in a stripe pattern or a configuration formed by arranging an element of the image of the first image data and an element of the image of the added image data in a checkered pattern.

As examples of the configuration formed by alternately arranging elements of the images in a stripe pattern, there are a configuration in which elements of the images are alternately arranged in units of pixel columns or in units of pixel rows and a configuration in which elements of the images are alternately arranged in units of pixel column groups each formed by a plurality of pixel columns adjacent to each other or in units of pixel row groups each formed by a plurality of pixel rows adjacent to each other. In addition, as examples of the configuration formed by arranging elements of the images in a checkered pattern, there are a configuration in which the elements of the images are arranged in a checkered pattern in units of pixels and a configuration in which the elements of the images are arranged in a checkered pattern in units of pixel groups each formed by a plurality of pixels.

Alternatively, in the autostereoscopic image display device according to the embodiment of the present disclosure, a configuration may be employed in which both or one of a pair of images are displayed based on data acquired by averaging the first image data and the added image data. Here, the "data acquired by averaging the first image data and the added image data" means a set of data acquired by averaging data and different data that correspond to the same pixel. In addition, "averaging" is not limited to an arithmetic average but, for example, may be a weighted average. In a case where the weighted averaging is performed, as the weighting factors, appropriate value according to the design of the autostereoscopic image display device may be selected.

In a case where the autostereoscopic image display device includes an image display unit that displays a multiple viewpoint image and an optical splitting unit that splits a multiple viewpoint image displayed on the image display unit such that images of each viewpoint can be observed in each observation area, the optical splitting unit may be configured so as to be arranged between the image display unit and an image observer, or the optical splitting unit may be configured so as to be arranged between the image display unit and an illumination unit. In the former case, as the image display unit, a known display device in a wide range such as a liquid crystal display panel, an electroluminescence display panel or a plasma display panel can be used. In the latter case, as the image display unit, a known transmission-type display panel such as a transmission-type liquid crystal display panel can be used. The image display unit may be a monochrome display or a color display.

The configuration, the arrangement, and the like of the optical splitting unit may be appropriately set in accordance with the specifications of the autostereoscopic image display device. In a case where a parallax barrier is used as the optical splitting unit, a fixed parallax barrier may be used, or a parallax barrier that is dynamically changeable may be used.

The fixed parallax barrier can be formed by using known methods such as a method combining a photolithographic method and an etching method, various printing methods such as a screen printing method, an inkjet printing method, and a metal mask printing method, a plating method (an electroplating method or an electroless plating method), and a lift-off method by using a base member formed from a known transparent material such as acryl-based resin, polycarbonate resin (PC), ABS resin, polymethylmethacrylate (PMMA), polyarylate resin (PAR), polyethylene terephthalate resin (PET), or glass. On the other hand, the parallax barrier that is dynamically changeable can be configured, for example, by a light valve, which has a liquid crystal material layer, that is electrically changeable. The kind of the material configuring a light valve using a liquid crystal material layer or the operation mode of the liquid crystal material layer are not particularly limited. In some cases, a liquid crystal display panel of a monochrome display may be used as a dynamic parallax barrier. The size, the arrangement pitch, and the like of the opening portions of the parallax barrier may be appropriately set in accordance with the specifications of the autostereoscopic image display device and the like.

In addition, in a case where a lens sheet is used as the optical splitting unit, the configuration and the structure of the lens sheet are not particularly limited. For example, a lens sheet that is integrally molded by using a known transparent material described above or the like may be used, a lens sheet in which a lens row is formed, for example, by using a photosensitive resin material or the like on a sheet-shaped base member formed from the above-described material or the like may be used. The optical power of the lens row, the pitch of the lens row, and the like may be appropriately set in accordance with the specifications of the autostereoscopic image display device and the like.

In the configuration in which the autostereoscopic image display device includes the transmission-type display panel and the illumination unit, a known illumination unit in a wide range can be used. The configuration of the illumination unit is not particularly limited. Generally, the illumination unit can be configured by using known members such as a light source, a prism sheet, a diffusion sheet, and a light guiding plate.

In each embodiment described below, an active-matrix transmission-type color liquid crystal display panel is used as the image display unit, and a fixed parallax barrier is used as the optical splitting unit. In addition, in the embodiment, the optical splitting unit is described as arranged between the image display unit and the illumination unit. However, the present disclosure is not limited to such a structure.

The liquid display panel, for example, is formed by a front panel including a transparent first electrode, a rear panel including a transparent second electrode, and a liquid crystal material arranged between the front panel and the rear panel.

Here, more particularly, the front panel is configured by a first substrate, for example, formed from a glass substrate, a transparent first electrode (it is also called a common electrode and is, for example, formed from ITO (Indium Tin Oxide)) disposed in the inner face of the first substrate, and a polarizing film disposed on the outer face of the first substrate. In addition, in a color liquid crystal display panel, the front panel has a configuration in which a color filter coated with an overcoat layer formed from acryl-based resin or epoxy-base resin is disposed on the inner face of the first substrate, and the transparent first electrode is formed on the overcoat layer. On the transparent first electrode, an oriented film is formed. As examples of the arrangement pattern of the color filter, there are a delta arrangement, a stripe arrangement, a diagonal arrangement, and a rectangular arrangement.

On the other hand, more specifically, the rear panel is configured by a second substrate, for example, that is formed by a glass substrate, a switching device that is formed on the inner face of the second substrate, a transparent second electrode (it is also called a pixel electrode and, for example, is formed from ITO) that is controlled to be conductive/non-conductive by the switching device, and a polarizing film that is disposed on the outer face of the second substrate. On the entire face including the transparent second electrode, an oriented film is formed. Various members and the liquid crystal material that configure the transmission-type liquid crystal display panel may be configured by members and a material that are known. In addition, as examples of the switching device, there are a three-terminal device such as a thin film transistor (TFT) and a two-terminal device such as a MIM (Metal Insulator Metal) device, a varistor device, or a diode.

In addition, in a color liquid crystal display panel, an area that is an area in which the transparent first electrode and the transparent second electrode overlap each other and includes a liquid crystal cell corresponds to one sub pixel. Furthermore, a red light emitting sub pixel is configured by a combination of a related area and a color filter through which a red color is transmitted, a green light emitting sub pixel is configured by a combination of a related area and a color filter through which a green color is transmitted, and a blue light emitting sub pixel is configured by a combination of a related area and a color filter through which a blue color is transmitted. The arrangement pattern of the red light emitting sub pixel, the green light emitting sub pixel, and the blue light emitting sub pixel coincides with the above-described arrangement pattern of the color filter.

Furthermore, one type or more types of sub pixels may be configured to be included in addition to the three types of sub pixels. For example, a sub pixel emitting white light for improving the luminance, a sub pixel that emits complementary color light for enlarging the color reproduction range, a sub pixel that emits yellow light for enlarging the color reproduction range, a sub pixel that emits yellow light and cyan light for enlarging the color reproduction range may be included.

When the number $M_0 \times N_0$ of pixels is denoted as $(M_0, N_0)$ on a premise that the image display unit displays an ordinary planar image, as examples of the specific values of $(M_0, N_0)$, there are (1920,1035), (720,480), and (1280,960) in addition to VGA (640,480), S-VGA (800,600), XGA (1024,768), APRC (1152,900), S-XGA (1280,1024), U-XGA (1600,1200), HD-TV (1920,1080), and Q-XGA (2048,1536), which are several examples of the image display resolution. However, the values of $(M_0, N_0)$ are not limited to the above-described values.

The driving unit that drives the image display unit may be configured by various circuits such as an image signal processing unit, a timing control unit, a data driver, and a gate driver. These can be configured by using known circuit elements and the like.

[Autostereoscopic Image Display Device Used in Each Embodiment]

FIG. 1 is a schematic perspective view when an autostereoscopic image display device used in each embodiment to be described later is virtually divided.

As illustrated in FIG. 1, the autostereoscopic image display device 1 includes: an image display unit 10; an illumination unit 20 that irradiates the image display unit 10 from the rear face; and an optical splitting unit 30 that is arranged between the image display unit 10 and the illumination unit 20 and splits multiple viewpoint images displayed on the image display unit 10 so as to enable an image for each viewpoint to be observable in observation areas $WA_L$, $WA_C$, and $WA_R$. Here, the observation areas $WA_L$, $WA_C$, and $WA_R$ may be collectively represented as "observation area WA".

The image display unit 10 displays multiple viewpoint images for the viewpoints $A_1$ to $A_9$. The driving unit 100 generates multiple viewpoint image display data based on image data $D_1$ to $D_9$ corresponding to each viewpoint and drives the image display unit 10. The operation of the driving unit 100 will be described later in detail with reference to FIGS. 9 to 14.

In a display area 11 of the image display unit 10, a total of M×N sub pixels 12 including M sub pixels in the horizontal direction (the X direction in the figure) and N sub pixels in the vertical direction (the Y direction in the figure) are arranged. The sub pixel 12 located in the m-th column (here, m=1, 2, ..., M) and the n-th row (here, n=1, 2, ..., N) is denoted as an (m, n)-th sub pixel 12 or a sub pixel $12_{(m,n)}$. In addition, the m-th sub pixel 12 may be denoted as a sub pixel $12_m$.

The image display unit 10 is formed by an active matrix color liquid crystal display panel. The sub pixels 12 are arranged in the order of a red light emitting sub pixel as a first-column sub pixel, a green light emitting sub pixel as a second-column sub pixel, and a blue light emitting sub pixel as a third-column sub pixel, and a fourth-column sub pixel and the pixels after that are arranged so as to repeat the same order. In other words, an m-th column sub pixel is the red light emitting sub pixel in a case where the remainder is 0 when "m−1" is divided by 3, the green light emitting sub pixel in a case where the remainder is 1, and the blue light emitting sub pixel in a case where the remainder is 2.

The number $(M_0, N_0)$ of pixels assuming that the image display unit 10 displays an ordinary planar image, for example, is (1920,1080). In such a case, when a pixel of the ordinary planar image is configured by a set of a red light emitting sub pixel, a green light emitting sub pixel, and a blue light emitting sub pixel aligned in the horizontal direction, $M=M_0 \times 3$ and $N=N_0$. In other words, in the above-described example, M=5760, and N=1080.

The image display unit 10 is configured by a front panel located on the observation area WA side, a rear panel located on the optical splitting unit 30 side, and a liquid crystal material arranged between the front panel and the rear panel. For the convenience of drawing, the image display unit 10 is represented as one panel in FIG. 1.

The optical splitting unit 30 includes an opening column that is formed by a plurality of opening portions 31 aligned in the substantially vertical direction (the Y direction in the figure) and a light shielding portion 32 that is interposed between opening columns. A plurality of (P) opening columns described above are arranged so as to be aligned in the horizontal direction (the X direction in the figure). The opening portion 31 that configures the p-th (here, p=1, 2, ..., P)

opening columns is denoted by an opening portion $31_p$. As will be described in detail, "M" and "P" have the relationship of M≈P×9.

The opening column is basically configured by N opening portions 31. As will be described later, a direction in which the opening column extends and the Y direction form a small angle. Accordingly, the opening column located at the end portion is configured by less than N opening portions 31.

The optical splitting unit 30, for example, is configured by forming a photosensitive material layer including a black pigment on a PET film and then removing the photosensitive material layer with allowing the light shielding portions 32 to remain through a combination of a photolithographic method and an etching method. Portions in which the photosensitive material layer is removed are formed as the opening portions 31.

In addition, in FIGS. 3 to 7 to be described later, a PET film that is the base member of the optical splitting unit 30 is not illustrated, and the opening portions 31 and the light shielding portion 32 are schematically shown. Further, in order to clarify a light shielding state and a transmission state, the light shielding portions 32 are represented in black.

The illumination unit 20 is configured by members (not illustrated in the figure) such as a light source, a prism sheet, a diffusion sheet, and a light guiding plate. Diffused light formed through the diffusion sheet and the like is emitted from a light emitting face 21 toward the rear face of the image display unit 10. When a part of the light of the illumination unit 20 is shielded by the optical splitting unit 30, an image displayed on the image display unit 10 is split into images for a plurality of viewpoints.

When light of the illumination unit 20 that has been transmitted through the opening portions 31 of the optical splitting unit 30 is incident to the transmission-type liquid crystal panel 10, a part of the light is reflected so as to illuminate the optical splitting unit 30. In a case where the directivity of the parallax image decreases due to the light illuminating the optical splitting unit 30, a reflection preventing film may be disposed on the face of the image display unit 10 that is located on the optical splitting unit 30 side. Alternatively, a reflection preventing film may be disposed on the face of the optical splitting unit 30 that is located on the image display unit 10 side. In such a case, it is preferable to dispose the reflection preventing film only in a portion corresponding to the light shielding portions 32. The configuration of the reflection preventing film is not particularly limited, and a known reflection preventing film in a wide range can be used.

A distance between the optical splitting unit 30 and the image display unit 10, the pitch (hereinafter, it may be referred to as a sub pixel pitch) of the sub pixel 12 in the X direction illustrated in the figure, and the pitch (hereinafter, it may be referred to as an opening portion pitch) of the opening portion 31 in the X direction illustrated in the figure are set so as to satisfy conditions for the observation of a desirable stereoscopic image in an observation area WA that is set based on the specifications of the autostereoscopic image display device 1. These conditions will be described in detail.

In each embodiment, the number of viewpoints of an image displayed in the autostereoscopic image display device is described as nine of viewpoints $A_1, A_2, \ldots, A_9$ in each one of the observation areas $WA_L$, $WA_C$, and $WA_R$ illustrated in FIG. 1. However, the present disclosure is not limited thereto. The number of observation areas and the number of the viewpoints can be appropriately set in accordance with the design of the autostereoscopic image display device. In addition, for the convenience of drawing, in FIGS. 1, 3 to 7, and FIGS. 44 and 46 to be described later, some viewpoints in the observation areas $WA_L$ and $WA_R$ are not illustrated.

Figure 2:
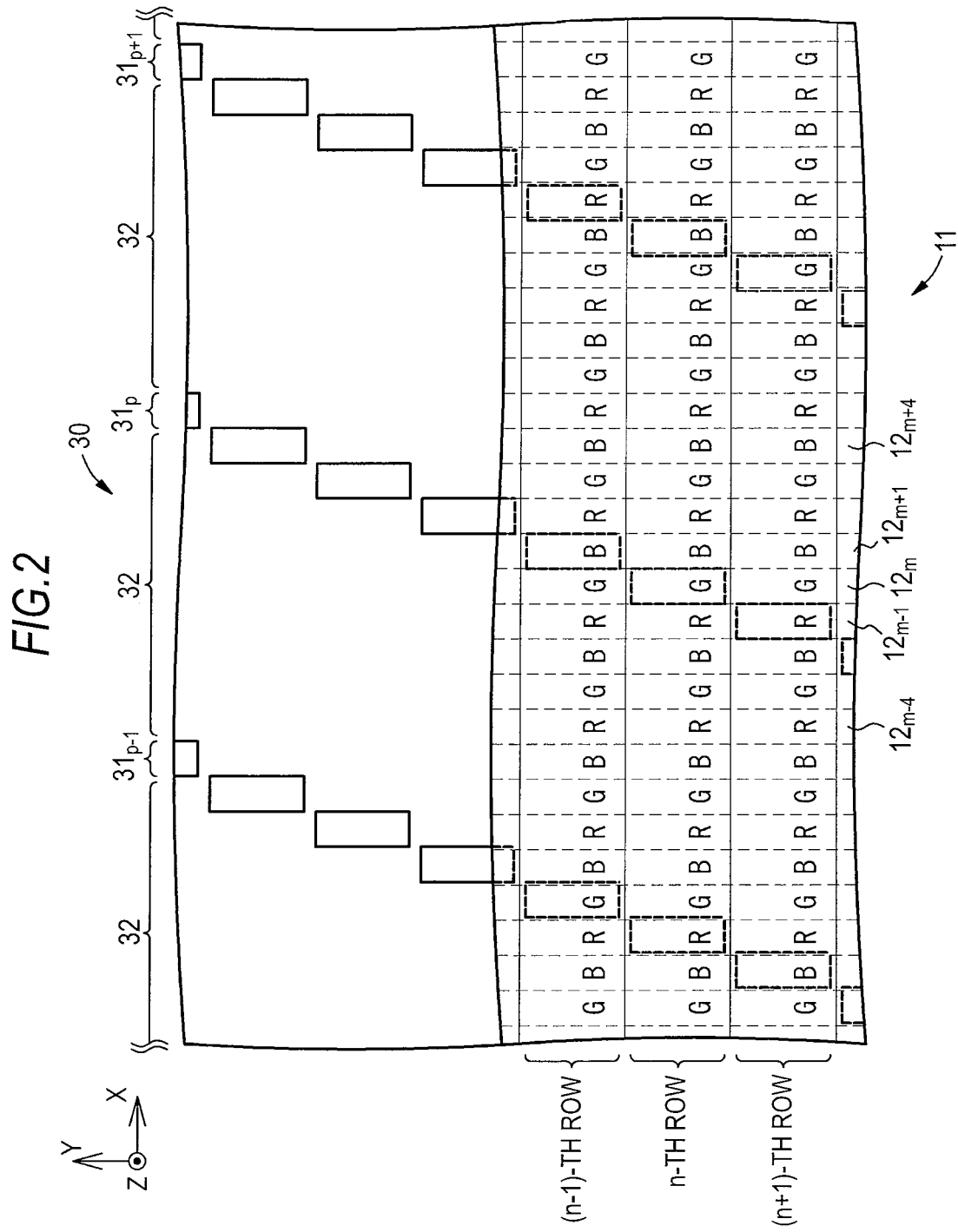
FIG. 2 is a schematic plan view of parts of an optical splitting unit and a display area for illustrating the arrangement relation between opening portions and sub pixels of the autostereoscopic image display device.

FIG. 2 is a schematic plan view of parts of an optical splitting unit and a display area for illustrating the arrangement relation between opening portions and sub pixels of the autostereoscopic image display device.

As illustrated in FIG. 2, the opening portion 31 corresponding to the sub pixel 12 in the (n+1)-th row is arranged so as to be shifted from the opening portion 31 corresponding to the sub pixel 12 in the n-th row by a distance approximately corresponding to the pitch of the sub pixels 12 in the −X direction. Accordingly, the direction in which the opening column extends and the Y direction form a small angle. For the convenience of drawing, although the width of the opening portion 31 in the X direction is represented to have the same length as that of the width of the pitch of the sub pixels 12 in FIG. 2, this is merely an example.

Figure 8:
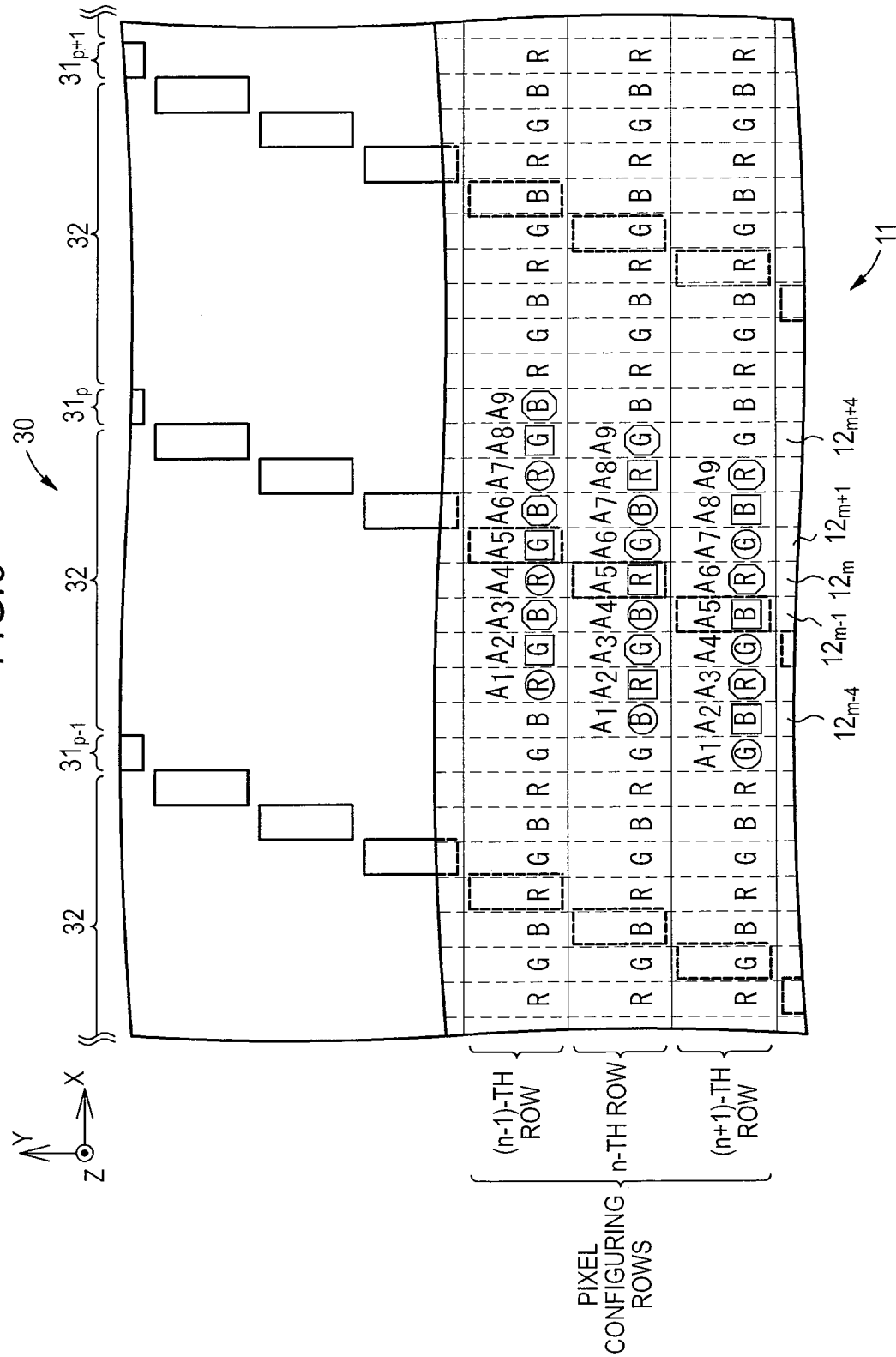
FIG. 8 is a schematic plan view of parts of an optical splitting unit and a display area for illustrating sub pixels that configure a pixel of an image for each viewpoint in the autostereoscopic image display device used in each embodiment.

In FIG. 2 and FIG. 8 to be described later, the red light emitting sub pixel, the green light emitting sub pixel, and the blue light emitting pixel are denoted by using symbols R, G, and B.

For convenience of the description, in the description presented with reference to FIGS. 2 to 8, it is assumed that the sub pixel 12 in the m-th column and the n-th row is the red light emitting sub pixel, and a center point thereof is located on a virtual line that passes through the center of the p-th-column opening portion $31_p$ and extends in the Z direction.

Figure 3:
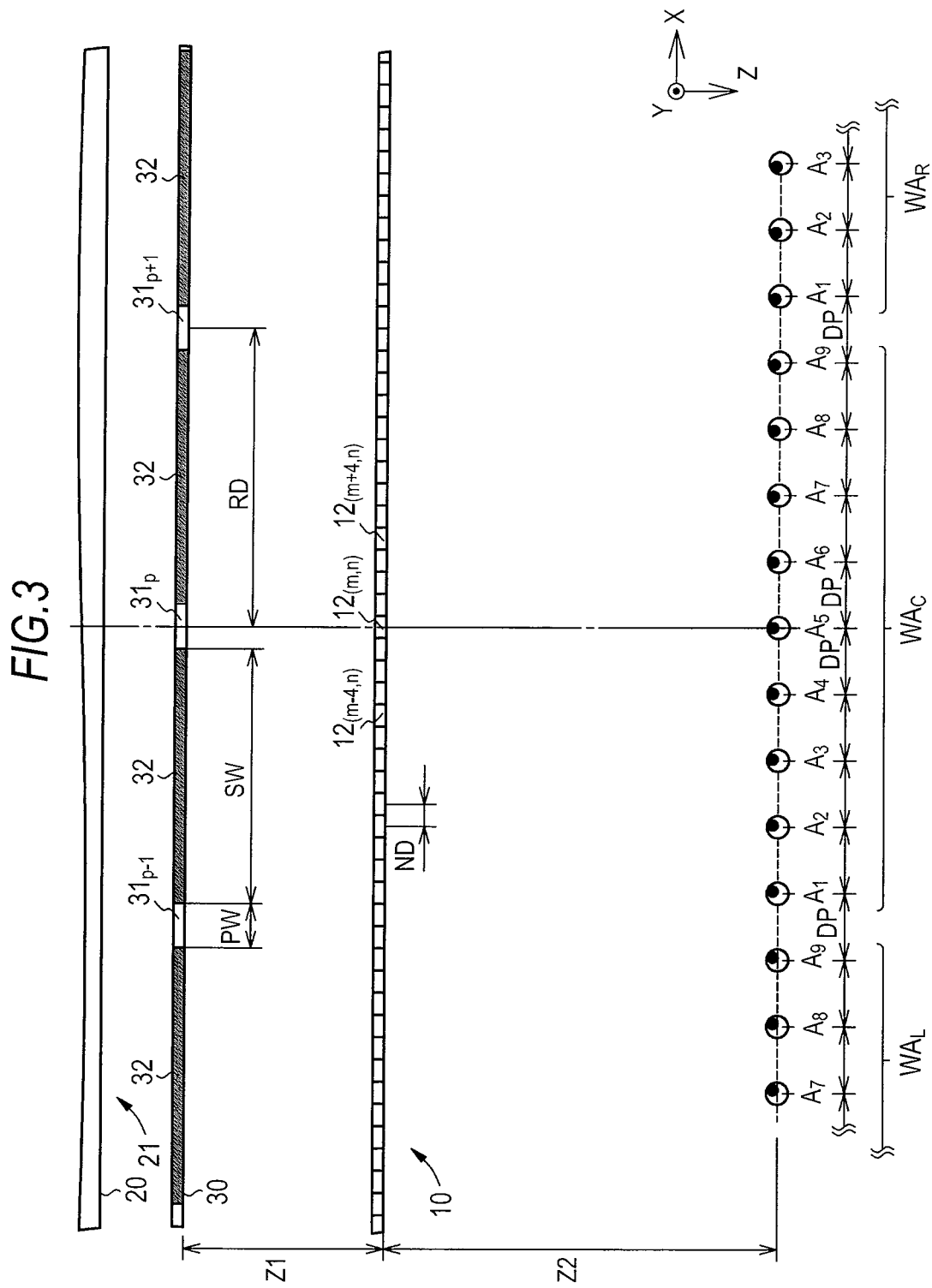
FIG. 3 is a schematic plan view illustrating the arrangement relation among viewpoints $A_1$ to $A_9$ of an observation area shown in FIG. 1, an image display unit, an optical splitting unit, and an illumination unit.

FIG. 3 is a schematic plan view illustrating the arrangement relation among viewpoints $A_1$ to $A_9$ of an observation area shown in FIG. 1, the image display unit, the optical splitting unit, and the illumination unit. More specifically, FIG. 3 is a diagram that illustrates the arrangement relationship among the viewpoints $A_1$ to $A_9$, the image display unit, the optical splitting unit, and the illumination unit on a virtual plane that includes the above-described virtual line and is parallel to the X-Z plane.

The pitch of the sub pixels is denoted by ND [mm], and the opening portion pitch is denoted by RD [mm] A distance between the opening portion 31 and the image display unit 10 is denoted by Z1 [mm], and a distance between the image display unit 10 and the observation areas $WA_L$, $WA_C$, and $WA_R$ is denoted by Z2 [mm] In addition, a distance between viewpoints adjacent to each other in the observation areas $WA_L$, $WA_C$, and $WA_R$ is denoted by DP [mm]

When the width of the opening portion 31 is denoted by PW, and the width of the light shielding portion 32 is denoted by SW, the opening portion pitch RD satisfies the relationship of RD=SW+PW. Qualitatively, as the value of PW/RD=PW/(SW+PW) decreases, the directivity of an image for each viewpoint is improved, and the luminance of an observed image decrease. The value of PW/RD may be set to an appropriate value in accordance with the specifications of the autostereoscopic image display device.

The conditions for configuring light transmitted from the opening portion $31_p$ that is transmitted through sub pixels $12_{(m-4,n)}, 12_{(m-3,n)}, \ldots, 12_{(m+4,n)}$ to travel toward viewpoints $A_1, A_2, \ldots, A_9$ of the observation area $WA_C$ located at the center will be considered. For convenience of the description, the width PW of the opening portion 31 is assumed to be sufficiently small, and the description will be presented with focusing on the orbit of light passing through the center of the opening portion 31.

Figure 4:
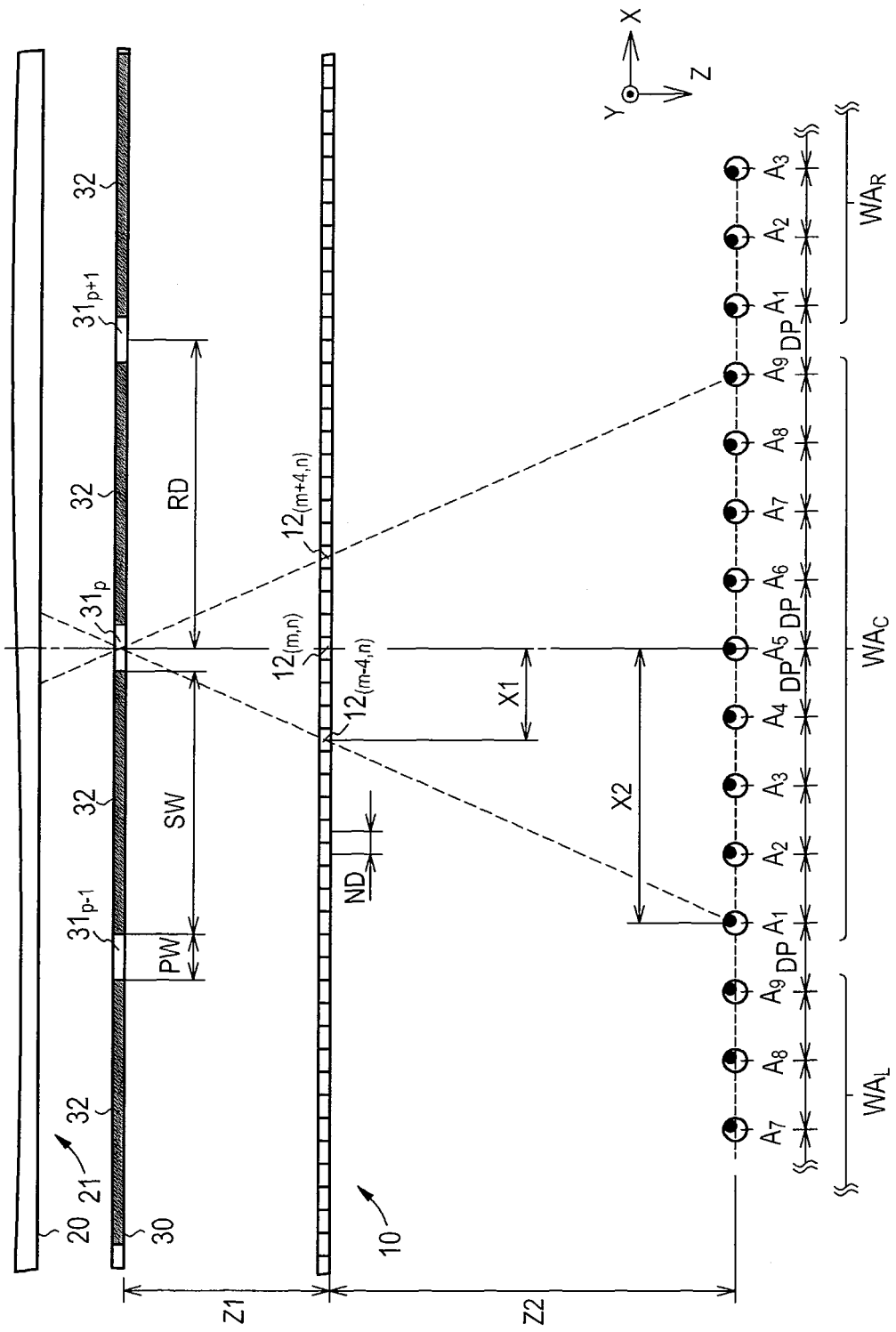
FIG. 4 is a schematic diagram illustrating conditions to be satisfied for light emitted from a sub pixel being headed toward the viewpoints $A_1$ to $A_9$ of the observation area located at the center.

FIG. 4 is a schematic diagram illustrating conditions to be satisfied for light emitted from a sub pixel being headed toward the viewpoints $A_1$ to $A_9$ of the observation area located at the center.

A virtual line that passes through the center of the opening portion $31_p$ and extends in the Z direction is used as a reference, a distance up to the center of the sub pixel $12_{(m-4,n)}$ is denoted by a symbol X1, and a distance up to a viewpoint $A_1$ of the observation area $WA_C$ located at the center is denoted by a symbol X2. When light is transmitted through the sub pixel $12_{(m-4,n)}$ from the opening portion $31_p$ and travels toward the viewpoint $A_1$ of the observation area $WA_C$, based on the geometric similarity relationship, the condition represented in the following Equation (1) is satisfied.

$$Z1:X1=(Z1+Z2):X2 \qquad (1)$$

Here, $X1=4 \times ND$ and $X2=4 \times DP$, and accordingly, when these are reflected, Equation (1) is represented as the following Equation (1').

$$Z1:4 \times ND=(Z1+Z2): 4 \times DP \qquad (1')$$

It is apparent in a geometrical sense that, when the above-described Equation (1') is satisfied, light that is transmitted through sub pixels $12_{(m-3,n)}, 12_{(m-2,n)}, \ldots, 12_{(m+4,n)}$ from the opening portion $31_p$ travels toward viewpoints $A_2, A_3, \ldots, A_9$ of the observation area $WA_C$.

Figure 5:
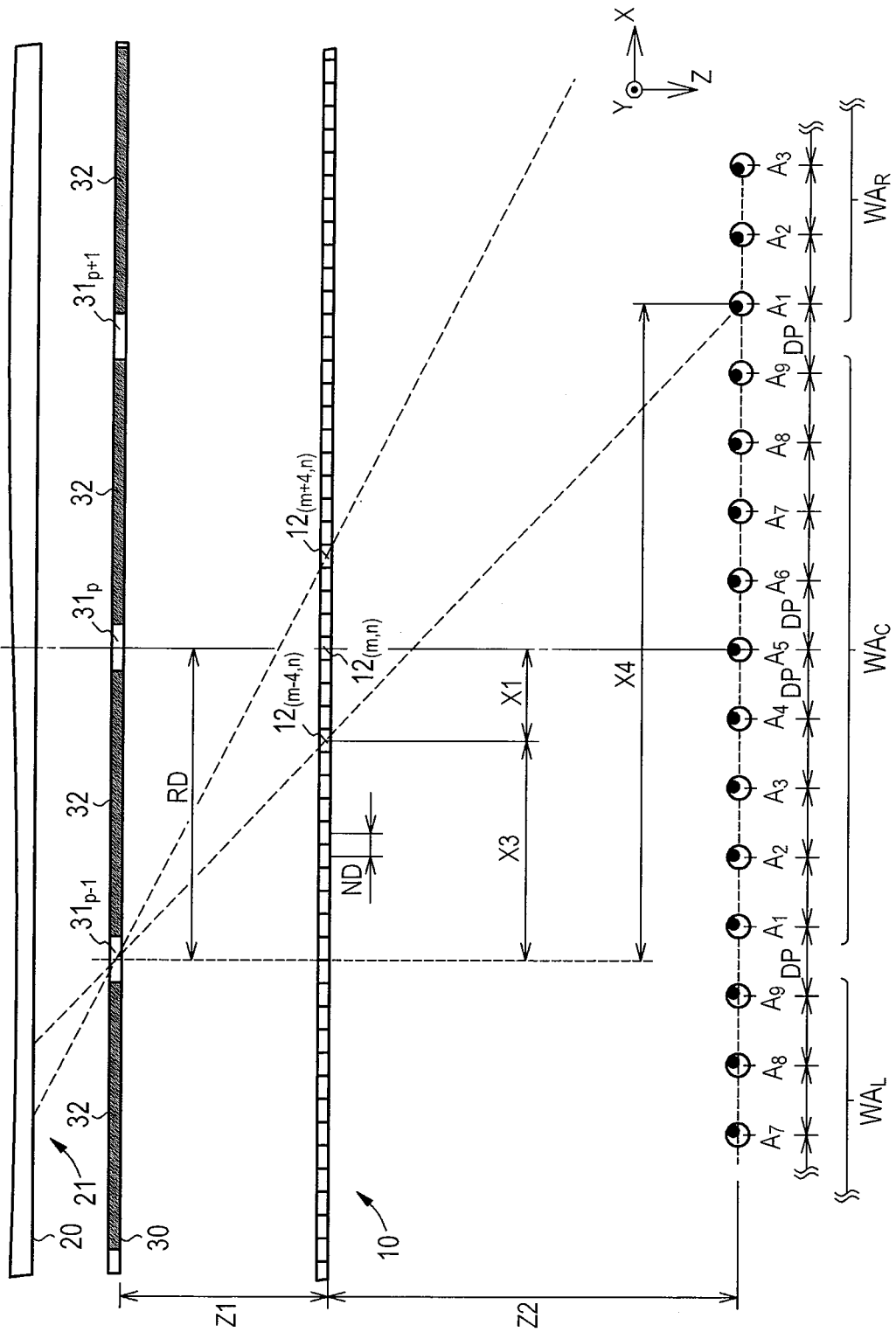
FIG. 5 is a schematic diagram illustrating conditions to be satisfied for light emitted from a sub pixel being headed toward viewpoints $A_1$ to $A_9$ in an observation area located on the right side.

FIG. 5 is a schematic diagram illustrating conditions to be satisfied for light emitted from a sub pixel being headed toward viewpoints $A_1$ to $A_9$ in an observation area located on the right side.

The conditions for configuring light that is transmitted through the sub pixels $12_{(m-4,n)}, 12_{(m-3,n)}, \ldots, 12_{(m+4,n)}$ from the opening portion $31_{p-1}$ to travel toward the viewpoints $A_1$, $A_2, \ldots, A_9$ of the observation area $WA_R$ located on the right side will be considered.

A virtual line that passes through the center of the opening portion $31_{p-1}$ and extends in the Z direction is used as a reference, a distance up to the center of the sub pixel $12_{(m-4,n)}$ is denoted by a symbol X3, and a distance up to a viewpoint $A_1$ of the observation area $WA_R$ located on the right side is denoted by a symbol X4. When light is transmitted through the sub pixel $12_{(m-4,n)}$ from the opening portion $31_{p-1}$ and travels toward the viewpoint $A_1$ of the observation area $WA_R$, based on the geometric similarity relationship, the condition represented in the following Equation (2) is satisfied.

$$Z1:X3=(Z1+Z2):X4 \qquad (2)$$

Here, $X3=RD-X1=RD-4 \times ND$ and $X4=RD+5 \times DP$, and accordingly, when these are reflected, Equation (2) is represented as the following Equation (2').

$$Z1:(RD-4 \times ND)=(Z1+Z2):(RD+5 \times DP) \qquad (2')$$

It is apparent in a geometrical sense that, when the above-described Equation (2') is satisfied, light that is transmitted through the sub pixels $12_{(m-3,n)}, 12_{(m-2,n)}, \ldots, 12_{(m+4,n)}$ from the opening portion $31_{p+1}$ travels toward the viewpoints $A_2$, $A_3, \ldots, A_9$ of the observation area $WA_R$.

The conditions for configuring light that is transmitted through the sub pixels $12_{(m-4,n)}, 12_{(m-3,n)}, \ldots, 12_{(m+4,n)}$ from the opening portion $31_{p+1}$ to travel toward the viewpoints $A_1$, $A_2, \ldots, A_9$ of the observation area $WA_L$ located on the left side are similar to those in a case where FIG. 5 is reversed with respect to the Z axis as its center, and thus the description thereof will be omitted.

The values of the distance Z2 and the distance DP are set to predetermined values based on the specifications of the autostereoscopic image display device 1. In addition, the value of the sub pixel pitch ND is set based on the structure of the image display unit 10. By using Equation (1') and Equation (2'), the following Equation (3) and Equation (4) relating to the distance Z1 and the opening portion pitch RD are acquired.

$$Z1=Z2 \times ND/(DP-ND) \qquad (3)$$

$$RD=9 \times DP \times ND/(DP-ND) \qquad (4)$$

For example, when the sub pixel pitch ND of the image display unit 10 is 0.175 [mm], the distance Z2 is 3000 [mm], and the distance DP is 65.0 [mm], the distance Z1 is about 8.10 [mm], and the opening portion pitch RD is about 1.58 [mm]

In addition, in a case where it is set such that an image observer observes and acquires an image at a different viewpoint when moving by a distance that is about a half of the distance between both eyes, the value of the distance DP may be set to a half value. When the distance DP is 32.5 [mm], the distance Z1 is about 16.2 [mm], and the opening portion pitch RD is about 1.58 [mm]

In the autostereoscopic image display device 1, the image display unit 10 and the optical splitting unit 30 are maintained to be separated from each other by the above-described distance Z1 by using a spacer or the like that is not illustrated in the figure.

In addition, the distance between the light emitting face 21 of the illumination unit 20 and the optical splitting unit 30 is not particularly limited and may be set to an appropriate value according to the specifications of the autostereoscopic image display device 1.

In the above-described example, the value of the opening portion pitch RD is about nine times the value of the sub pixel pitch ND. Accordingly, "M" and "P" described above have the relationship of M≈P×9.

The distance Z1 and the opening portion pitch RD are set so as to satisfy the above-described conditions, and images for predetermined viewpoints can be observed at the viewpoints $A_1, A_2, \ldots, A_9$ of the observation areas $WA_L$, $WA_C$, and $WA_R$.

Figure 6:
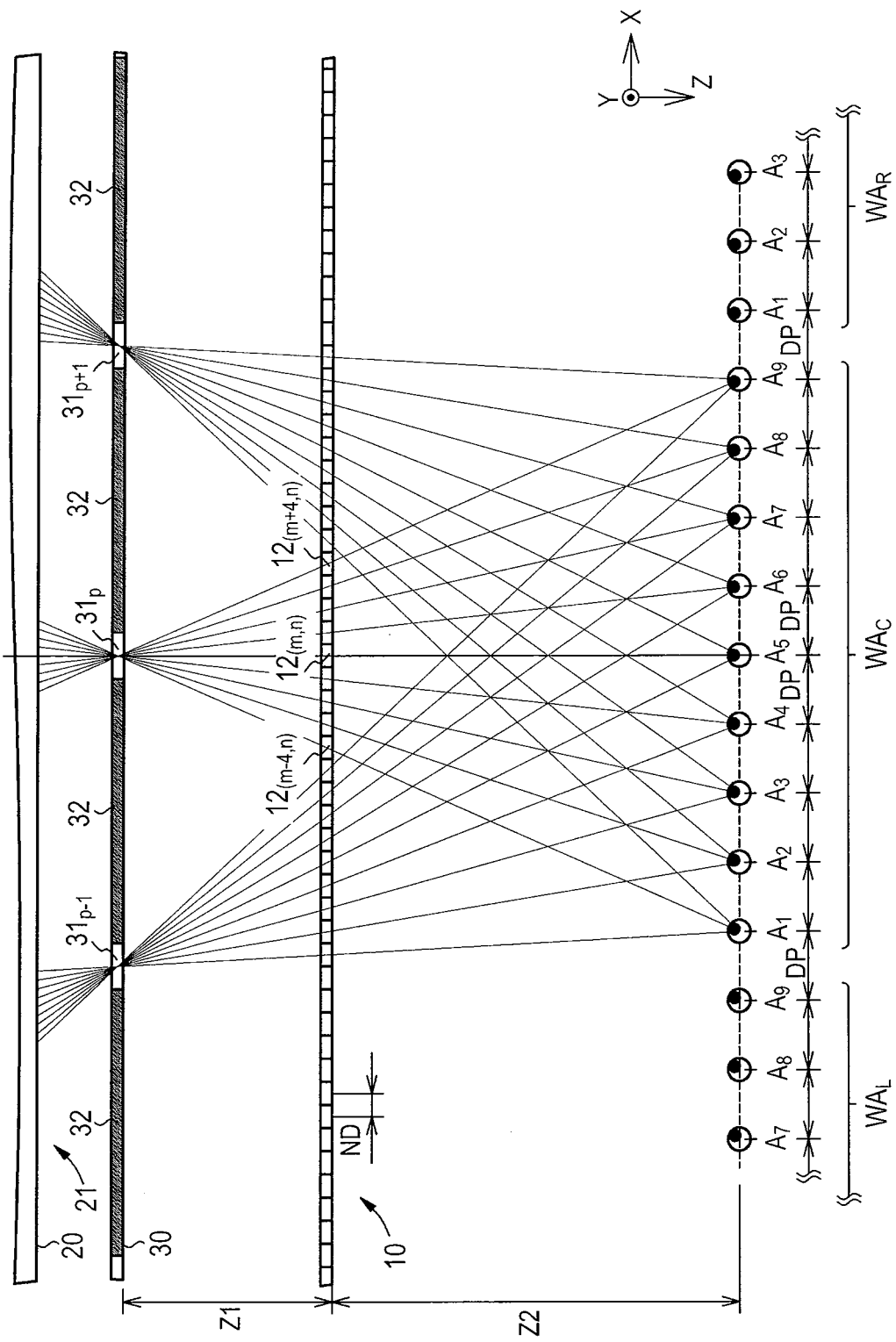
FIG. 6 is a schematic diagram illustrating images observed at the viewpoints $A_1$ to $A_9$ in the observation area located at the center.
Figure 7:
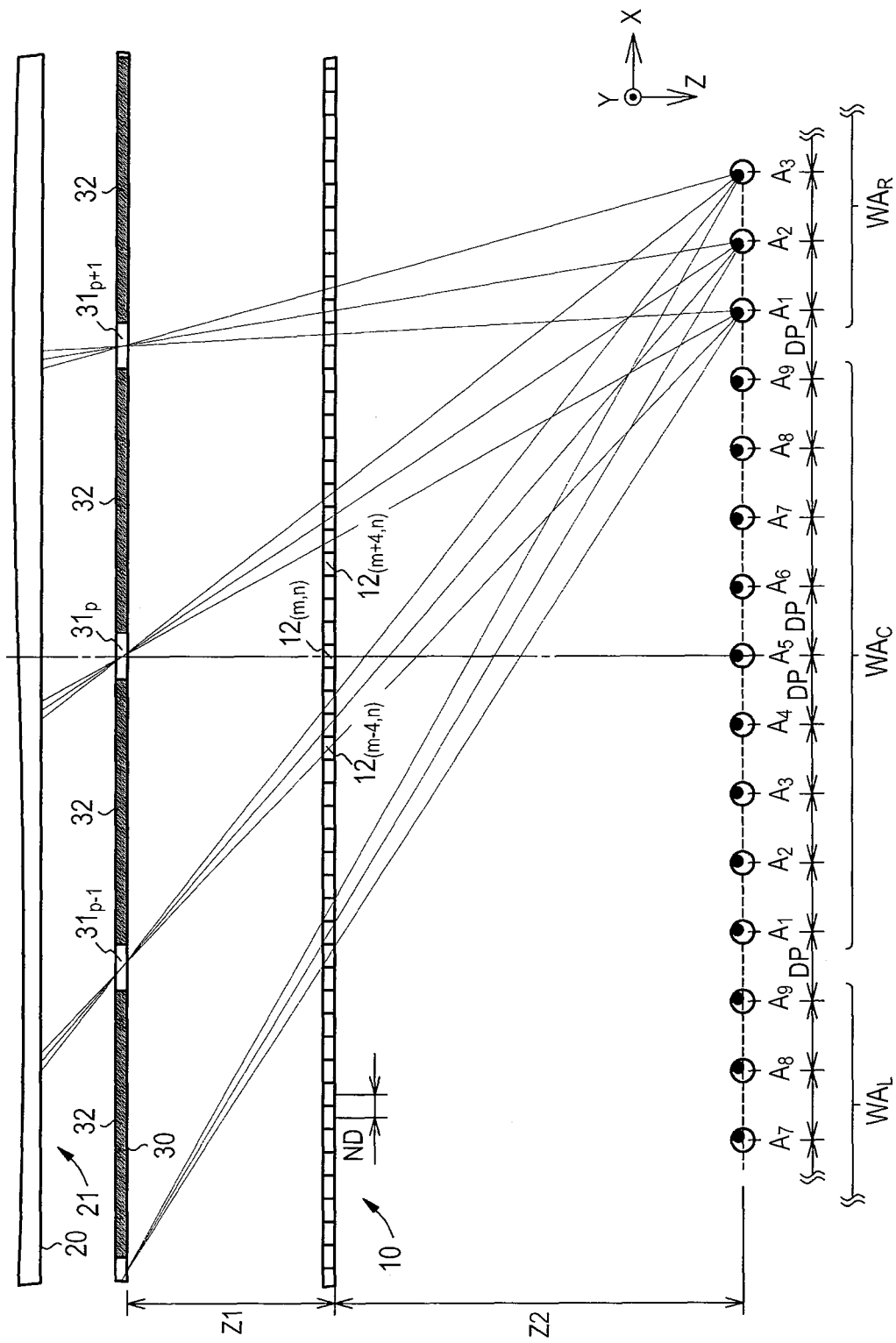
FIG. 7 is a schematic diagram illustrating images observed at the viewpoints $A_1$ to $A_9$ in the observation area located on the right side.

FIG. 6 is a schematic diagram illustrating images observed at the viewpoints $A_1$ to $A_9$ in the observation area located at the center. FIG. 7 is a schematic diagram illustrating images observed at the viewpoints $A_1$ to $A_9$ in the observation area located on the right side.

As described with reference to FIG. 2, the opening portion 31 corresponding to the sub pixel 12 in the (n+1)-th row is arranged so as to be shifted from the opening portion 31 corresponding to the sub pixel 12 in the n-th row by a distance approximately corresponding to the pitch of the sub pixels 12 in the −X direction. Accordingly, for description of the sub pixel 12 in the (n+1)-th row, in the description presented above, "n" is replaced with "n+1", and "m" is replaced with "m−1". In addition, for description of the sub pixel 12 in the (n−1)-th row, in the description presented above, "n" is replaced with "n−1", and "m" is replaced with "m+1".

Figure 9:
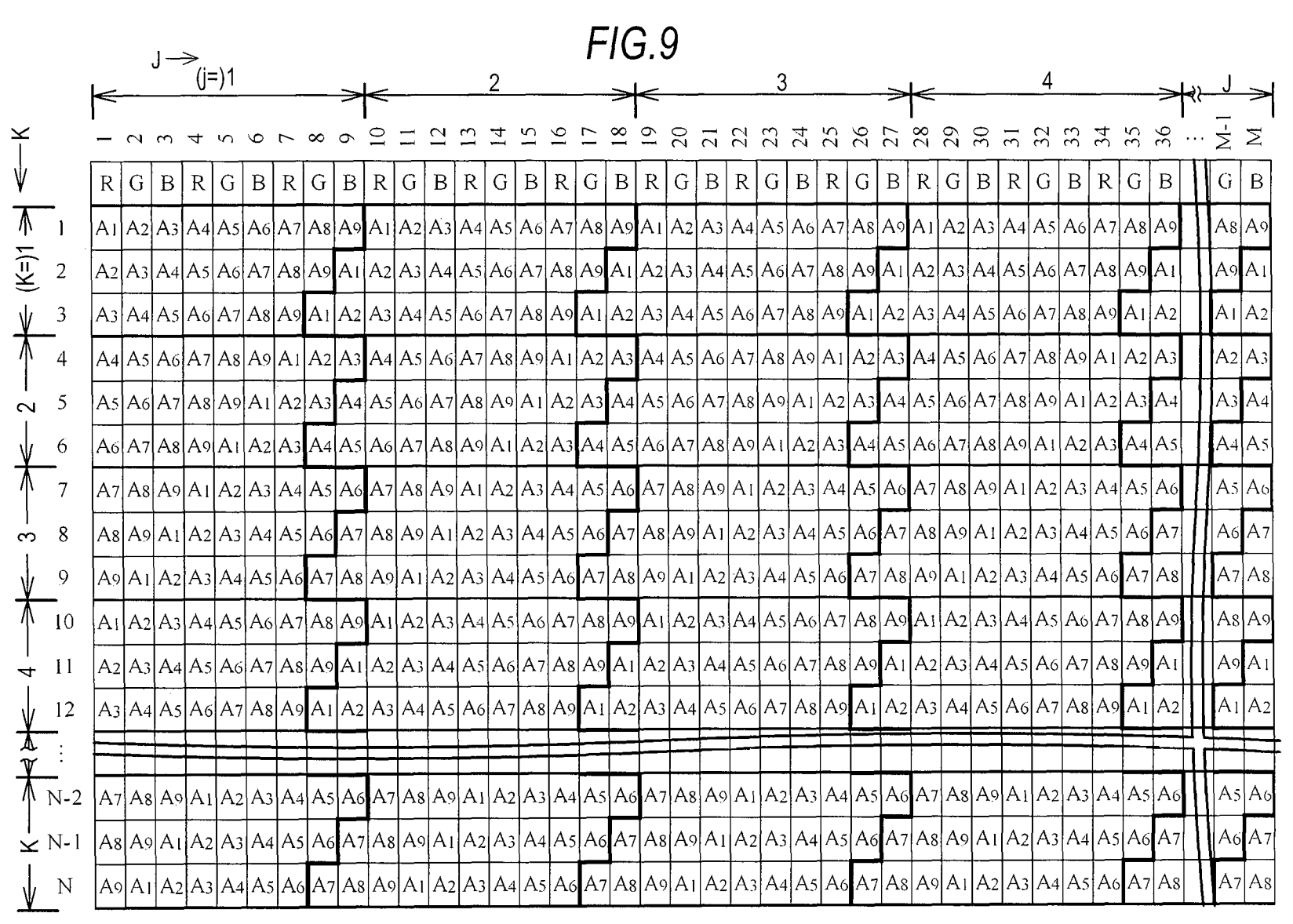

Accordingly, when focusing on the sub pixels 12 in three rows adjacent to each other, the sub pixels through which light traveling toward a specific viewpoint is transmitted, as illustrated in FIG. 9 to be described later, are arranged so as to be deviated by one sub pixel for each row. The pixels configuring an image for each viewpoint is configured by a set of sub pixels 12 over three rows.

FIG. 8 is a schematic plan view of parts of an optical splitting unit and a display area for illustrating sub pixels that configure a pixel of an image for each viewpoint in the autostereoscopic image display device used in each embodiment.

In a case where the n-th row is positioned at the center of the rows configuring a pixel, in FIG. 8, a set of symbols R, G, and B enclosed by circles, a set of symbols R, G, and B enclosed by squares, and a set of symbols R, G, and B enclosed by octagons respectively form one pixel. Accordingly, when the number of pixels for each viewpoint is represented as a total of J×K pixels including J pixels in the horizontal direction and K pixels in the vertical direction, J=M/9 and K=N/3. In a case where M=5760, N=1080, J×K=640×360. Hereinafter, the relationship between pixels configuring an image for each viewpoint and the sub pixels of the image display unit will be described with reference to FIGS. 9 to 12B.

FIG. 9 is a table illustrating viewpoints for which light emitted from (1, 1)-th to (M, N)-th sub pixels is headed.

First, pixels that configure an image observed at the viewpoint $A_4$ will be considered. The image observed at the viewpoint $A_4$ is configured by sub pixels to which a reference numeral $A_4$ is attached in FIG. 9. As described above, pixels that configure an image for each viewpoint are configured by a set of sub pixels 12 over three rows. The pixels that configure the image observed at the viewpoint $A_4$ are denoted by a symbol 412, and the pixel 412 positioned in the j-th column (here, j=1, 2, . . . , J) and the k-th row (here, k=1, 2, . . . , K) is represented as a pixel 412(j,k).

Figure 10:
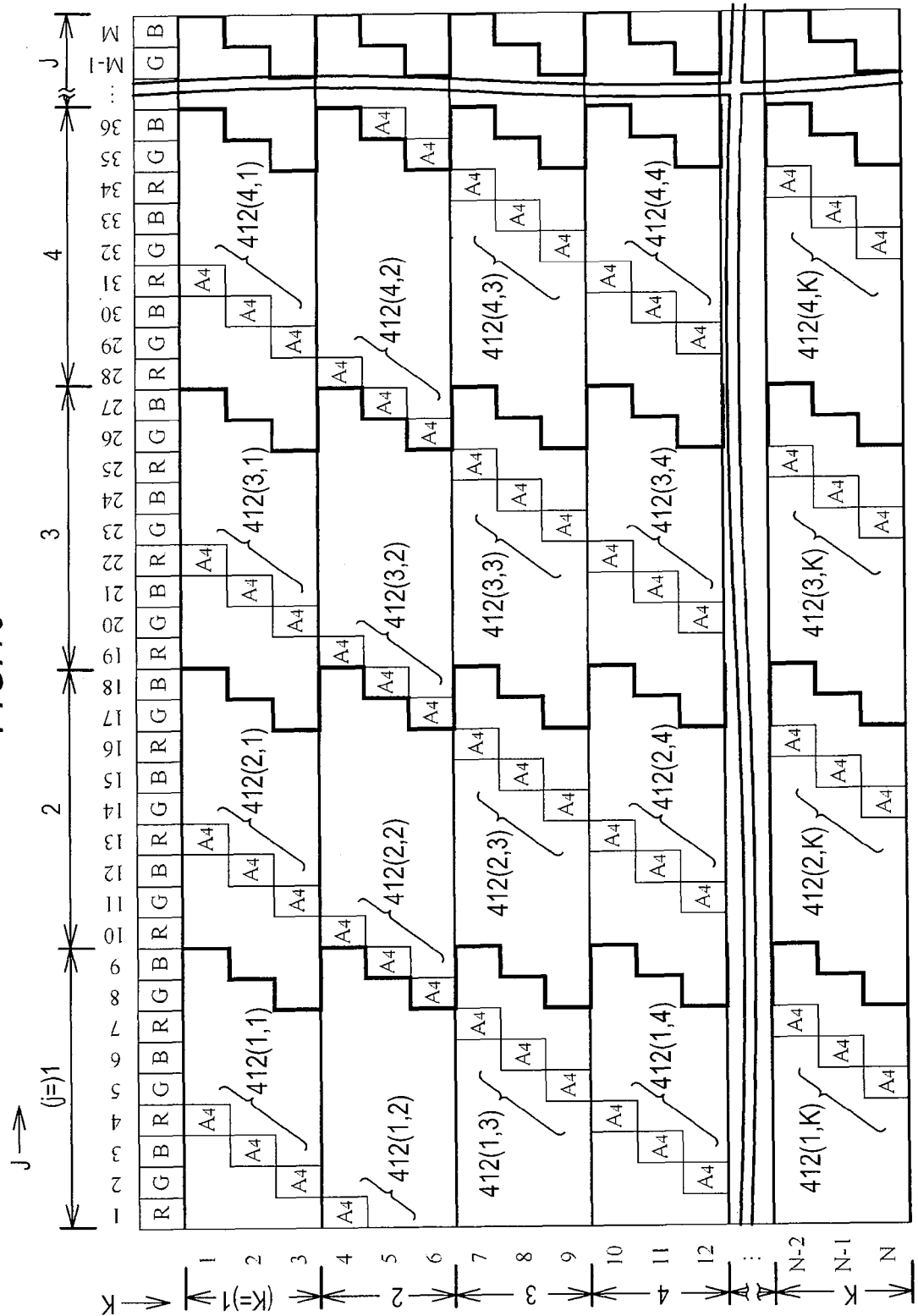
FIG. 10 is a table illustrating the arrangement of sets of sub pixels that configure an image for a viewpoint $A_4$.

FIG. 10 is a table illustrating the arrangement of sets of sub pixels that configure an image for a viewpoint $A_4$.

As illustrated in FIG. 10, when focusing on the arrangement of the pixels 412 in the horizontal direction, one pixel 412 is arranged for every sub pixels 12 of nine columns, and the number of the pixels 412 in the horizontal direction is J. On the other hand, when focusing on the arrangement in the vertical direction, one pixel 412 is arranged for every sub pixels 12 of three rows, and the number of the pixels 412 in the vertical direction is K. Accordingly, J×K pixels 412 are arranged in a two-dimensional matrix pattern, and the image observed at the viewpoint $A_4$ is configured by the pixels 412.

Next, pixels that configure an image observed at the viewpoint $A_5$ will be considered. The image observed at the viewpoint $A_5$ is configured by sub pixels to which a reference numeral $A_5$ is attached in FIG. 9. The pixels that configure the image observed at the viewpoint $A_5$ are denoted by a symbol 512, and the pixel 512 positioned in the j-th column and the k-th row is represented as a pixel 512(j,k).

Figure 11:
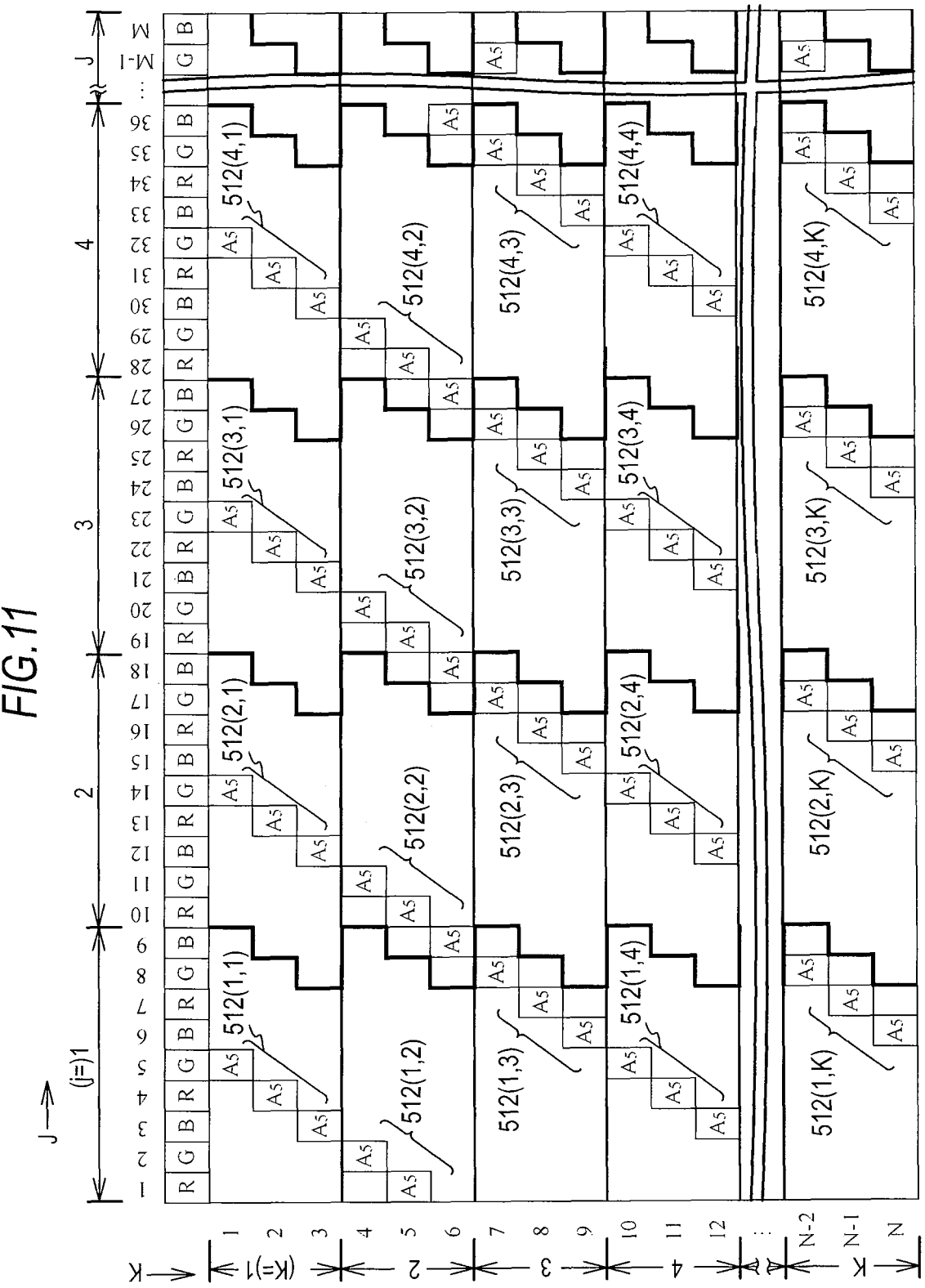
FIG. 11 is a table illustrating the arrangement of sets of sub pixels that configure an image for a viewpoint $A_5$.
Figure 12A:
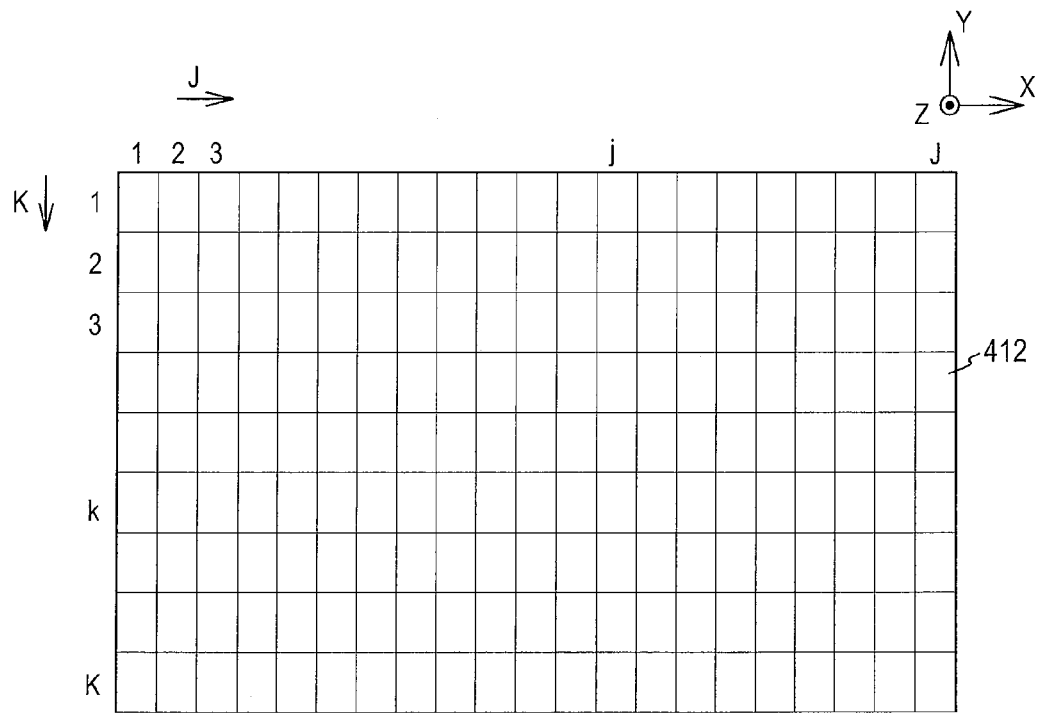
FIG. 12A is a schematic plan view illustrating the arrangement of pixels that configure an image observed at a viewpoint $A_4$.
Figure 12B:
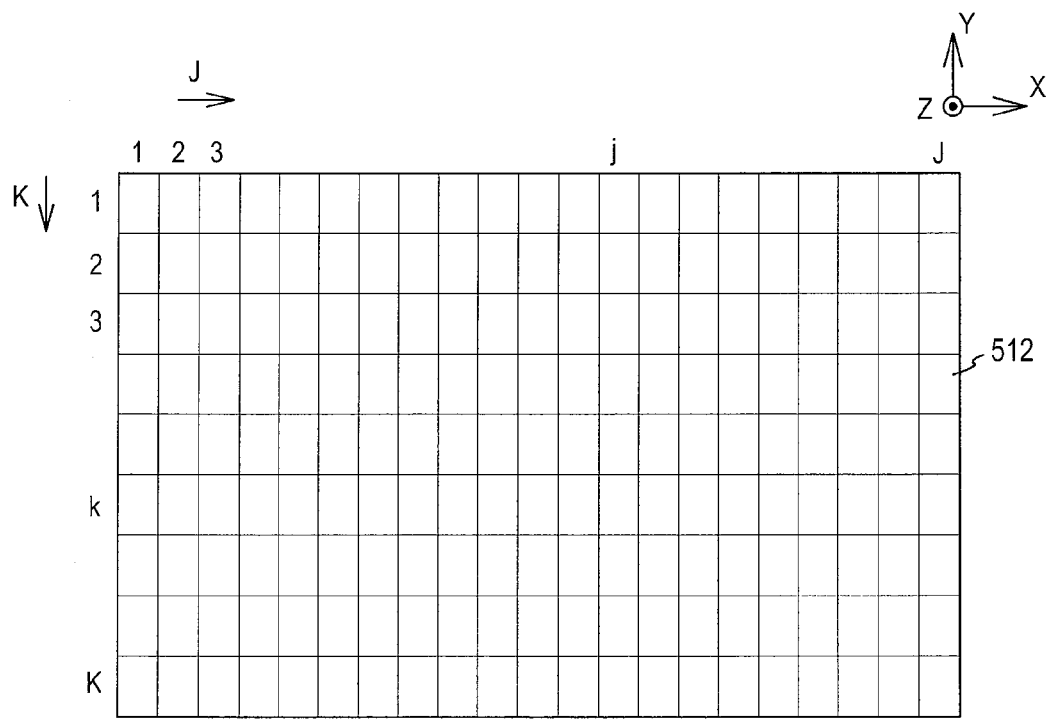
FIG. 12B is a schematic plan view illustrating the arrangement of pixels that configure an image observed at a viewpoint $A_5$.

FIG. 11 is a table illustrating the arrangement of sets of sub pixels that configure the image for the viewpoint $A_5$.

As described with reference to FIG. 10 for the pixel 412, in the horizontal direction, one pixel 512 is arranged for every sub pixels 12 of nine columns, and the number of the pixels 512 is J. In addition, in the vertical direction, one pixel 512 is arranged for every sub pixels 12 of three rows, and the number of the pixels 512 is K. Accordingly, J×K pixels 512 are arranged in a two-dimensional matrix pattern, and the image observed at the viewpoint $A_5$ is configured by the pixels 512.

As described above, the image observed at the viewpoint $A_4$ is configured by J×K pixels 412, and the image observed at the viewpoint $A_5$ is configured by J×K pixels 512. Accordingly, a schematic plan view of the arrangement of the pixels configuring the image observed at the viewpoint $A_4$ and a schematic plan view of the arrangement of the pixels configuring the image observed at the viewpoint $A_5$ are represented as FIGS. 12A and 12B.

The pixels that configure an image observed at any other viewpoint are similar to those described above while the combination of sub pixels configuring the pixel is different from that described above. Accordingly, the description of such pixels and the arrangement thereof will be omitted. In the description presented below, the pixels configuring an image observed at the viewpoint $A_1$, the pixels configuring an image observed at the viewpoint $A_2$, the pixels configuring an image observed at the viewpoint $A_8$, and the pixels configuring an image observed at the viewpoint $A_9$ may be denoted by pixels 112, pixels 212, pixels 812, and pixels 912.

The relationship between the pixels that configure an image for each viewpoint and the sub pixels of the image display unit has been described. Next, multiple viewpoint image display data used for displaying a multiple viewpoint image on the image display unit will be described.

Figure 13:
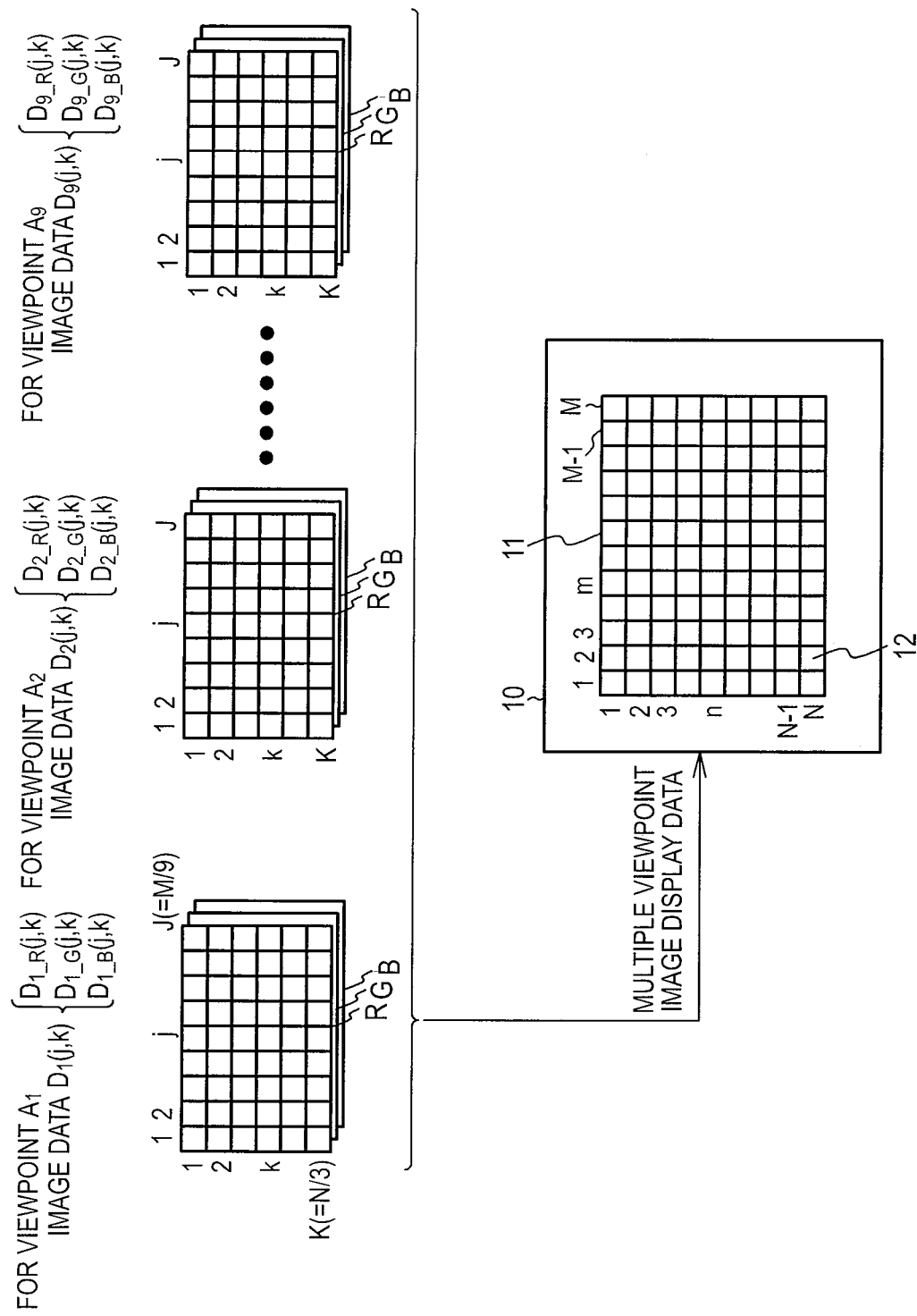
FIG. 13 is a schematic diagram illustrating a method of generating multiple viewpoint image display data based on image data $D_1$ to $D_9$ corresponding to the viewpoints $A_1$ to $A_9$.

FIG. 13 is a schematic diagram illustrating a method of generating multiple viewpoint image display data based on image data $D_1$ to $D_9$ corresponding to the viewpoints $A_1$ to $A_9$.

As illustrated in FIG. 13, the image data $D_1$ is configured by a set of image data $D_{1\_R}$ for a red light emitting pixel, image data $D_{1\_G}$ for a green light emitting pixel, and image data $D_{1\_B}$ for a blue light emitting pixel. Any other image data $D_2$ to $D_9$ is similarly configured.

The data $D_{1\_R}$, $D_{1\_G}$, or $D_{1\_B}$ is J×K sets of data corresponding to the number of pixels of the image for each viewpoint. The image data $D_{1\_R}$, $D_{1\_G}$, or $D_{1\_B}$ corresponding to a pixel positioned in the j-th column and the k-th row may be denoted by image data $D_{1\_R}(j,k)$, $D_{1\_G}(j,k)$, or $D_{1\_B}(j,k)$. In addition, data of these three types may be collectively denoted by image data $D_1(j,k)$. Any other image data $D_2$ to $D_9$, weighted image data $D_{WG}$, and data $D_S$, $D_{S1}$, $D_{S2}$, $D_{C1}$, $D_{C2}$, and $D_{av}$ to be described later may be similarly denoted.

Figure 14:
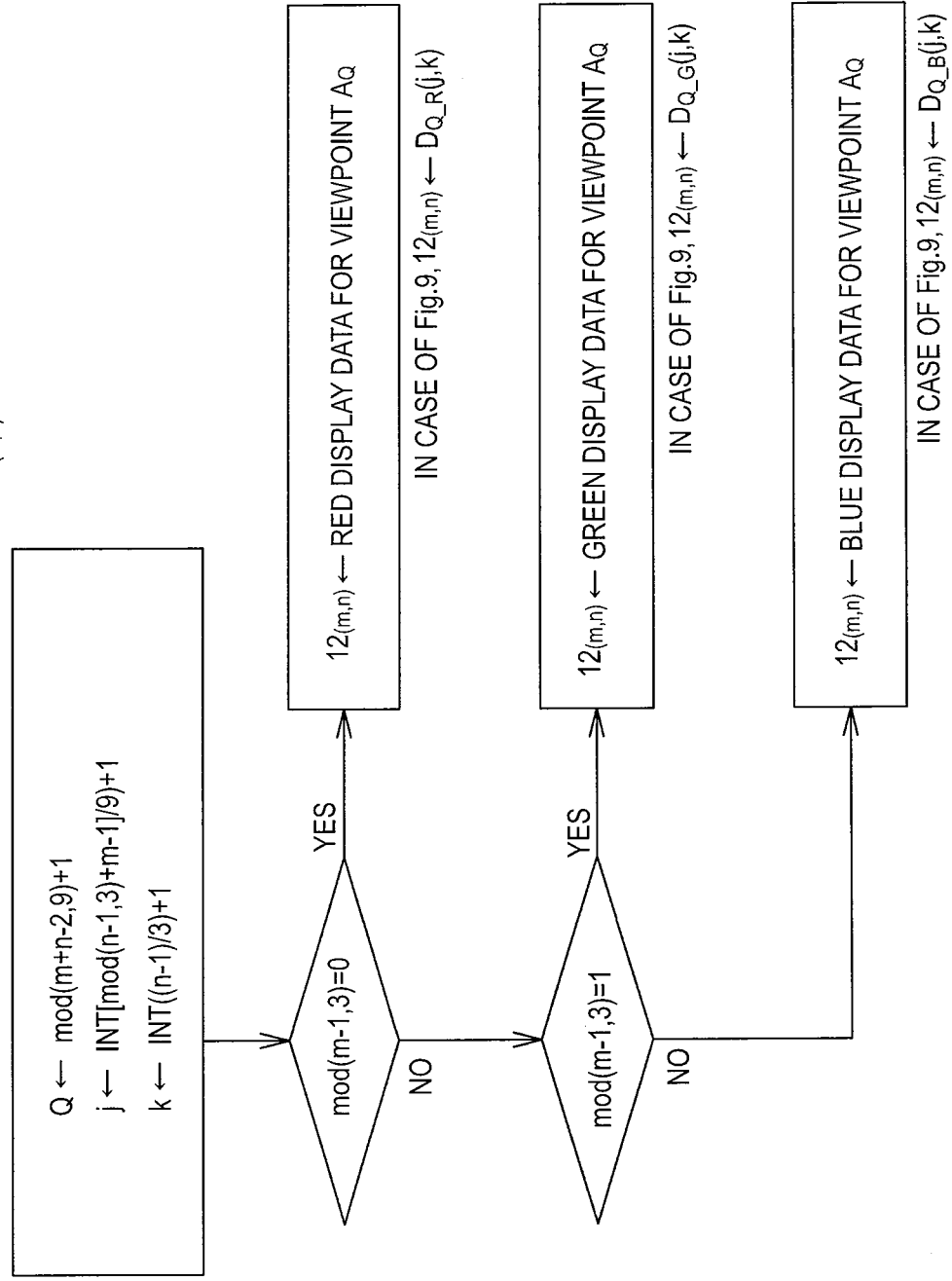
FIG. 14 is a schematic flowchart illustrating a method of selecting image data corresponding to a sub pixel $12_{(m,n)}$ positioned in the m-th column and the n-th row.

FIG. 14 is a schematic flowchart illustrating a method of selecting image data corresponding to a sub pixel $12_{(m,n)}$ positioned in the m-th column and the n-th row.

The driving unit 100 illustrated in FIG. 1 selects image data corresponding to the sub pixel $12_{(m,n)}$ and generates a multiple viewpoint image display data based on the flowchart illustrated in FIG. 14 and drives the display unit based on the data. The method of selecting data will be described with reference to FIG. 14.

As illustrated in FIG. 9, in the autostereoscopic image display device 1 according to the embodiment of the present disclosure, in the sub pixels 12 positioned in the first row of the image display unit 10, light beams of the first to ninth column sub pixels 12 are configured to be headed for the viewpoints $A_1$ to $A_9$, and the same configuration is repeated for the tenth sub pixels 12 and after that. In addition, as described above, the sub pixels 12 through which a light beam headed for a specific viewpoint is transmitted are arranged so as to be deviated by one sub pixel for each row.

Thus, when the viewpoint for which light emitted from the sub pixel $12_{(m,n)}$ positioned in the m-th column and the n-th row is headed is denoted by a viewpoint $A_Q$ (here, "Q" is one integer in the range of one to nine), and the remainder when a dividend is divided by a divisor is denoted by "mod (dividend, divisor)", the value of Q is given as in the following Equation (5).

$$Q=\mathrm{mod}\ (m+n-2,\ 9)+1 \tag{5}$$

Figure 15:
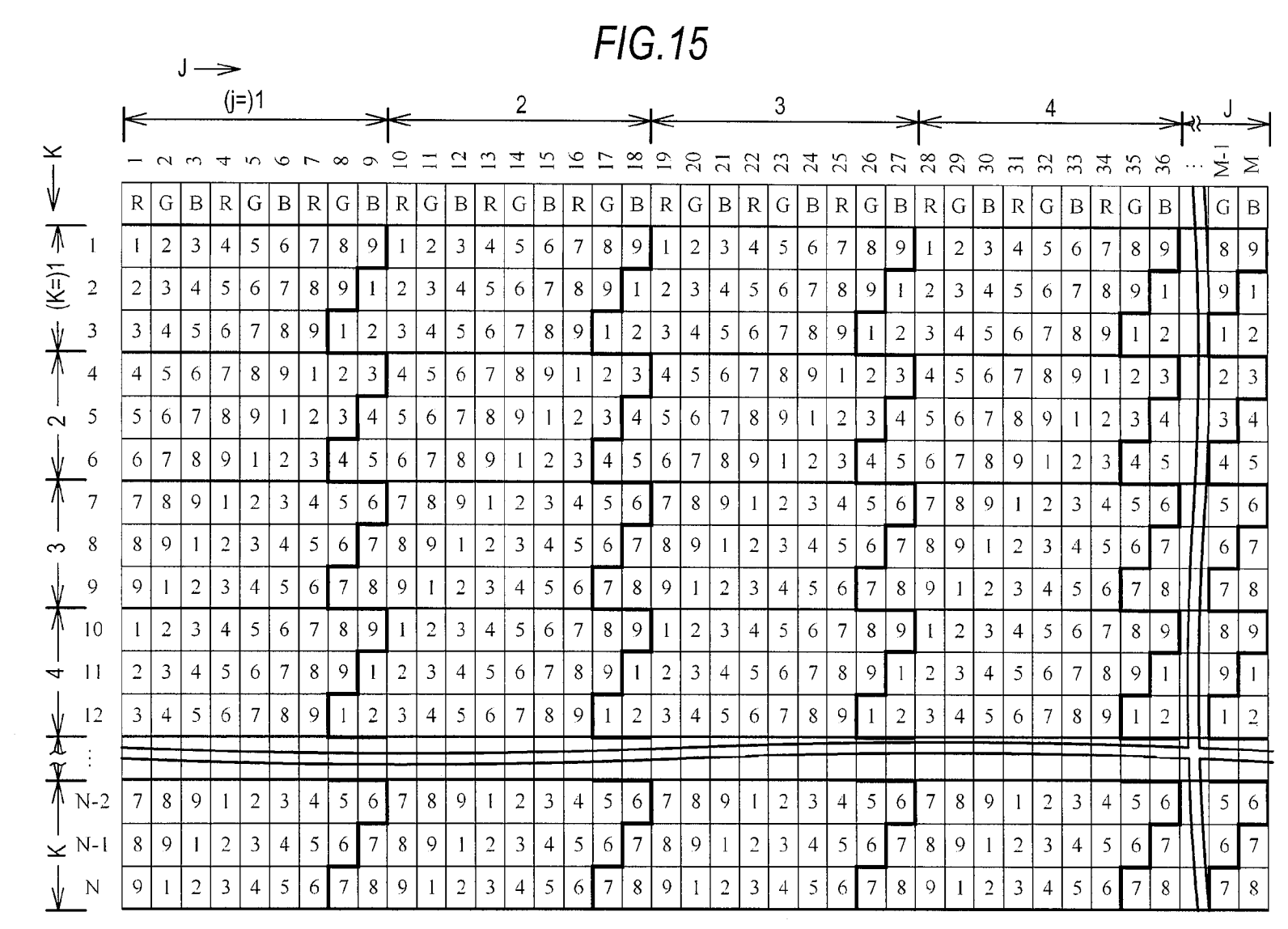

In FIG. 15, the values of "Q" at the viewpoint $A_Q$ for which the light beams emitted from the (1, 1)-th sub pixel to the (M, N)-th sub pixel are headed for, which are calculated by using Equation (5) described above, are shown.

In addition, when the sub pixel $12_{(m,n)}$ positioned in the m-th column and the n-th row is one of sub pixels that configure the pixel positioned in the j-th column (here, j=1, 2, . . . , J) and the k-th row (here, k=1, 2, . . . , K) of an image for the viewpoint $A_Q$, the values of "j" and "k" are given in the following Equation (6) and Equation (7). In Equation (6) and Equation (7), "INT" is a function that rounds an argument down to the nearest integer.

$$j=\mathrm{INT}([\mathrm{mod}\ (n-1,\ 3)+m-1]/9)+1 \tag{6}$$

$$k=\mathrm{INT}((n-1)/3)+1 \tag{7}$$

Figure 16:
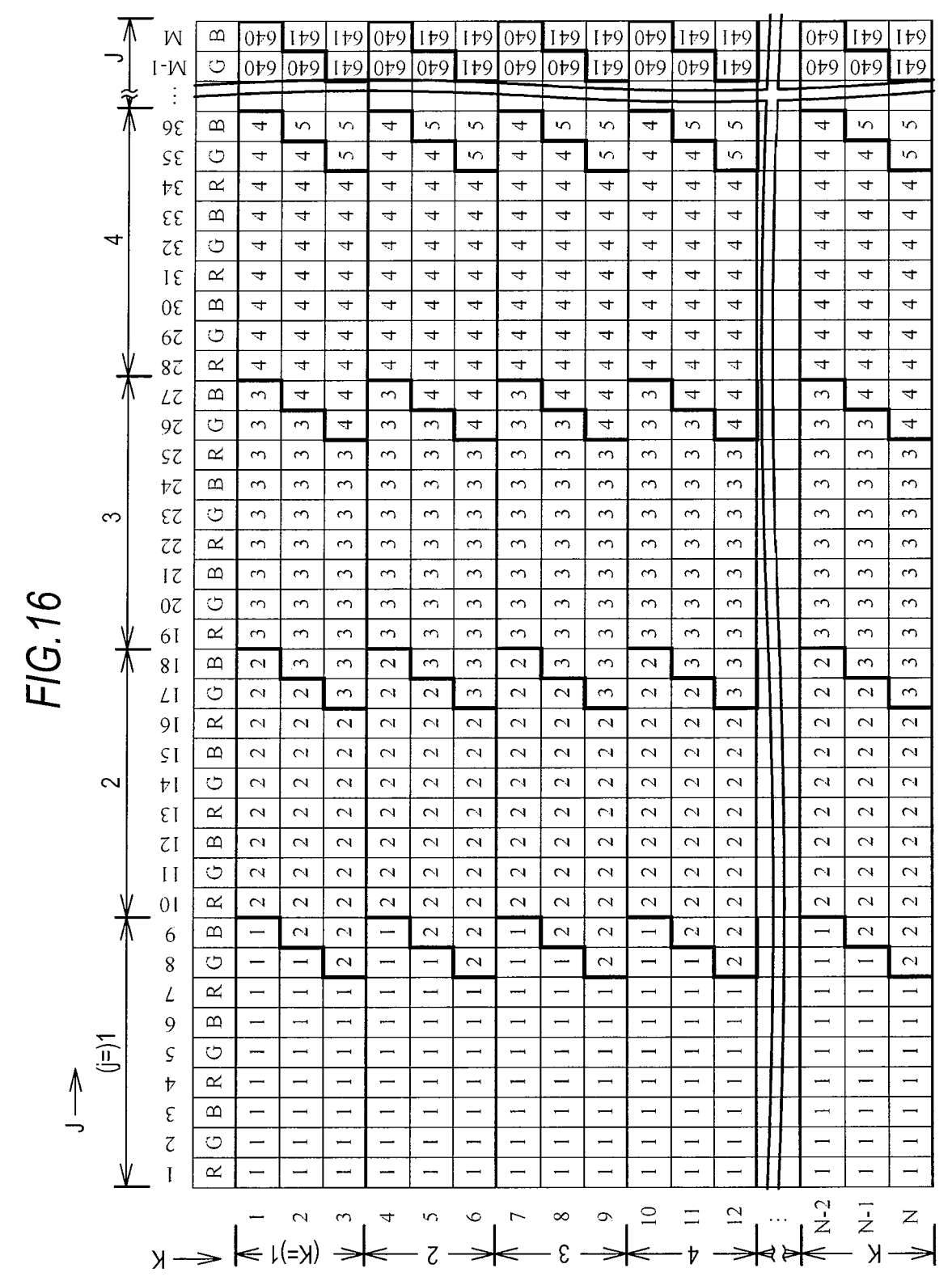
Figure 17:
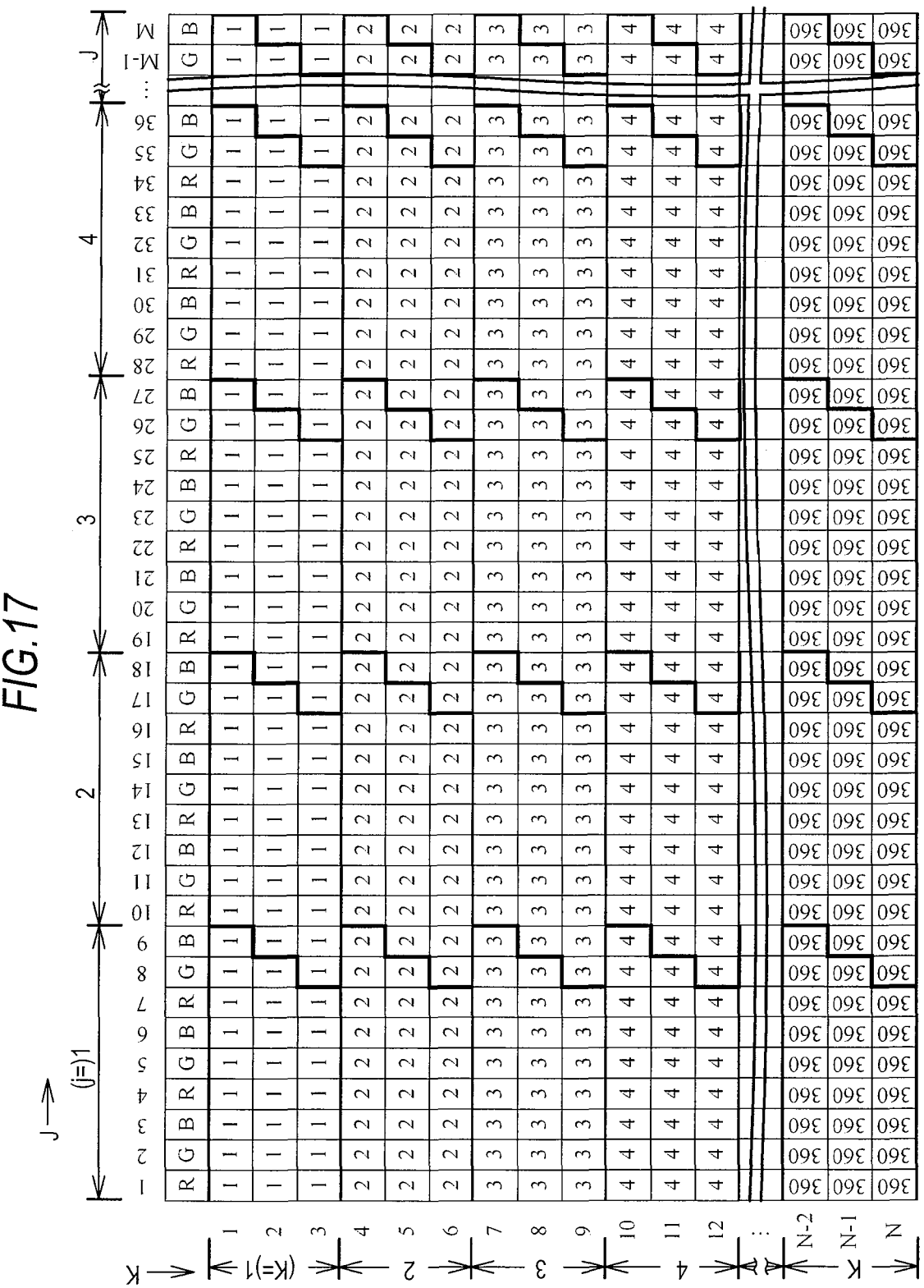
FIG. 17 is a table illustrating the value of "k" corresponding to the (1, 1)-th sub pixel to the (M, N)-th sub pixel.

In FIG. 16, the values of "j" corresponding to the (1, 1)-th sub pixel to the (M, N)-th sub pixel, which are calculated by using Equation (6) described above, are illustrated. In addition, in FIG. 17, the values of "k" corresponding to the (1, 1)-th sub pixel to the (M, N)-th sub pixel, which are calculated by using Equation (7) described above, are illustrated.

The m-th-column sub pixel is a red light emitting sub pixel in a case where the remainder when "m−1" is divided by 3 is 0, a green light emitting sub pixel in a case where the remainder is 1, and a blue light emitting sub pixel in a case where the remainder is 2.

Accordingly, red display data for the viewpoint $A_Q$ corresponds to the sub pixel $12(m,n)$ positioned in the m-th column and the n-th row in a case where mod (m−1, 3)=0, green display data for the viewpoint $A_Q$ corresponds thereto in a case where mod (m−1, 3)=1, and blue display data for the viewpoint $A_Q$ corresponds thereto in a case where mod (m−1, 3)=2.

When the alleviation of a reverse view is not performed, the image data $D_1$ to $D_9$ directly corresponds to the viewpoints $A_1$ to $A_9$. On the other hand, in each embodiment, an operation of replacing image data corresponding to some viewpoints with appropriate other data and the like is performed.

For easy understanding, in this paragraph, the selection of data when the alleviation of a reverse view is not performed will be described. When the alleviation of a reverse view is not performed, image data $D_{Q\_R}(j,k)$ corresponds to the sub pixel $12_{(m,n)}$ in a case where mod (m−1, 3)=0, image data $D_{Q\_G}(j,k)$ corresponds thereto in a case where mod (m−1, 3)=1, and image data $D_{Q\_B}(j,k)$ corresponds thereto in a case where mod (m−1, 3)=2.

Since pixels configuring the image for each viewpoint is configured by a set of sub pixels 12 that are diagonally arranged, as illustrated in FIG. 16, in some of the (M−1)-th-column sub pixels 12 and the M-th-column sub pixels 12, "j" exceeds "J" (640 in the embodiment). Since there is no image data corresponding to such sub pixels 12, an exceptional process, for example, for handling j=J or the like may be performed, so that image data corresponds thereto. In addition, a configuration may be employed in which image data for each viewpoint is formed by (J+1)×K sets of data. In such a case, the above-described exceptional process is unnecessary.

By selecting the image data in the above-described order, multiple viewpoint image display data used for displaying a multiple viewpoint image on the image display unit can be generated.

[Operation of Autostereoscopic Image Display Device when Alleviation of Reverse View is not Performed]

Figure 18:
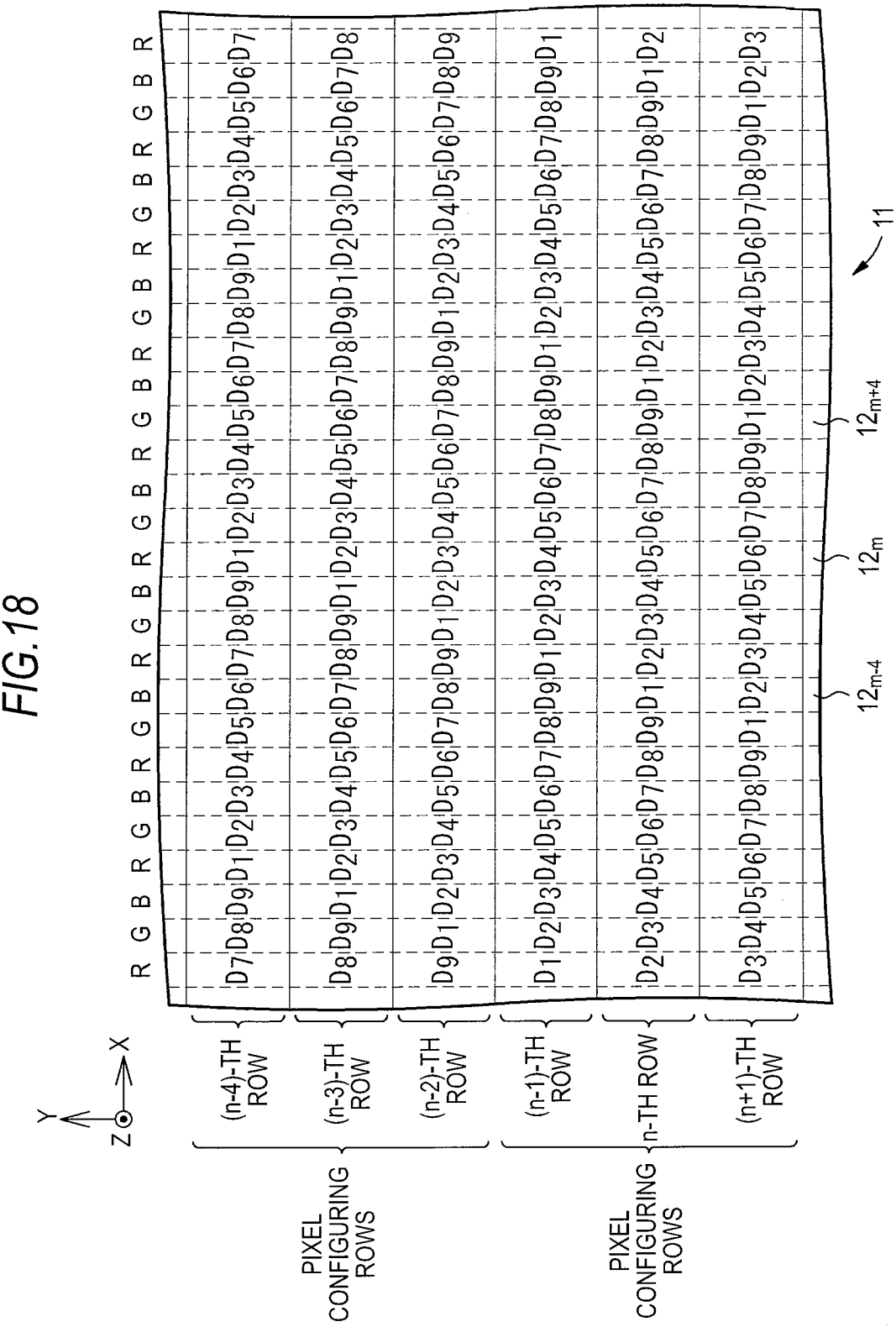
FIG. 18 is a schematic plan view of a part of a display area for illustrating image data displayed on the image display unit when the alleviation of a reverse view is not performed.

FIG. 18 is a schematic plan view of a part of a display area 11 for illustrating image data displayed on the image display unit 10 when the alleviation of a reverse view is not performed.

Symbols $D_1$ to $D_9$ illustrated in FIG. 18 represent the types of image data used for driving each sub pixel 12. In the example illustrated in FIG. 18, the (m, n)-th sub pixel 12 is a red light emitting sub pixel, to which a symbol $D_5$ is attached. To this sub pixel 12, image data $D_{5\_R}(j,k)$ corresponds. The image data corresponding to any other sub pixel may be similarly rephrased through appropriate replacement.

When the left eye and the right eye of an image observer are within one observation area, the image observer recognizes an image as a stereoscopic image. For example, in the observation area $WA_C$ illustrated in FIG. 1, when the left eye and the right eye of an image observer are positioned at the viewpoint $A_4$ and the viewpoint $A_5$, an image observed by the left eye is configured by the sub pixel 12 of which light travels toward the viewpoint $A_4$, and an image observed by the right eye is configured by the sub pixel 12 of which light travels toward the viewpoint $A_5$.

Figure 19:
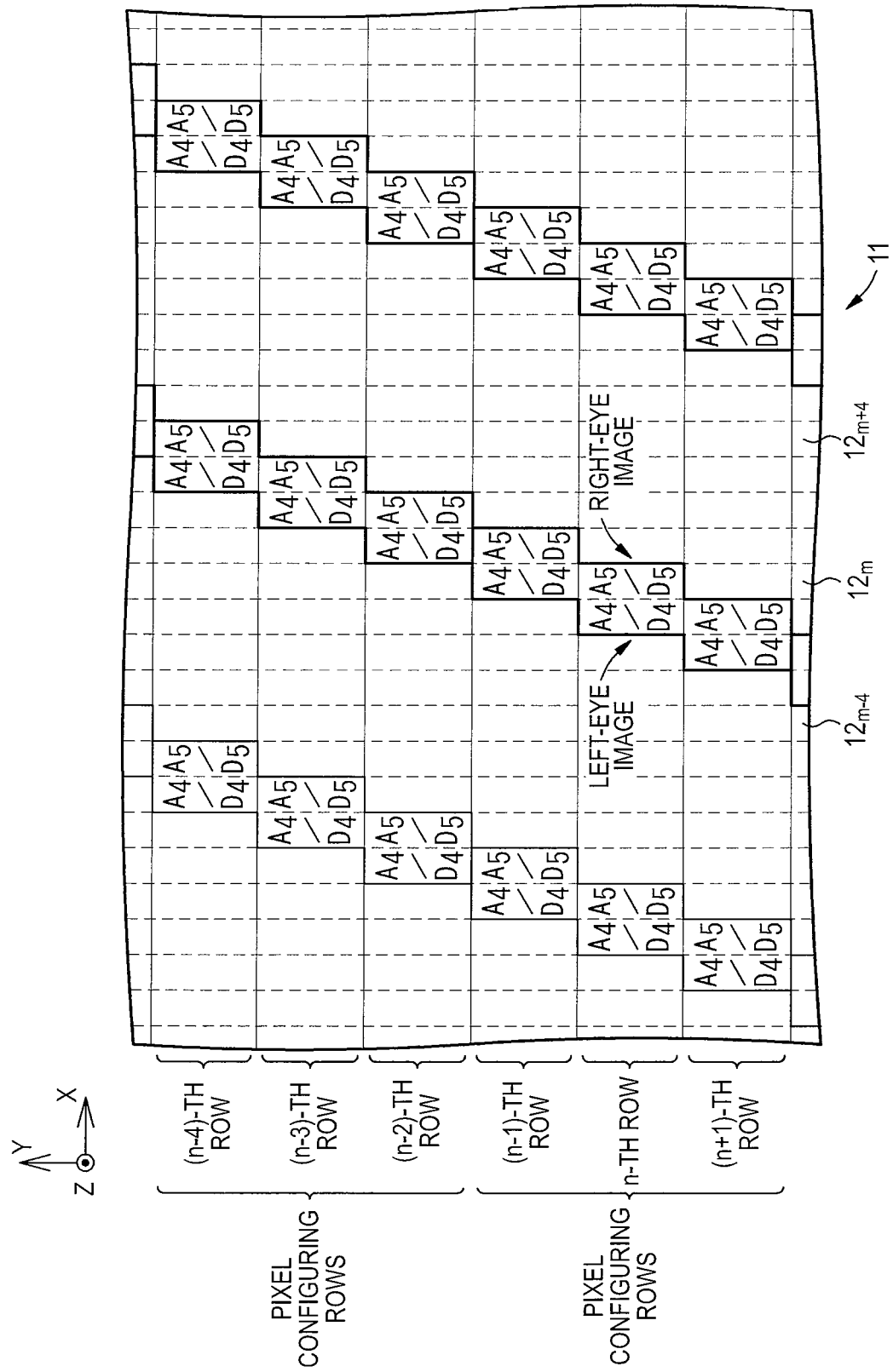
FIG. 19 is a schematic plan view of a part of a display area illustrating pixels configuring an image observed in the left eye and pixels configuring an image observed in the right eye in a case where the viewpoints of the left eye and the right eye of an image observer are positioned at viewpoints $A_4$ and $A_5$.

FIG. 19 is a schematic plan view of a part of the display area illustrating pixels configuring an image observed in the left eye and pixels configuring an image observed in the right eye in a case where the viewpoints of the left eye and the right eye of an image observer are positioned at viewpoints $A_4$ and $A_5$.

Here, symbols $A_4$ and $A_5$ shown in FIG. 19 represent viewpoints for which light from the sub pixel 12 is headed. Since the symbols $D_4$ and $D_5$ have been described with reference to FIG. 18, the description thereof is omitted.

An image observer observes an image configured by the sub pixels driven in accordance with the image data $D_4$ in the left eye, and observes an image configured by the sub pixels driven in accordance with the image data $D_5$ in the right eye.

Figure 20A:
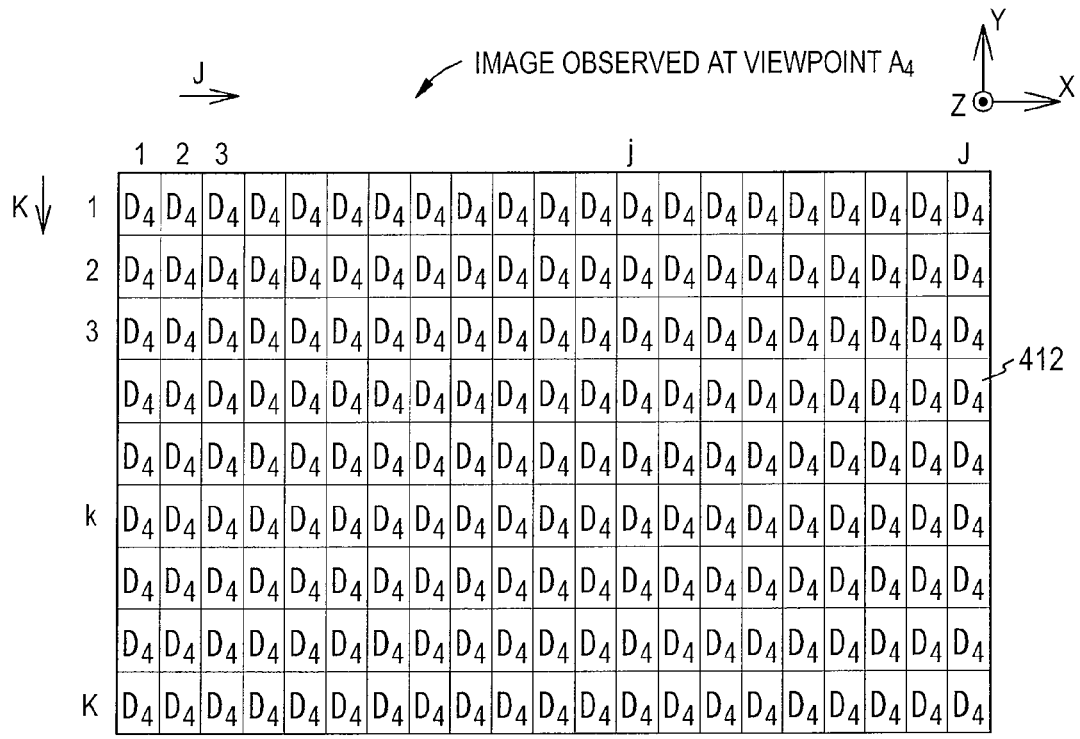
FIG. 20A is a schematic plan view illustrating an image observed in the left eye.
Figure 20B:
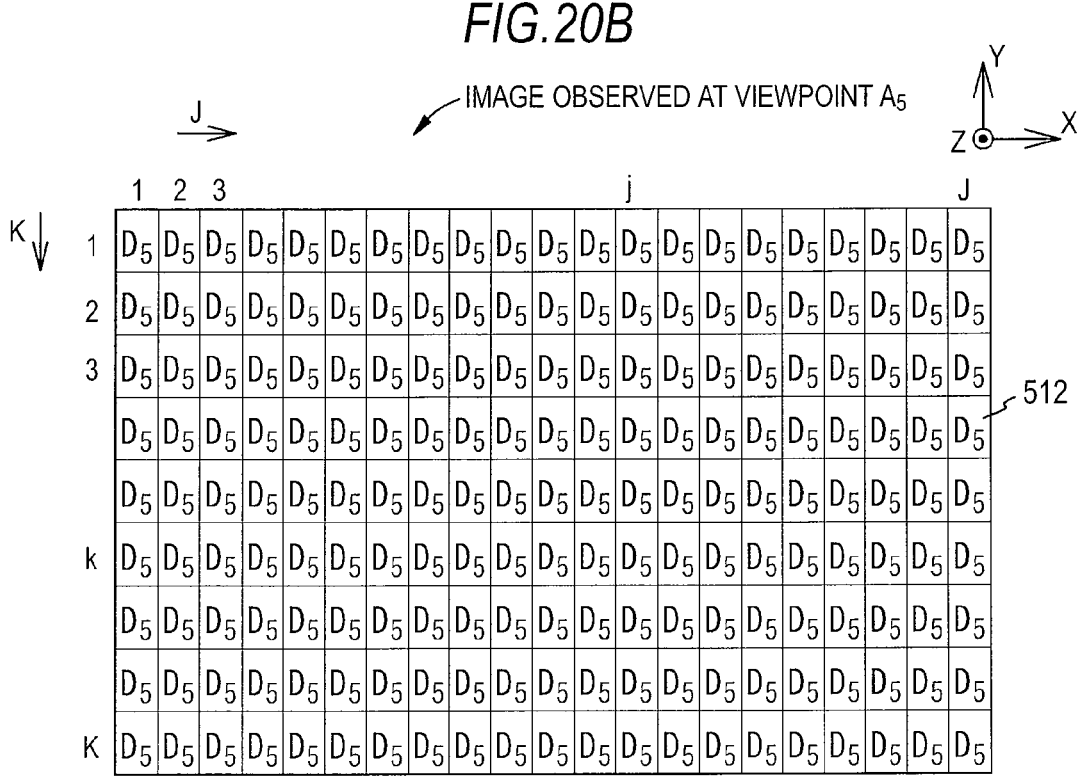
FIG. 20B is a schematic plan view illustrating an image observed in the right eye.

FIG. 20A is a schematic plan view illustrating the image observed in the left eye. FIG. 20B is a schematic plan view illustrating the image observed in the right eye.

An image observer observes an image that is formed by pixels 412 that are based on image data $D_4(1,1)$ to $D_4(J,K)$ in the left eye (see FIG. 20A), and observes an image that is formed by pixels 512 that are based on image data $D_5(1,1)$ to $D_5(J,K)$ in the right eye. The image observer recognizes the images as a stereoscopic image in accordance with parallax between the images.

On the other hand, when the left eye and the right eye of an image observer are positioned within observation areas different from each other, a state called a "reverse view" occurs in which the left-eye image and the right-eye image are seen to be interchanged with each other. The image observer recognizes an image of which the front side and the inner side are reversed so as to feel unnaturalness and discomfort.

For example, in a case where the left eye of the image observer is positioned at the viewpoint $A_9$ of the observation area $WA_L$ shown in FIG. 1, and the right eye is positioned at the viewpoint $A_1$ of the observation area $WA_C$, an image observed by the left eye is configured by sub pixels 12 from which light travels toward the viewpoint $A_9$, and an image observed by the right eye is configured by sub pixels 12 from which light travels toward the view point $A_1$.

FIG. 21 is a schematic plan view of a part of a display area illustrating pixels configuring an image observed in the left eye and pixels configuring an image observed in the right eye in a case where the viewpoints of the left eye and the right eye of an image observer are positioned at viewpoints $A_9$ and $A_1$.

The symbols $A_1$ and $A_9$ shown in FIG. 21 illustrate the view points for which light is headed from the sub pixels. Since the symbols $D_1$ and $D_9$ have been described with reference to FIG. 18, the description thereof is omitted.

The image observer observes the image configured by sub pixels driven in accordance with the image data $D_9$ in the left eye, and observes the image configured by sub pixels driven in accordance with the image data $D_1$ in the right eye.

Figure 22A:
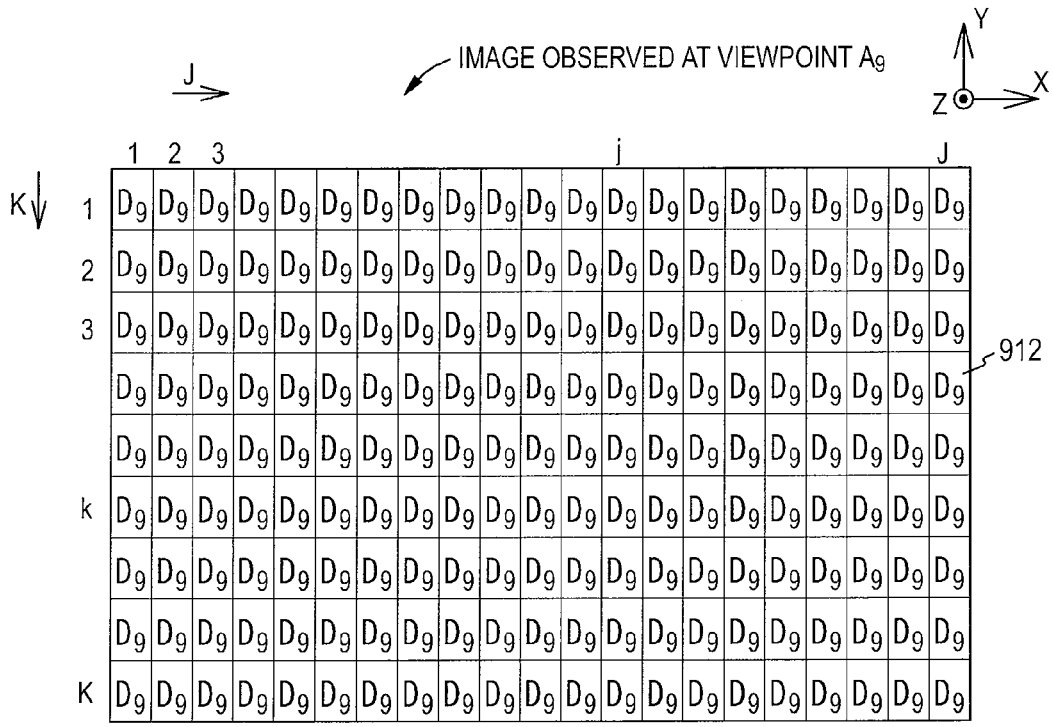
FIG. 22A is a schematic plan view illustrating an image observed in the left eye.
Figure 22B:
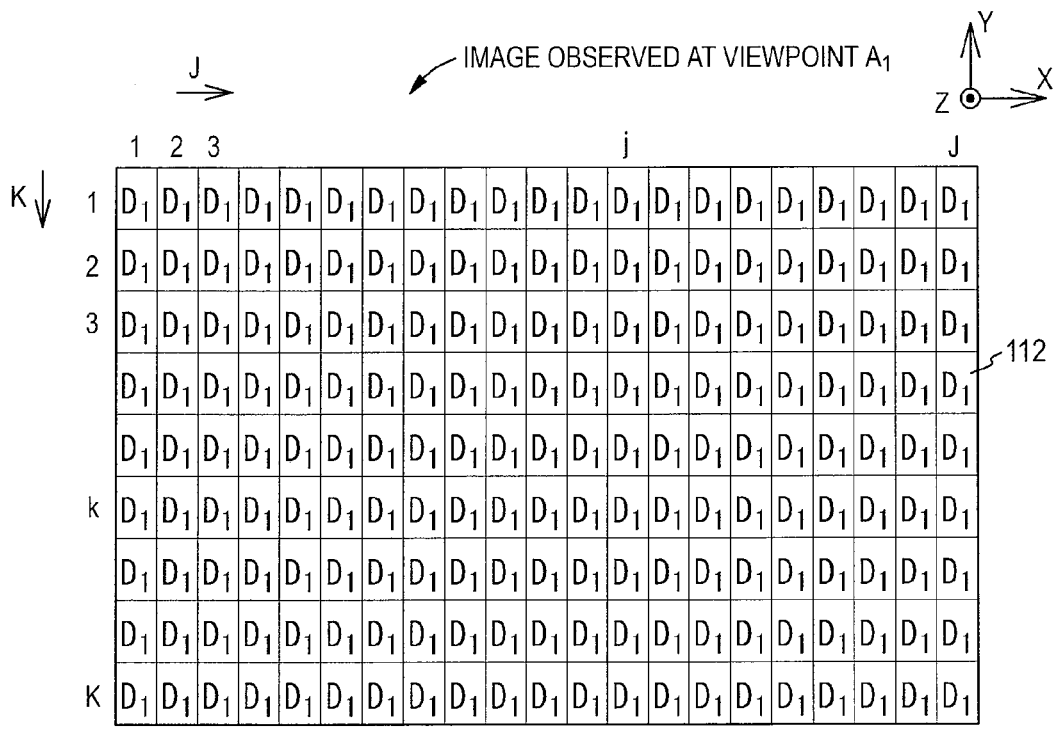
FIG. 22B is a schematic plan view illustrating an image observed in the right eye.

FIG. 22A is a schematic plan view illustrating an image observed in the left eye. FIG. 22B is a schematic plan view illustrating an image observed in the right eye.

The image observer observes an image formed by pixels 912 that are based on the image data $D_9(1,1)$ to $D_9(J,K)$ in the left eye, and observes an image formed by pixels 112 that are based on the image data $D_1(1,1)$ to $D_1(J,K)$ in the right eye. Accordingly, a state called a "reverse view" occurs in which the left-eye image and the right-eye image are observed to be interchanged, whereby the image observer feels unnaturalness and discomfort.

[Embodiment of Reference Example and First Embodiment]

A first embodiment relates to an autostereoscopic image display device according to the present disclosure and a method of driving thereof.

First, for easy understanding, an embodiment of a reference example will be described. In the embodiment of the reference example, both of a pair of images having the relationship of a reversed view near the end portion of the observation area is displayed by using image data for two viewpoints. More specifically, both the pair of images are displayed based on data acquired by combining the image data for two viewpoints. An image displayed based on data acquired by combining two sets of image data is formed by alternately arranging elements of images for two viewpoints in a stripe pattern.

The overview of the operation will be described. First, image data (more particularly, the image data $D_1$ and the image data $D_9$) for two viewpoints is combined, thereby generating data $D_S$ to be described later. Then, the data is changed to the image data $D_1$, and the data $D_S$ is associated with the viewpoint $A_1$. Similarly, the data is changed to the image data $D_9$, and the data $D_S$ is associated with the viewpoint $A_9$. In addition, sets of the image data $D_2$ to $D_8$ are directly associated with the viewpoints $A_2$ to $A_8$. Then, multiple viewpoint image display data is generated based on the flowchart illustrated in FIG. 14.

By operating the image display unit 10 based on the multiple viewpoint image display data generated as above, two images having the relationship of a reverse view near the end portion of the observation area can be displayed by combining sets of the image data corresponding to the images for two viewpoints.

Figure 23A:
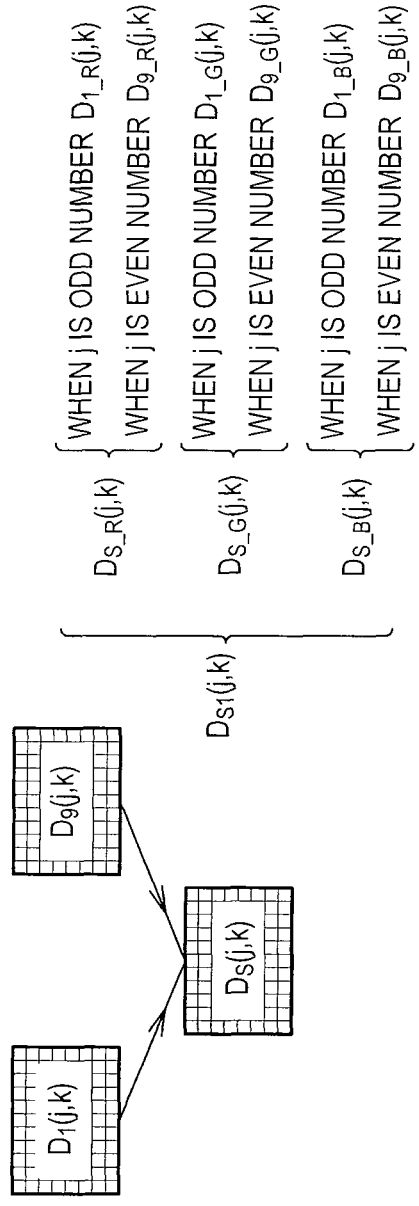
FIG. 23A is a schematic diagram illustrating a method of generating data $D_S(j,k)$ according to an embodiment of a reference example.
Figure 23B:
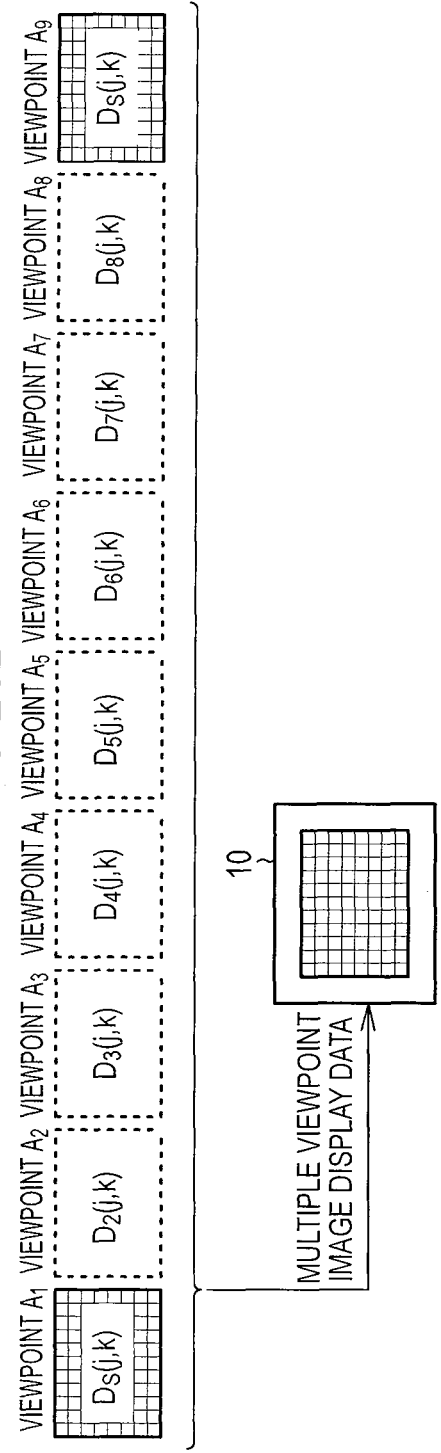
FIG. 23B is a schematic diagram illustrating an operation of generating multiple viewpoint image display data according to the embodiment of the reference example.

FIG. 23A is a schematic diagram illustrating a method of generating the data $D_S(j,k)$ according to an embodiment of a reference example. FIG. 23B is a schematic diagram illustrating an operation of generating multiple viewpoint image display data according to the embodiment of the reference example.

As is apparent from the equation represented in FIG. 23A, $D_S(j,k)=D_1(j,k)$ in a case where "j" is an odd number, and $D_S(j,k)=D_9(j,k)$ in a case where "j" is an even number. In other words, the data $D_S(j,k)$ is generated by combining sets of image data such that the elements of the image dada for the viewpoint $A_1$ and the image data for the viewpoint $A_9$ are alternately arranged in a stripe pattern.

To the driving unit 100, sets of the image data $D_1$ to $D_9$ are directly supplied. The data $D_S$ is generated based on the operation illustrated in FIG. 23A inside the driving unit 100, the data $D_S$ is replaced with the image data corresponding to the viewpoint $A_1$, and the data $D_S$ is replaced with the image data corresponding to the viewpoint $A_9$. In addition, it may be configured such that the generation of the data $D_S$ is performed outside the driving unit 100.

Figure 24A:
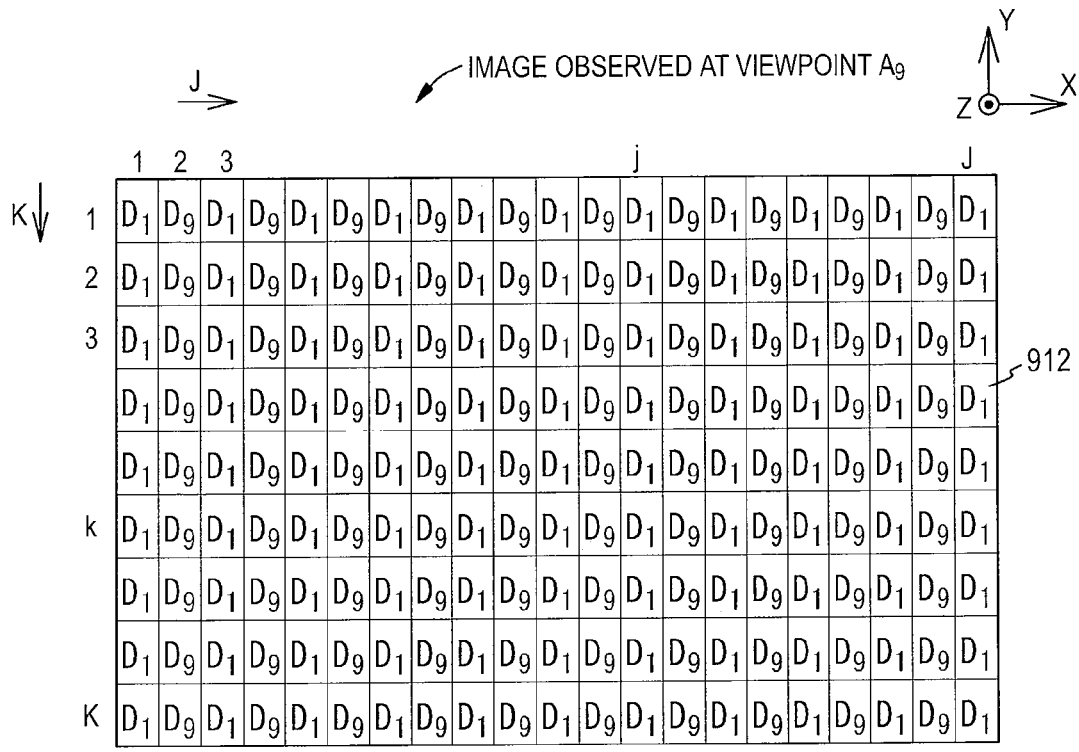
FIGS. 24A and 24B are schematic plan views illustrating an image observed in the left eye and an image observed in the right eye in a case where the left eye and the right eye of an image observer are positioned at viewpoints $A_9$ and $A_1$.
Figure 24B:
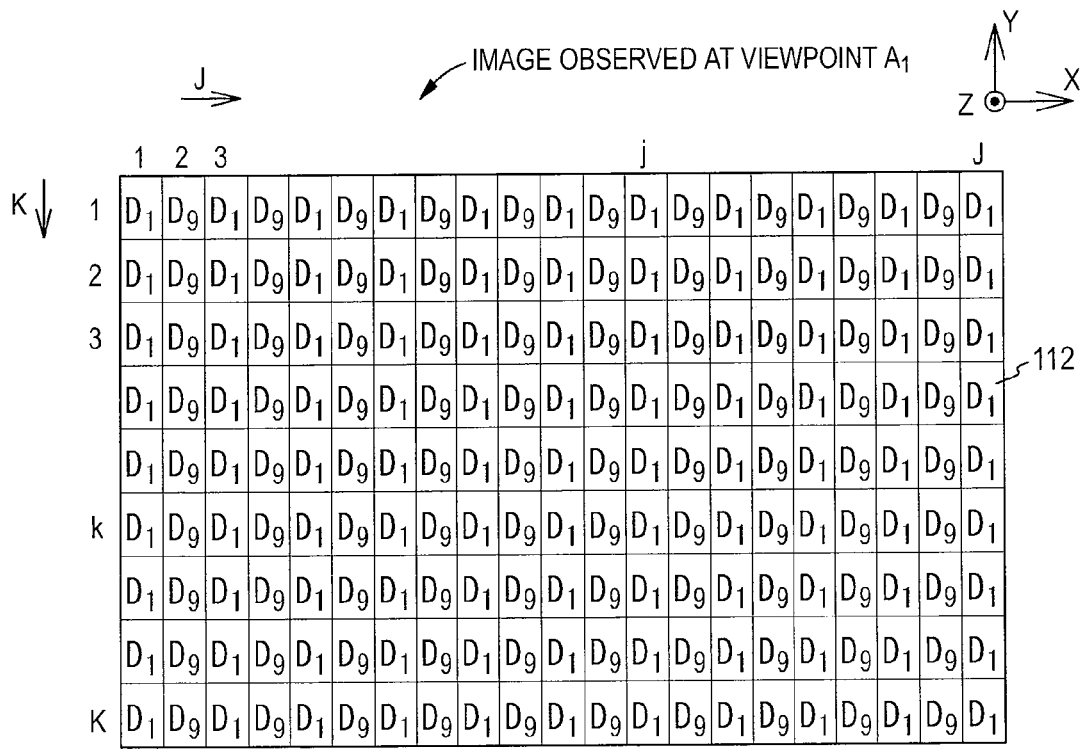

FIGS. 24A and 24B are schematic plan views illustrating an image observed in the left eye and an image observed in the right eye in a case where the left eye and the right eye of an image observer are positioned at viewpoints $A_9$ and $A_1$.

As illustrated in FIGS. 24A and 24B, each one of two images observed at the viewpoint $A_9$ and the view point $A_1$ is formed by alternately arranging the elements of two images for the viewpoint $A_1$ and the viewpoint $A_9$ in a stripe pattern. More specifically, elements of an image aligned in the row direction in a stripe pattern are alternately arranged in the row direction. Since two images observed at the viewpoint $A_9$ and the viewpoint $A_1$ are the same image, there is no parallax between the images.

Accordingly, when the left eye and the right eye of an image observer are positioned at the viewpoint $A_9$ and the viewpoint $A_1$, the image observer recognizes a planar image that is acquired by overlapping images for two viewpoints. Therefore, unnaturalness and discomfort according to the "reverse view" is not acquired. Even in a case where a plurality of image observers observe one autostereoscopic image display device from different positions, the unnaturalness and discomfort caused by a reverse view can be alleviated without any difficulty.

As above, the embodiment of the reference example has been described. As described above, when the left eye and the right eye of an image observer are positioned at the viewpoint $A_9$ and the viewpoint $A_1$, a planar image is recognized. This image is acquired by overlapping the image for the viewpoint $A_9$ and the image for the viewpoint $A_1$ and is basically an image of which the contour is blurred.

Thus, in the first embodiment, in order to alleviate the blurring of the contour, both of a pair of images having the relationship of a reverse view near the end portion of the observation area are displayed by using the first image data and added image data acquired by weighting the values of the first image data and the second image data based on the relationship of parallax between the first image data and the second image data other than the first image data and adding the weighted values. The added image data is generated by weighting the values of the first image data and the second image data based on the amount of parallax between the first image data and the second image data and adding the weighted first image data and the weighted second image data. The first image data and the second image data are formed as image data for different viewpoints.

More specifically, both of the pair of images are displayed based on data acquired by combining the first image data and the added image data. The image displayed based on the data acquired by combining the first image data and the added image data is formed by alternately arranging the element of the image of the first image data and the element of the image of the added image data in a stripe pattern.

In the first embodiment, the image data $D_9$ for the viewpoint $A_9$ corresponds to the first image data, and the image data $D_1$ for the viewpoint $A_1$ corresponds to the second image data. This is substantially the same in the other embodiments to be described later.

Figure 25:
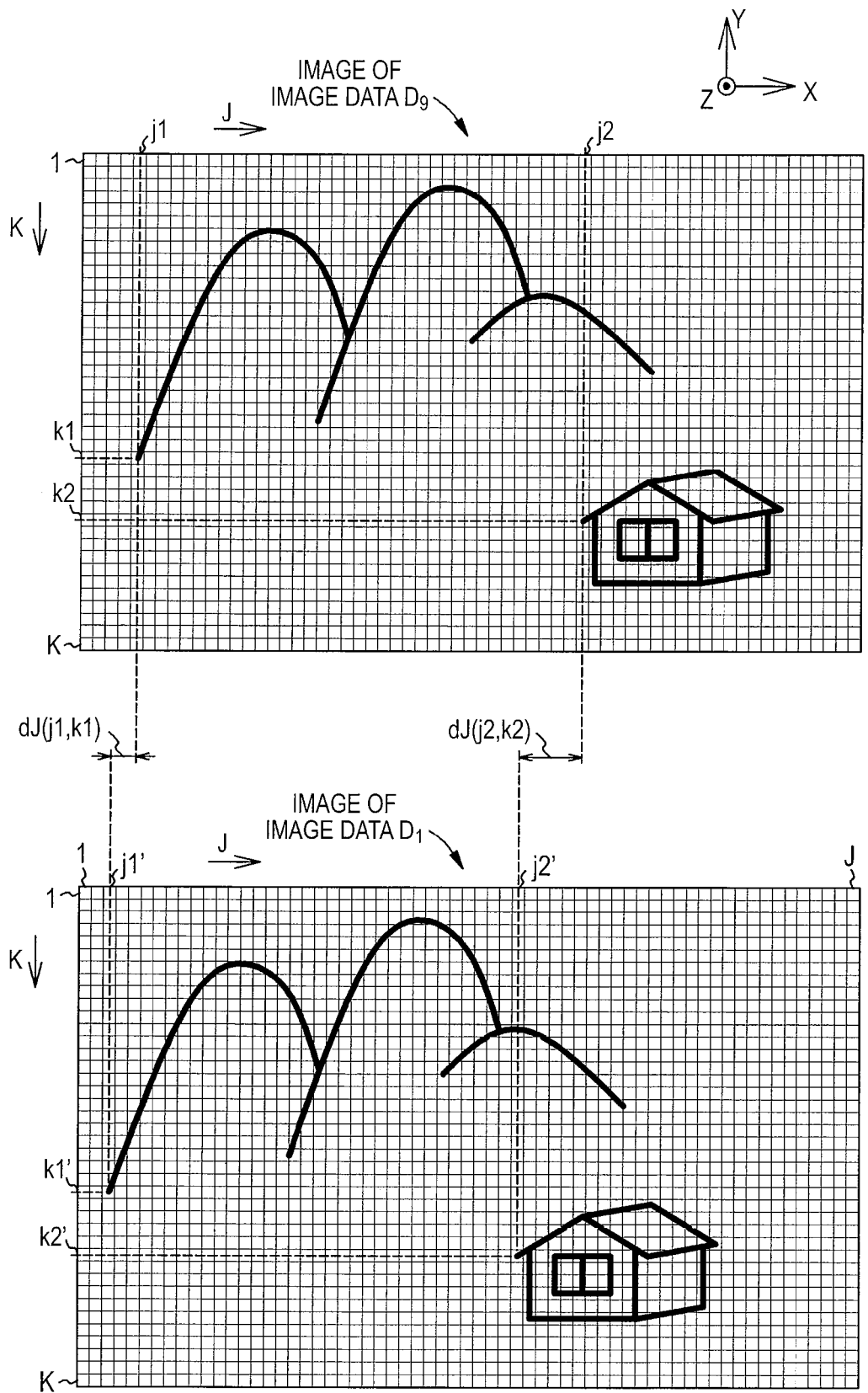
FIG. 25 is a schematic plan view illustrating the amount of parallax between first image data and second image data.

FIG. 25 is a schematic plan view illustrating the amount of parallax between first image data (the image data $D_9$) and second image data (the image data $D_1$).

FIG. 25 schematically represents an image of the image data $D_9$ and an image of the image data $D_1$ when an image of a building with the background of a mountain is displayed, which are vertically aligned.

For example, in a case where image data $D_9(j1,k1)$ of a portion representing a mountain in the image data $D_9$ corresponds to image data $D_1(j1',k1')$ in the image data $D_1$, when the amount of parallax of the second image data with respect to the first image data $D_9(j1,k1)$ is denoted by $dJ(j1,k1)$, the amount of parallax $dJ(j1,k1)$ is given as a distance between a point $(j1,k1)$ and a point $(j1',k1')$. In addition, generally, the amount of parallax in the vertical direction is small and can be ignored in a practical use. Accordingly, the amount of parallax $dJ(j1,k1)$ can be acquired as an absolute value of a difference between the value "j1" and the value "j1'".

Similarly, in a case where image data $D_9(j2,k2)$ of a portion representing a building in the image data $D_9$ corresponds to image data $D_1(j2',k2')$ in the image data $D_1$, the amount of parallax $dJ(j2,k2)$ of the second image data with respect to the first image data $D_9(j2,k2)$ is given as a distance between a point (j2,k2) and a point (j2',k2'). In addition, as described above, when the amount of parallax in the vertical direction is ignored, the amount of parallax dJ(j2,k2) can be acquired as a difference between the value "j2" and the value "j2'".

In a case where an image photographed by using a photographing method, for example, called a paralleling method is displayed, the amount of parallax of a distant view portion is smaller than that of a short-distance view portion. In the above-described example, the relationship of dJ(j2, k2)>dJ (j1, k1) is satisfied. As above, the value of the amount of parallax dJ changes depending on whether the portion is a short-distance view portion or a distant view portion.

In the first embodiment, for the image data $D_9(1,1)$ to $D_9(J,K)$, the amounts of parallax dJ(1,1) to dJ(J,K) are acquired, and the added image data $D_{WG}$ to be described later is generated by weighting the values of the first image data and the second image data based on the amount of parallax dJ(1,1) to dJ(J,K) and adding the weighted values. In addition, the amounts of parallax dJ(1,1) to dJ(J,K) can be acquired by using a known image processing technique such as pattern matching.

Figure 26A:
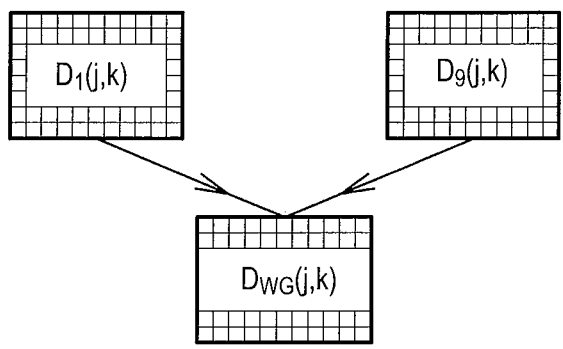
FIG. 26A is a schematic diagram illustrating a method of generating added image data $D_{WG}(j,k)$.
Figure 26B:
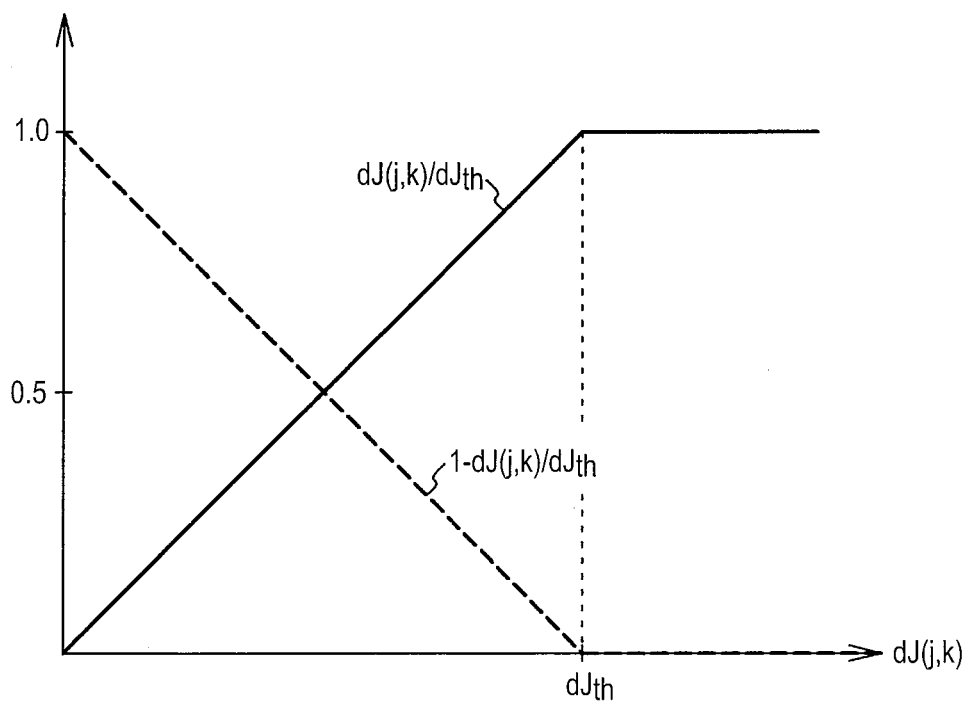
FIG. 26B is a graph illustrating a change in a weighting factor when the added image data $D_{WG}$ is calculated.

FIG. 26A is a schematic diagram illustrating a method of generating the added image data $D_{WG}(j,k)$. FIG. 26B is a graph illustrating a change in a weighting factor when the added image data $D_{WG}$ is calculated.

Here, "$dJ_{th}$" shown in the equations represented in FIG. 26A is a threshold value that is set in accordance with the specifications of the autostereoscopic image display device and, for example, is set to a specific value in the range of about 10 to about 40. The value of the threshold value $dJ_{th}$ may be appropriately selected basically based on the evaluation of the image of the autostereoscopic image display device.

As represented in the equations shown in FIG. 26A, in a case where the amount of parallax dJ(i,k) is zero, the added image data $D_{WG}(j,k)$ is $D_9(j,k)$. In addition, in a case where the amount of parallax dJ(i,k) is equal to or larger than the threshold value $dJ_{th}$, the added image data $D_{WG}(j,k)$ is $D_1(j,k)$. Furthermore, in a case where the amount of parallax dJ(i,k) exceeds zero and is less than the threshold value $dJ_{th}$, $D_{WG}(j,k)=(dJ(j,k)/dJ_{th})\cdot D_1(j,k)+(1-dJ(j,k)/dJ_{th})\cdot D_9(j,k)$. FIG. 26B illustrates a major coefficient $(dJ(j,k)/dJ_{th})$ and a graph of a coefficient $(1-dJ(j,k)/dJ_{th})$.

In addition, the added image data $D_{WG}(j,k)$ is formed by a set of $D_{WG\_R}(j,k)$, $D_{WG\_G}(j,k)$, and $D_{WG\_B}(j,k)$, and the above-described calculation is performed for the data corresponding to each color.

To the driving unit 100, sets of the image data $D_1$ to $D_9$ are directly supplied. Inside the driving unit 100, the calculation of the amounts of parallax dJ(1,1) to dJ(J,K) and the generation of the added image data $D_{WG}(1,1)$ to $D_{WG}(J,K)$ by using the equations as shown in FIG. 26A are performed. In addition, a configuration may be employed in which the generation of the added image data $D_{WG}$ is performed outside the driving unit 100.

Figure 27A:
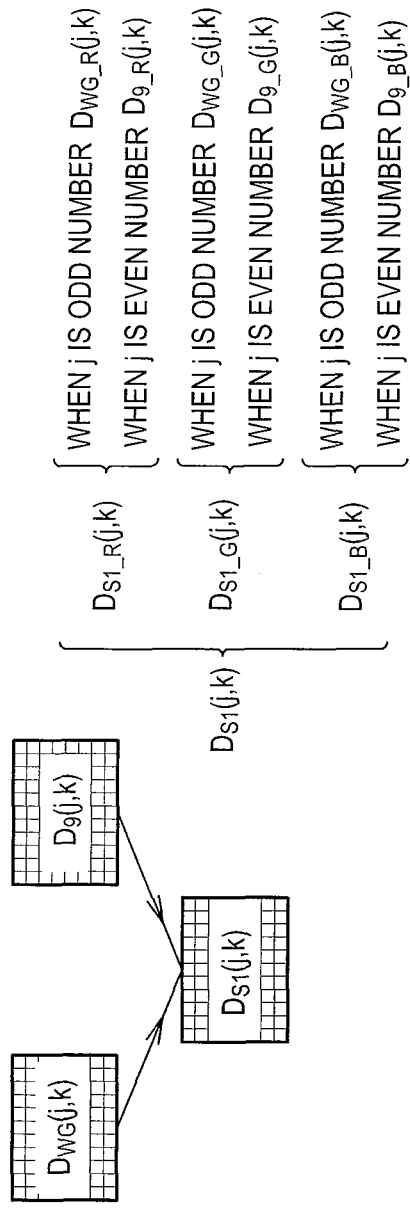
FIG. 27A is a schematic diagram illustrating a method of generating data $D_{S1}(j,k)$ according to a first embodiment.
Figure 27B:
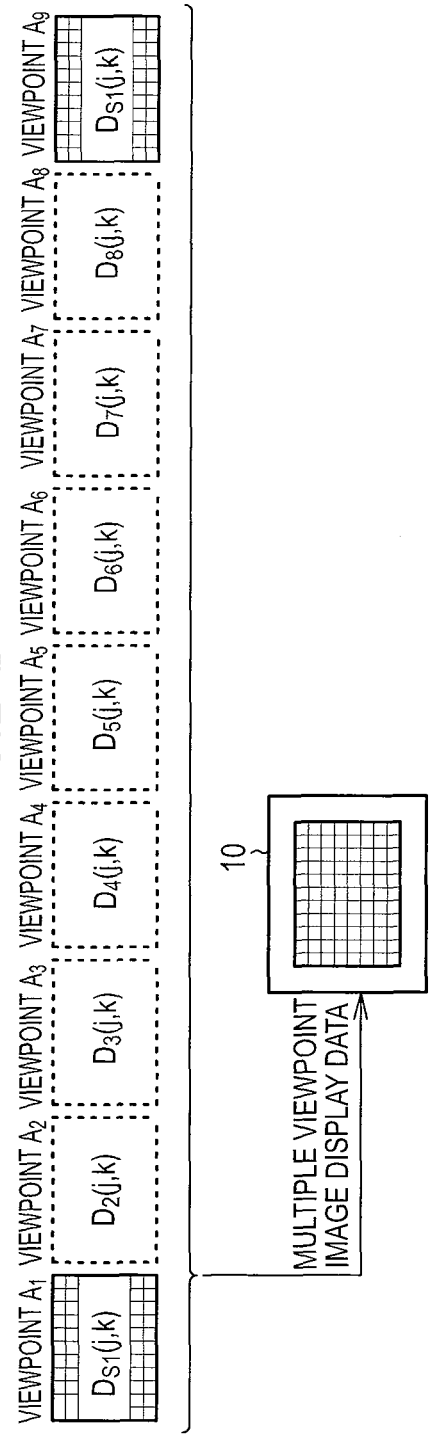
FIG. 27B is a schematic diagram illustrating an operation of generating multiple viewpoint image display data according to the first embodiment.

FIG. 27A is a schematic diagram illustrating a method of generating data $D_{S1}(j,k)$ according to the first embodiment. FIG. 27B is a schematic diagram illustrating an operation of generating multiple viewpoint image display data according to the first embodiment.

As is apparent from the equations shown in FIG. 27A, $D_{S1}(j,k)=D_{WG}(j,k)$ in a case where "j" is an odd number. On the other hand, $D_{S1}(j,k)=D_9(j,k)$ in a case where "j" is an even number. In other words, the data $D_{S1}(j,k)$ is generated by combining the added image data and the image data such that the element of the added image data $D_{WG}$ and the element of the image data $D_9$ for the viewpoint $A_9$ are alternately arranged in a stripe pattern.

Then, as shown in FIG. 27B, the data is changed to the image data $D_1$, and the data $D_{S1}$ is associated with the viewpoint $A_1$. Similarly, the data is changed to the image data $D_9$, and the data $D_{S1}$ is associated with the viewpoint $A_9$. In addition, sets of image data $D_2$ to $D_8$ are directly associated with the viewpoints $A_2$ to $A_8$. Then, multiple viewpoint image display data is generated based on the flowchart illustrated in FIG. 14.

More specifically, inside the driving unit 100, data $D_{S1}$ is generated based on the image data $D_9$ and the added image data $D_{WG}$, and all the sets of image data associated with the viewpoint $A_1$ and the viewpoint $A_9$ are replaced by the data $D_{S1}$. In addition, a configuration may be employed in which the generation of the data $D_{S1}$ is performed outside the driving unit 100 as well.

Figure 28A:
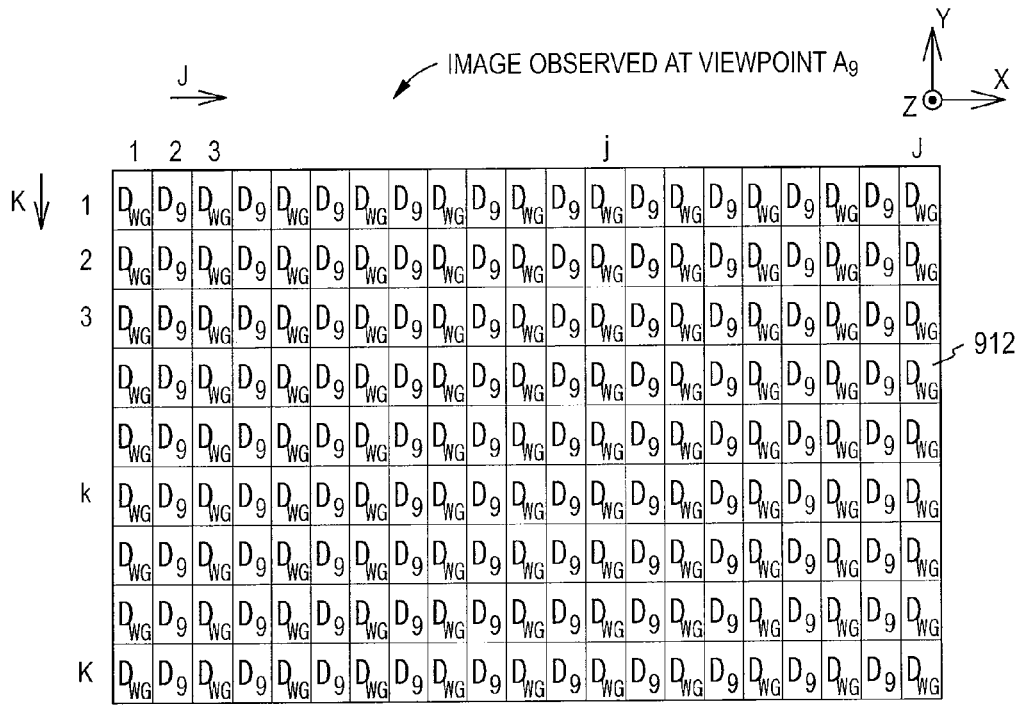
FIGS. 28A and 28B are schematic plan views illustrating an image observed in the left eye and an image observed in the right eye in a case where the left eye and the right eye of an image observer are positioned at viewpoints $A_9$ and $A_1$.
Figure 28B:
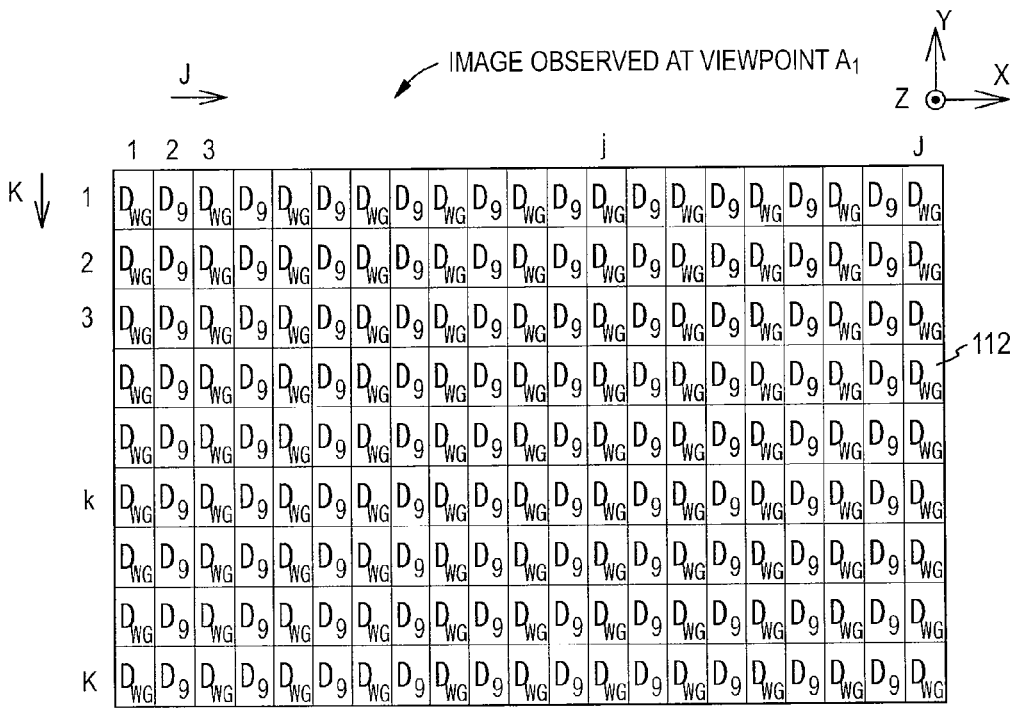

FIGS. 28A and 28B are schematic plan views illustrating an image observed in the left eye and an image observed in the right eye in a case where the left eye and the right eye of an image observer are positioned at the viewpoints $A_9$ and $A_1$.

As illustrated in FIGS. 28A and 28B, each one of two images observed at the viewpoint $A_9$ and the view point $A_1$ is formed by alternately arranging the element of the image of the image data $D_9$ corresponding to the first image data and the element of the image of the added image data $D_{WG}$ in a stripe pattern. Since the two images observed at the viewpoint $A_9$ and the viewpoint $A_1$ are the same image, there is no parallax between the images. Accordingly, when the left eye and the right eye of the image observer are positioned at the viewpoint $A_9$ and the viewpoint $A_1$, the image observer recognizes a planar image acquired by overlapping the images for two viewpoints. Therefore, unnaturalness and discomfort according to the "reverse view" is not acquired.

The added image data $D_{WG}$ is weighted such that the value thereof coincides with the value of the image data $D_9$ in an area in which the amount of parallax is small. Accordingly, the blurring of the image in the area in which the amount of parallax is small in the planar image is alleviated.

In the images observed at the viewpoint $A_1$ and the viewpoint $A_9$, image components for the viewpoint $A_1$ and the viewpoint $A_9$ are included. Accordingly, for example, in a case where the left eye and the right eye of an image observer are positioned at the viewpoint $A_1$ and the viewpoint $A_2$, the image component for the viewpoint $A_9$ that is included in the image observed by the left eye and the image for the viewpoint $A_2$ that is observed by the right eye have the relationship of a reverse view. However, the image component for the viewpoint $A_1$ is also included in the image that is observed by the left eye, and this image component and the image for the viewpoint $A_2$ that is observed by the right eye have the relationship of an ordinary stereoscopic view. Accordingly, the unnaturalness according to the above-described relationship of the reverse view is not distinctively recognized. In addition, even in a case where the left eye and the right eye of the image observer are positioned at the viewpoint $A_8$ and the viewpoint $A_9$, the image for the viewpoint $A_8$ observed by the left eye and the image component for the viewpoint $A_1$ that is included in the image observed by the right eye have the relationship of a reverse view. However, in the image observed by the right eye, the image component for the viewpoint $A_9$ is also included, and the image component and the image for the viewpoint $A_8$ that is observed by the left eye have the relationship of an ordinary stereoscopic view. Accordingly, the unnaturalness according to the above-described relationship of the reverse view is not distinctively recognized.

In the description presented above, after the image data $D_{WG}$ is generated based on the image data $D_1$ and $D_9$, the image data $D_{WG}$ and the image data $D_9$ are combined so as to generate the data $D_{S1}$. The first embodiment is not limited thereto, but a configuration may be employed in which, for example, added image data $D_{WG}'$ is generated such that the added image data $D_{WG}'=D_1$ when the amount of parallax dj=0, and the added image data $D_{WG}'=D_9$ when the amount of parallax dj is equal to or larger than the threshold value $dJ_{th}$, and the data $D_{S1}$ is generated by combining the added image data $D_{WG}'$ and the image data $D_1$. Alternatively, for example, a configuration may be employed in which, after the added image data $D_{WG}$ is generated based on the image data $D_2$ and $D_8$, the added image data $D_{WG}$ and the image data $D_8$ are combined so as to generate the data $D_{S1}$. The combination of the image data may be appropriately selected depending on the design of the autostereoscopic image display device.

[Second Embodiment]

A second embodiment is a modification of the first embodiment. In the first embodiment, the same data $D_{S1}$ is associated with each one of the viewpoint $A_1$ and the viewpoint $A_9$. In contrast to this, in the second embodiment, although the data $D_{S1}$ is associated with the viewpoint $A_1$, similarly to the first embodiment, data $D_{S2}$, which will be described later, other than the data $D_{S1}$ is associated with the viewpoint $A_9$.

Figure 29A:
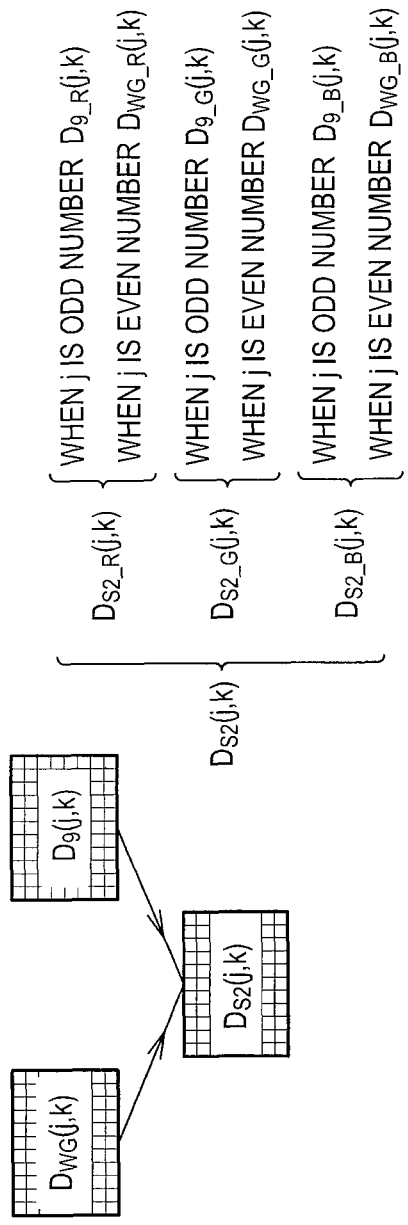
FIG. 29A is a schematic diagram illustrating a method of generating data $D_{S2}(j,k)$ according to a second embodiment.
Figure 29B:
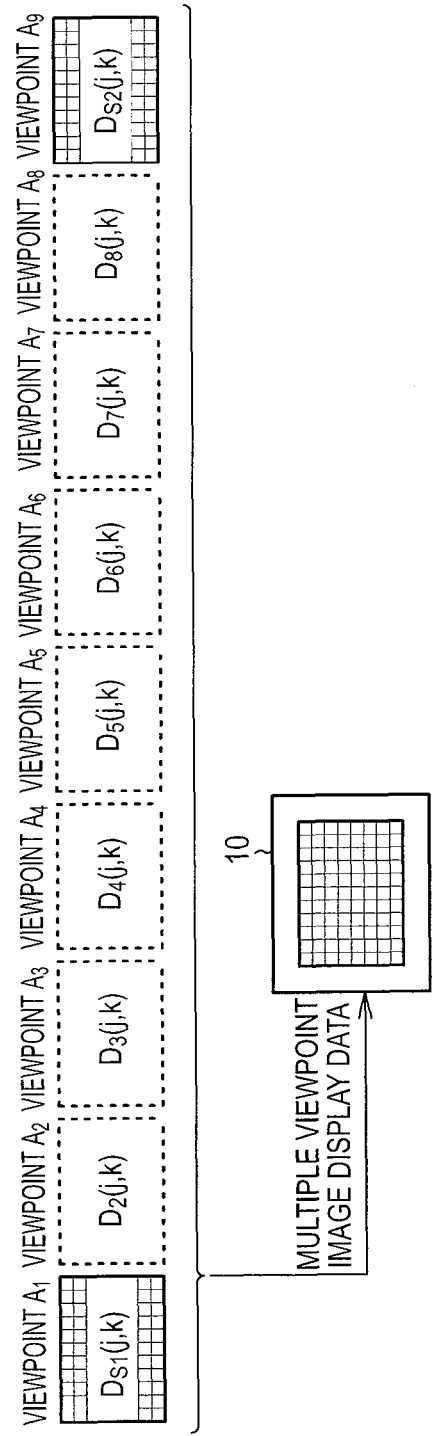
FIG. 29B is a schematic diagram illustrating an operation of generating multiple viewpoint image display data according to the second embodiment.

FIG. 29A is a schematic diagram illustrating a method of generating data $D_{S2}(j,k)$ according to the second embodiment. FIG. 29B is a schematic diagram illustrating an operation of generating multiple viewpoint image display data according to the second embodiment.

Since the configuration of the added image data $D_{WG}(j,k)$ shown in FIG. 29A has been described in the first embodiment, the description thereof is omitted. In addition, since the configuration of the data $D_{S1}(j,k)$ shown in FIG. 29B has been described also in the first embodiment, the description thereof is omitted.

As is apparent by comparing FIG. 29A and FIG. 27A, in data $D_{S1}(j,k)$ and data $D_{S2}(j,k)$, the selection destination of the data is interchanged. In other words, $D_{S2}(j,k)=D_9(j,k)$ in a case where "j" is an odd number, and $D_{S2}(j,k)=D_{WG}(j,k)$ in a case where "j" is an even number. In addition, the data $D_{S2}(j,k)$ is generated by combining the added image data and the image data such that an element of the added image data $D_{WG}$ and an element of the image data $D_9$ for the viewpoint $A_9$ are alternately arranged in a stripe pattern.

Figure 30A:
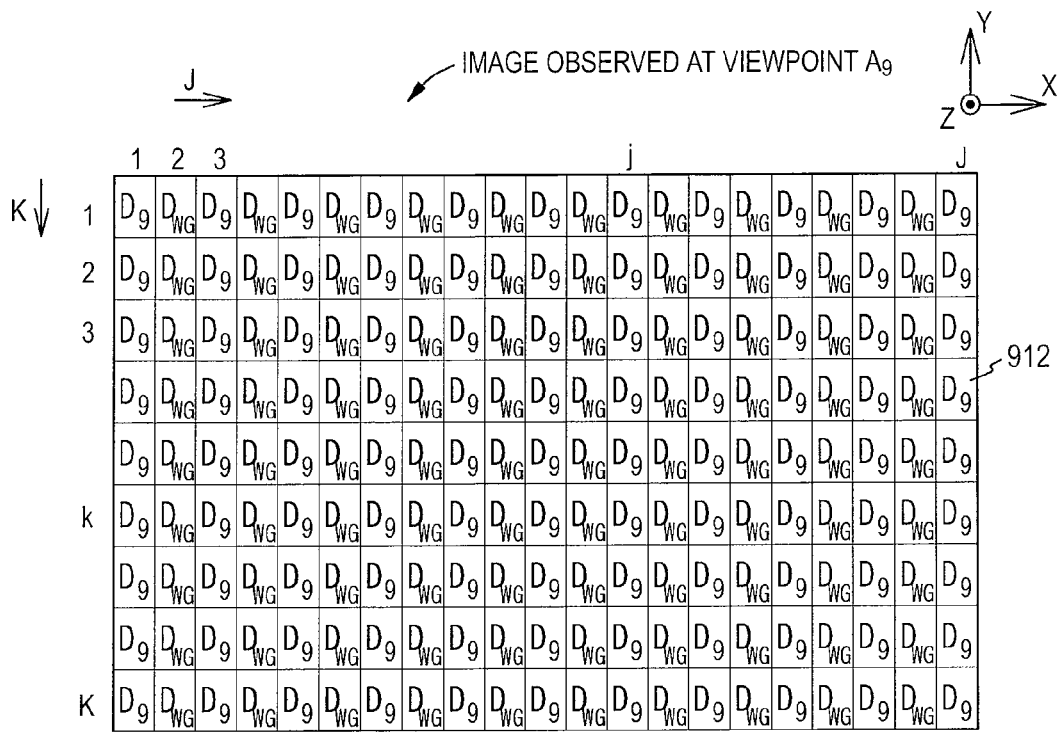
FIGS. 30A and 30B are schematic plan views illustrating an image observed in the left eye and an image observed in the right eye in a case where the left eye and the right eye of an image observer are positioned at viewpoints $A_9$ and $A_1$.
Figure 30B:
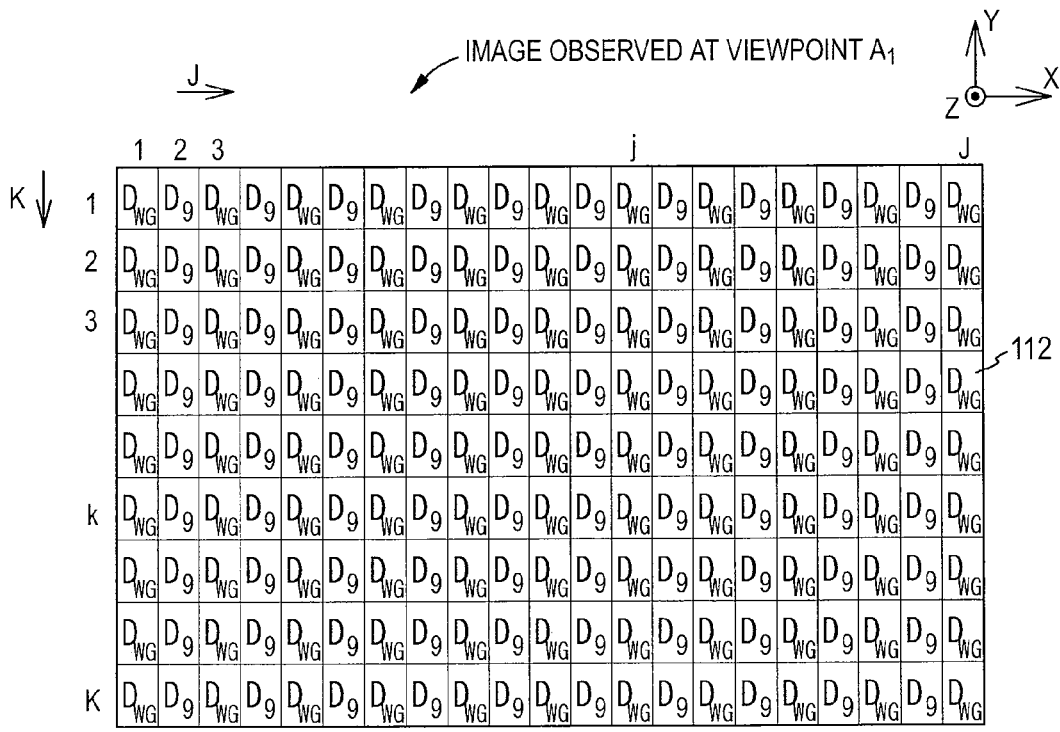

FIGS. 30A and 30B are schematic plan views illustrating an image observed in the left eye and an image observed in the right eye in a case where the left eye and the right eye of an image observer are positioned at viewpoints $A_9$ and $A_1$.

As illustrated in FIGS. 30A and 30B, each one of two images observed at the viewpoint $A_9$ and the view point $A_1$ is formed by alternately arranging the element of the image of the image data $D_9$ corresponding to the first image data and the element of the image of the added image data $D_{WG}$ in a stripe pattern. More specifically, the elements of the image that extend in the column direction in a stripe pattern are alternately arranged in the row direction. Although the phases of the stripe arrangements of two images observed at the viewpoint $A_9$ and the viewpoint $A_1$ are different from each other, the two images are recognized as a substantially same image. Accordingly, there is no substantial parallax between the images.

When the left eye and the right eye of an image observer are positioned at the viewpoint $A_9$ and the viewpoint $A_1$, the image observer recognizes a planar image that is acquired by overlapping images for two viewpoints. Therefore, the unnaturalness and discomfort according to the "reverse view" are not acquired.

As described in the first embodiment, a configuration in which the added image data $D_{WG}'$ and the image date $D_1$ are combined or a configuration in which, after the added image data $D_{WG}$ is generated based on the image data $D_2$ and $D_8$, the image data $D_{WG}$ and the image data $D_8$ are combined so as to generate the data $D_{S1}$ may be employed. The combination of sets of image data may be appropriately selected in accordance with the design of the autostereoscopic image display device.

[Third Embodiment]

A third embodiment relates to an autostereoscopic image display device according to the present disclosure and a method of driving thereof.

Also in the third embodiment, both of a pair of images having the relationship of a reverse view near the end portion of the observation area is displayed by using first image data and added image data acquired by weighting values of first image data and second image data based on the relationship of parallax between the second image data different from the first image data and the first image data and adding the weighted values. The added image data is generated by weighting values of the first image data and the second image data based on the amount of parallax between the first image data and the second image data and adding the weighted values. Each of the first image data and the second image data is image data of different viewpoints.

More specifically, both the pair of images are displayed based on data acquired by combining the first image data and the added image data. An image displayed based on data acquired by combining the first image data and the added image data is formed by arranging the element of the image of the first image data and the element of the image of the added image data in a checkered pattern.

Figure 31A:
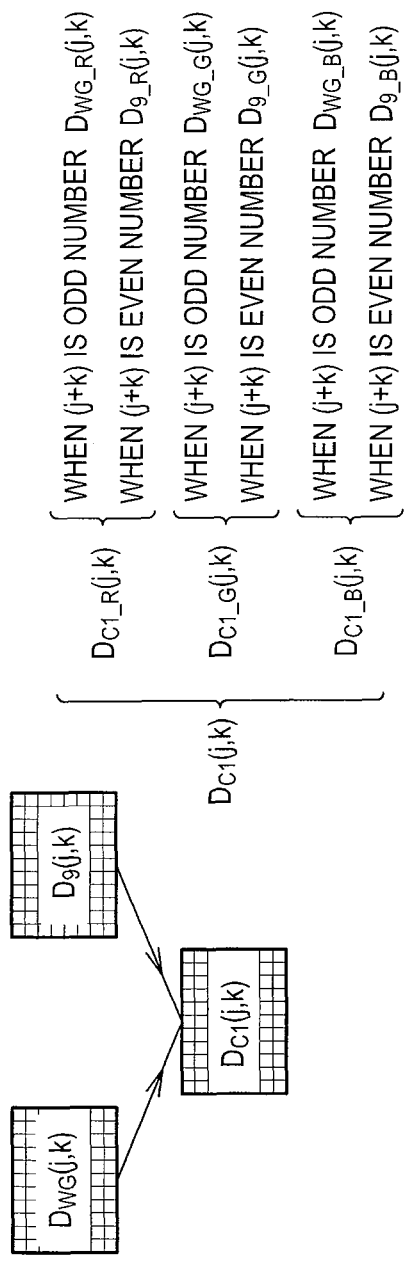
FIG. 31A is a schematic diagram illustrating a method of generating data $D_{C1}(j,k)$ according to a third embodiment.
Figure 31B:
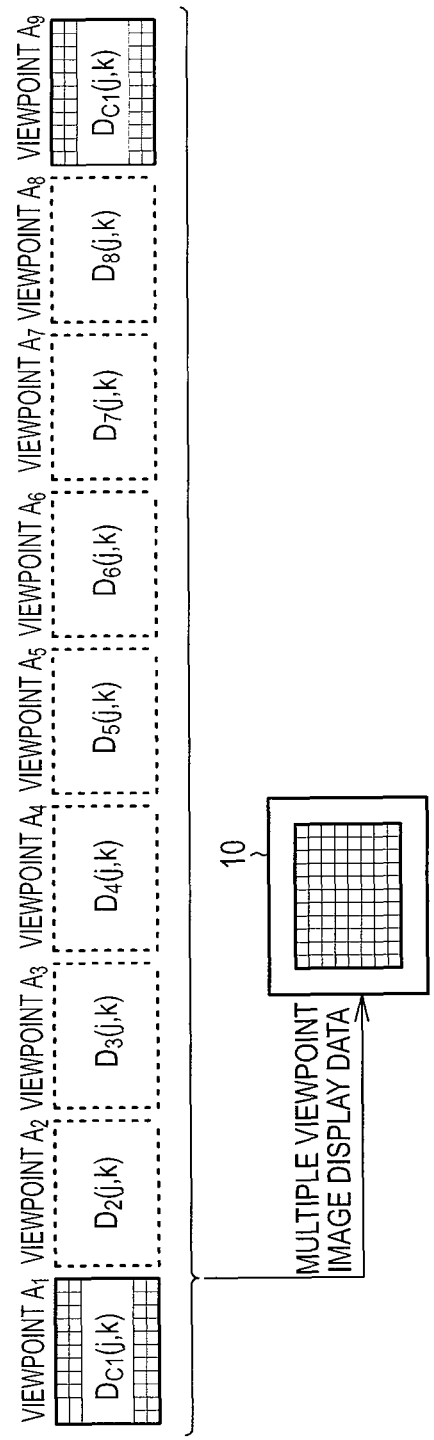
FIG. 31B is a schematic diagram illustrating an operation of generating multiple viewpoint image display data according to the third embodiment.

FIG. 31A is a schematic diagram illustrating a method of generating data $D_{C1}(j,k)$ according to the third embodiment. FIG. 31B is a schematic diagram illustrating an operation of generating multiple view image display data according to the third embodiment.

Since the configuration of the added image data $D_{WG}(j,k)$ shown in FIG. 31A has been described in the first embodiment, the description thereof is omitted.

As is apparent from equations shown in FIG. 31A, $D_{C1}(j,k)=D_{WG}(j,k)$ in a case where "j+k" is an odd number. On the other hand, $D_{C1}(j,k)=D_9(j,k)$ in a case where "j+k" is an even number. Accordingly, the data $D_{C1}(j,k)$ is generated by combining the added image data and the image data such that the element of the added image data $D_{WG}$ and the element of the image data $D_9$ for the viewpoint $A_9$ are arranged in a checkered pattern.

To the driving unit 100, sets of the image data $D_1$ to $D_9$ are directly supplied. Inside the driving unit 100, the added image data $D_{WG}$ and the data $D_{C1}$ are generated, the image data corresponding to the viewpoint $A_1$ is replaced by the data $D_{C1}$, and the image data corresponding to the viewpoint $A_9$ is replaced by the data $D_{C1}$. In addition, a configuration may be employed in which the generation of the added image data $D_{WG}$ and the data $D_{C1}$ is performed outside the driving unit 100.

FIGS. 32A and 32B are schematic plan views illustrating an image observed in the left eye and an image observed in the right eye in a case where the left eye and the right eye of an image observer are positioned at viewpoints $A_9$ and $A_1$.

As illustrated in FIGS. 32A and 32B, each one of two images observed at the viewpoint $A_9$ and the view point $A_1$ is formed by arranging the element of the image of the image data $D_9$ corresponding to the first image data and the element of the image of the added image data $D_{WG}$ in a checkered pattern. More specifically, the elements are arranged in a checkered pattern for each pixel. Since the two images observed at the viewpoint $A_9$ and the viewpoint $A_1$ are the same image, there is no parallax between the images.

Accordingly, when the left eye and the right eye of the image observer are positioned at the viewpoint $A_9$ and the viewpoint $A_1$, the image observer recognizes a planar image acquired by overlapping the images for two viewpoints. Therefore, unnaturalness and discomfort according to the "reverse view" is not acquired. In addition, even in a case where a plurality of image observers observe one autostereoscopic image display device from different locations, unnaturalness and discomfort caused by a reverse view can be alleviated without any difficulty.

The added image data $D_{WG}$ is weighted such that the value thereof coincides with the value of the image data $D_9$ in an area in which the amount of parallax is small. Accordingly, the blurring of the image in the area in which the amount of parallax is small in the planar image is alleviated.

In addition, differently from the first embodiment, since the elements of the two images are arranged in a checkered pattern, the image observer recognizes the planar image acquired by overlapping images for two viewpoints as a smoother image. In the third embodiment, although the generation process of the multiple viewpoint image display data is a little more complicated than that of the first embodiment, there is an advantage that the image is formed to be smoother.

Even in the third embodiment, in the images observed at the viewpoint $A_1$ and the viewpoint $A_9$, image components for the viewpoint $A_1$ and the viewpoint $A_9$ are included. Accordingly, in a case where the images are observed at the viewpoint $A_1$ and the viewpoint $A_2$ or in a case where the images are observed at viewpoints $A_8$ and $A_9$, the unnaturalness according to the relationship of a reverse view is not distinctively recognized.

In the description presented above, after the image data $D_{WG}$ is generated based on the image data $D_1$ and $D_9$, the added image data $D_{WG}$ and the image data $D_9$ are combined so as to generate the data $D_{C1}$. The third embodiment is not limited thereto, but a configuration may be employed in which, for example, added image data $D_{WG}'$ is generated such that the added image data $D_{WG}'=D_1$ when the amount of parallax dj=0, and the added image data $D_{WG}'=D_9$ when the amount of parallax dj is equal to or larger than the threshold value $dJ_{th}$, and the data $D_{C1}$ is generated by combining the added image data $D_{WG}'$ and the image data $D_1$. Alternatively, for example, a configuration may be employed in which, after the added image data $D_{WG}$ is generated based on the image data $D_2$ and $D_8$, the added image data $D_{WG}$ and the image data $D_8$ are combined so as to generate the data $D_{C1}$. The combination of the image data may be appropriately selected depending on the design of the autostereoscopic image display device.

[Fourth Embodiment]

A fourth embodiment is a modification of the third embodiment. In the third embodiment, the same data $D_{C1}$ is associated with the viewpoint $A_1$ and the viewpoint $A_9$. In contrast to this, in the fourth embodiment, although the data $D_{C1}$ is associated with the viewpoint $A_1$, similarly to the third embodiment, data $D_{C2}$ other than the data $D_{C1}$, which will be described later, is associated with the viewpoint $A_9$.

Figure 33A:
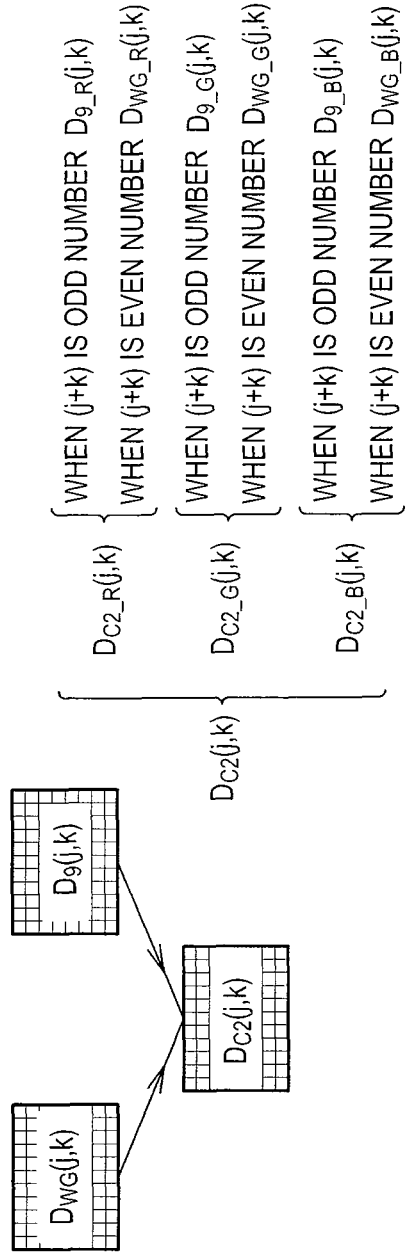
FIG. 33A is a schematic diagram illustrating a method of generating data $D_{C2}(j,k)$ according to a fourth embodiment.
Figure 33B:
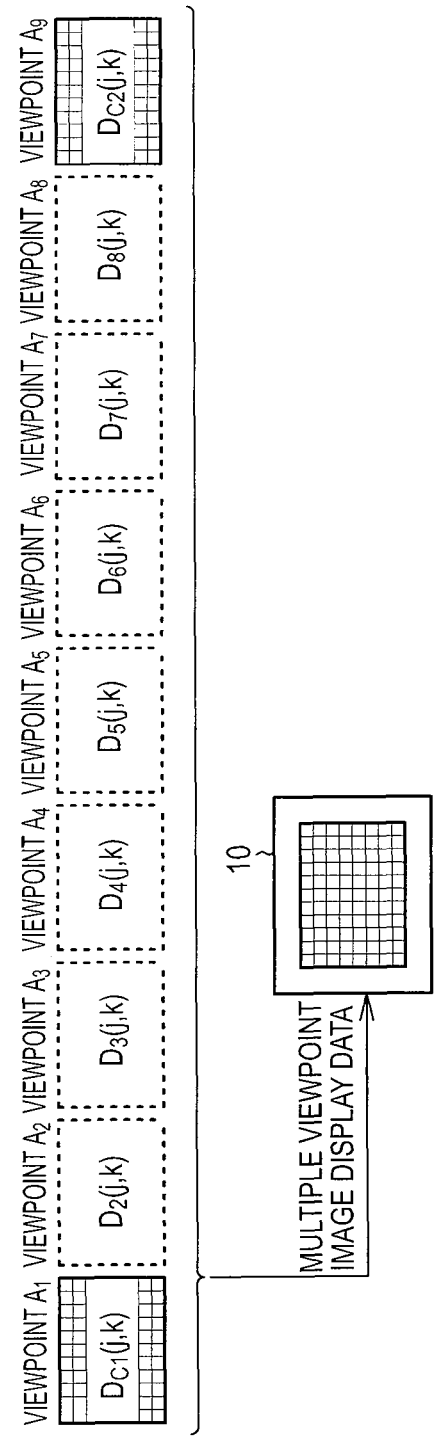
FIG. 33B is a schematic diagram illustrating an operation of generating multiple viewpoint image display data according to the fourth embodiment.

FIG. 33A is a schematic diagram illustrating a method of generating data $D_{S2}(j,k)$ according to a fourth embodiment. FIG. 33B is a schematic diagram illustrating an operation of generating multiple viewpoint image display data according to the fourth embodiment.

Since the configuration of the added image data $D_{WG}(j,k)$ shown in FIG. 33A has been described in the first embodiment, the description thereof is omitted. In addition, since the configuration of the data $D_{C1}(j,k)$ shown in FIG. 33B has been described in the third embodiment, the description thereof is omitted.

As is apparent by comparing FIG. 33A and FIG. 31A, in data $D_{C1}(j,k)$ and data $D_{C2}(j,k)$, the selection destination of the data is interchanged. In other words, $D_{C2}(j,k)=D_9(j,k)$ in a case where "j+k" is an odd number, and $D_{C2}(j,k)=D_{WG}(j,k)$ in a case where "j+k" is an even number. In addition, the data $D_{C2}(j,k)$ is generated by combining the added image data and the image data such that an element of the added image data $D_{WG}$ and an element of the image data $D_9$ for the viewpoint $A_9$ are arranged in a checkered pattern.

Figures 34A, 34B:
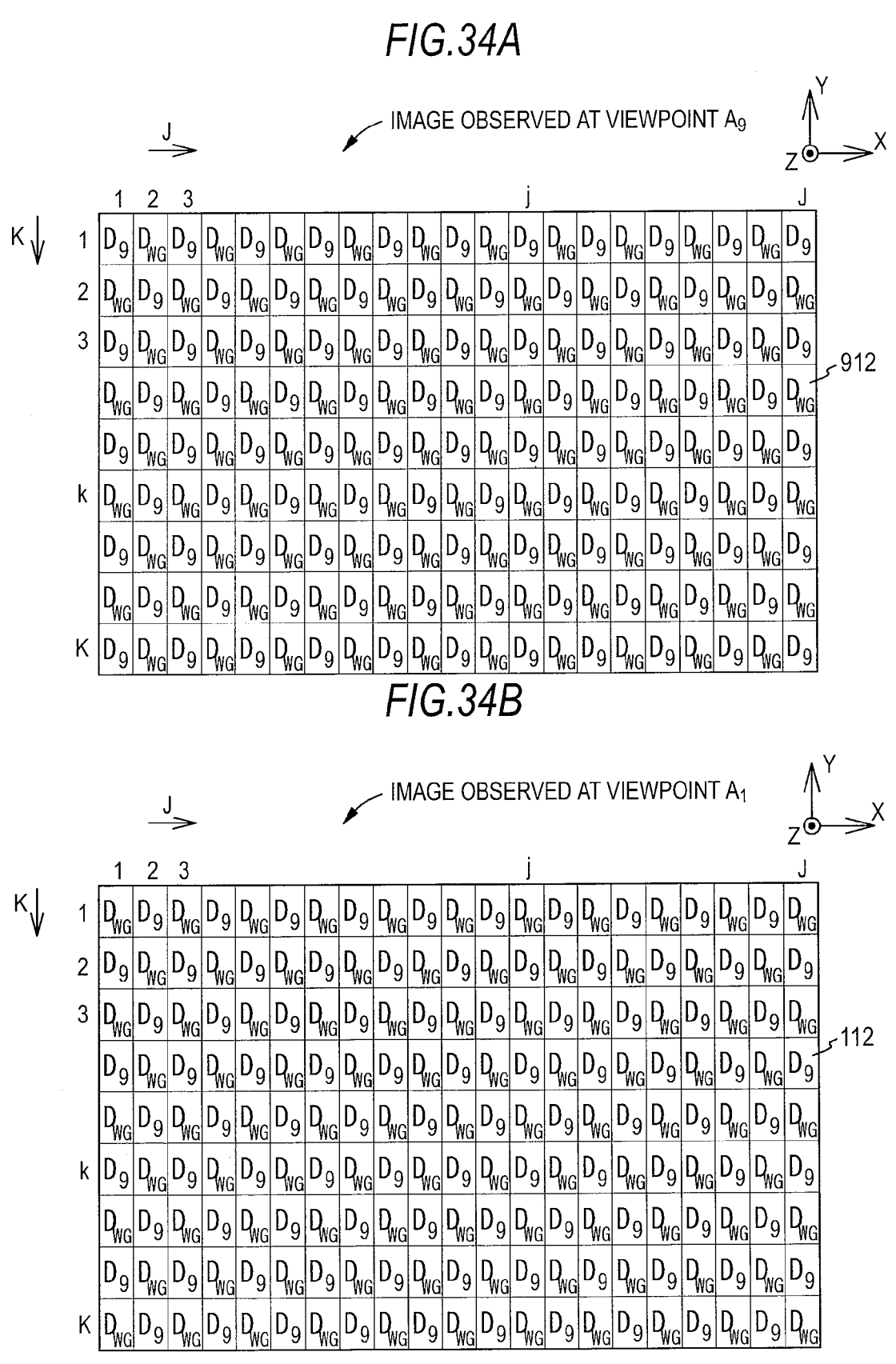

FIGS. 34A and 34B are schematic plan views illustrating an image observed in the left eye and an image observed in the right eye in a case where the left eye and the right eye of an image observer are positioned at viewpoints $A_9$ and $A_1$.

As illustrated in FIGS. 34A and 34B, each one of two images observed at the viewpoint $A_9$ and the viewpoint $A_1$ is formed by arranging the element of the image of the image data $D_9$ corresponding to the first image data and the element of the image of the added image data $D_{WG}$ in a checkered pattern. More specifically, the elements are arranged in a checkered pattern. Although the phases of the checkered arrangements of two images observed at the viewpoint $A_9$ and the viewpoint $A_1$ are different from each other, the two images are recognized as a substantially same image. Accordingly, there is no substantial parallax between the images.

Accordingly, when the left eye and the right eye of an image observer are positioned at the viewpoint $A_9$ and the viewpoint $A_1$, the image observer recognizes a planar image that is acquired by overlapping images for two viewpoints. Therefore, the unnaturalness and discomfort according to the "reverse view" is not acquired.

As described in the third embodiment, a configuration in which the added image data $D_{WG}'$ and the image date $D_1$ are combined or a configuration in which, after the added image data $D_{WG}$ is generated based on the image data $D_2$ and $D_8$, the image data $D_{WG}$ and the image data $D_8$ are combined may be employed. The combination of sets of image data may be appropriately selected in accordance with the design of the autostereoscopic image display device.

[Fifth Embodiment]

A fifth embodiment relates to an autostereoscopic image display device according to the present disclosure and a method of driving thereof.

Also in the fifth embodiment, both of a pair of images having the relationship of a reverse view near the end portion of the observation area is displayed by using first image data and added image data acquired by weighting values of the first image data and second image data based on the relationship of parallax between the second image data different from the first image data and the first image data and adding the weighted values. The added image data is generated by weighting values of the first image data and the second image data based on the amount of parallax between the first image data and the second image data and adding the weighted values. Each of the first image data and the second image data is image data of different viewpoints.

More, specifically, one of the pair of images is displayed based on data acquired by taking an arithmetic average of the first image data and the added image data.

FIG. 35A is a schematic diagram illustrating a method of generating data $D_{av}(j,k)$ according to the fifth embodiment.

FIG. 35B is a schematic diagram illustrating an operation of generating multiple viewpoint image display data according to the fifth embodiment.

Since the configuration of the added image data $D_{WG}(j,k)$ shown in FIG. 35A has been described in the first embodiment, the description thereof is omitted.

As illustrated in FIG. 35B, the arithmetic average is taken for each one of data for the red light emitting pixel, data for the green light emitting pixel, and data for the blue light emitting pixel. More specifically, data $D_{av}(j,k)$ is formed by a set of $D_{av\_R}(j,k)$, $D_{av\_G}(j,k)$, and $D_{av\_B}(j,k)$. The data $D_{av\_R}(j,k)$ is data acquired by arithmetically averaging $D_{WG\_R}(j,k)$ and the $D_{9\_G}R(j,k)$, the data $D_{av\_G}(j,k)$ is data acquired by arithmetically averaging $D_{WG\_G}(j,k)$ and the $D_{9\_G}(j,k)$, and data $D_{av\_B}(j,k)$ is data acquired by arithmetically averaging $D_{WG\_B}(j,k)$ and the $D_{9\_B}(j,k)$.

To the driving unit 100, sets of the image data $D_1$ to $D_9$ are directly supplied. Inside the driving unit 100, the added image data $D_{WG}$ and the data $D_{av}$ are generated, both sets of the image data corresponding to the viewpoint $A_1$ and the viewpoint $A_9$ are replaced by the data $D_{av}$. In addition, a configuration may be employed in which the generation of the added image data $D_{WG}$ and the data $D_{av}$ is performed outside the driving unit 100.

Figure 36A:
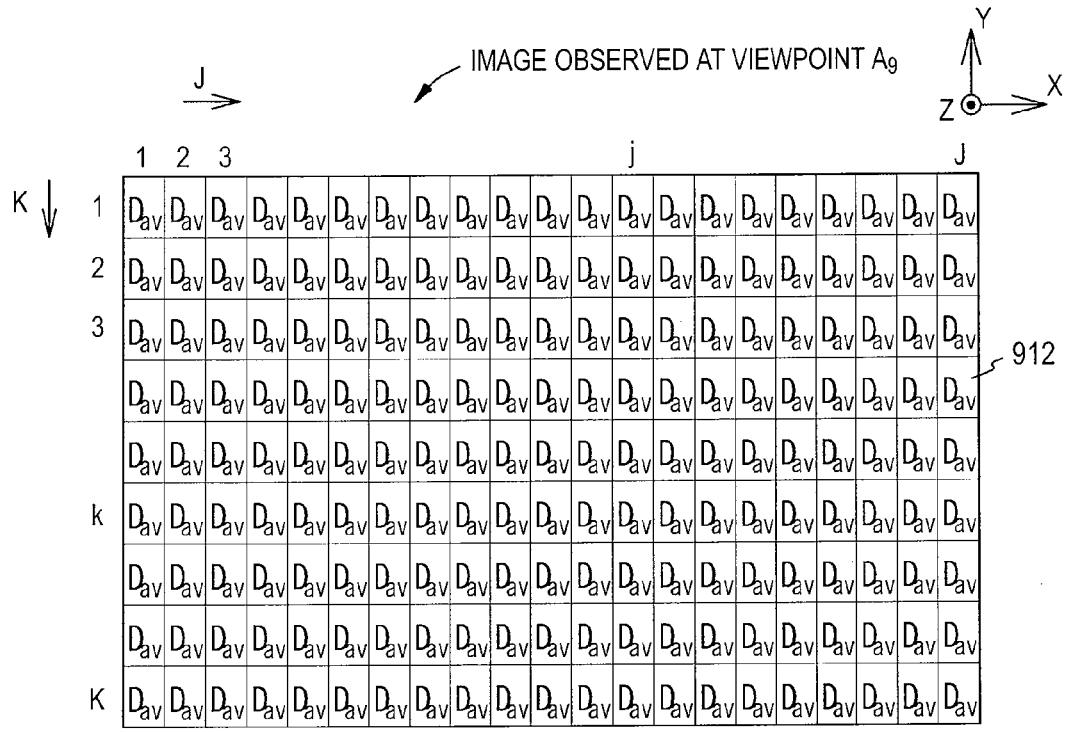
FIGS. 36A and 36B are schematic plan views illustrating an image observed in the left eye and an image observed in the right eye in a case where the left eye and the right eye of an image observer are positioned at viewpoints $A_9$ and $A_1$.
Figure 36B:
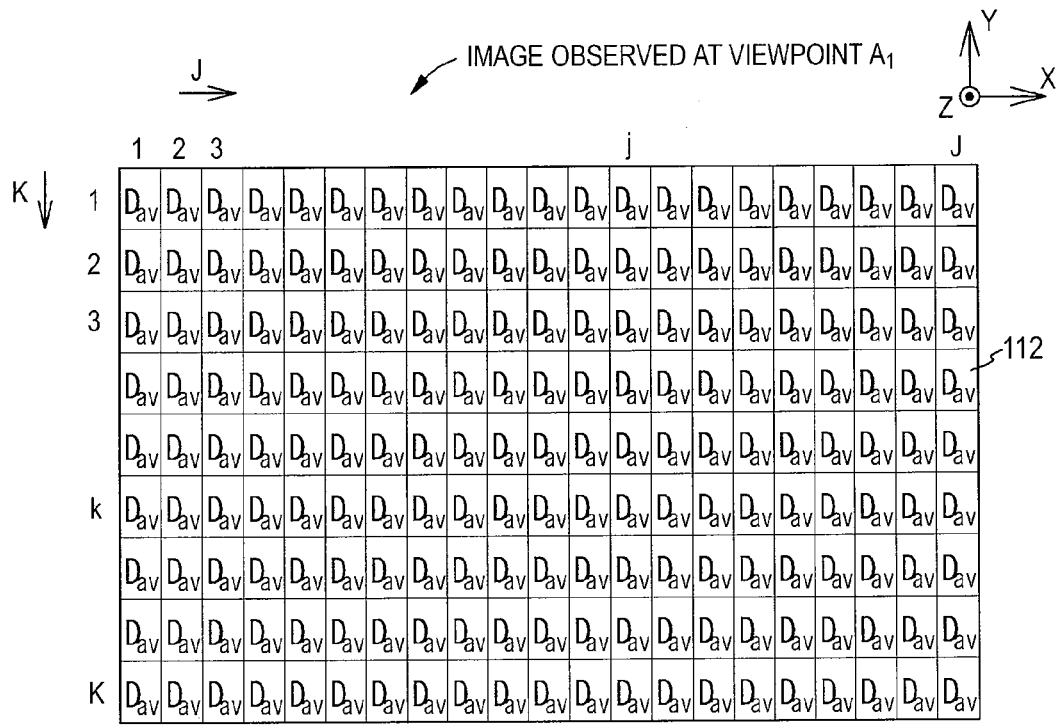

FIGS. 36A and 36B are schematic plan views illustrating an image observed in the left eye and an image observed in the right eye in a case where the left eye and the right eye of an image observer are positioned at viewpoints $A_9$ and $A_1$.

As illustrated in FIGS. 36A and 36B, when the left eye and the right eye of an image observer are positioned at viewpoint $A_9$ and viewpoint $A_1$, an image based on the data $D_{av}$ is observed. Since the two images observed at the viewpoint $A_9$ and the viewpoint $A_1$ are the same image, there is no parallax between the images.

Accordingly, when the left eye and the right eye of the image observer are positioned at the viewpoint $A_9$ and the viewpoint $A_1$, the image observer recognizes a planar image acquired by overlapping the images for two viewpoints. Therefore, unnaturalness and discomfort according to the "reverse view" are not acquired. In addition, even in a case where a plurality of image observers observe one autostereoscopic image display device from different locations, the unnaturalness and discomfort caused by a reverse view can be alleviated without any difficulty.

On the data $D_{av}$, values of sets of the image data $D_1$ and $D_9$ are reflected. Accordingly, when the left eye and the right eye of an image observer are positioned at the viewpoint $A_1$ and the viewpoint $A_2$, the relationship of a reverse view may occur in the image for the viewpoint $A_2$ that is observed by the right eye. However, since the value of the image data $D_1$ is reflected on the data $D_{av}$, the unnaturalness according to the relationship of a reverse view is not distinctively recognized. In addition, even in a case where the left eye and the right eye of the image observer are positioned at the viewpoint $A_8$ and the viewpoint $A_9$, the relationship of a reverse view may occur in the image for the viewpoint $A_8$ that is observed by the left eye. However, since the value of the image data $D_9$ is reflected on the data $D_{av}$, the unnaturalness according to the relationship of a reverse view is not distinctively recognized.

In the description presented above, after the image data $D_{WG}$ is generated based on the image data $D_1$ and $D_9$, the data $D_{av}$ is generated by using the image data $D_{WG}$ and the image data $D_9$. However, for example, a configuration may be employed in which the data $D_{WG}$ is generated by using sets of the image data $D_2$ and $D_8$. The combination of the image data may be appropriately selected depending on the design of the autostereoscopic image display device.

[Sixth Embodiment]

A sixth embodiment relates to an autostereoscopic image display device according to the present disclosure and a method of driving thereof. The sixth embodiment is a modification of the first embodiment.

In the sixth embodiment, one of a pair of images having the relationship of a reverse view near the end portion of the observation area is displayed by using first image data and added image data acquired by weighting values of the first image data and second image data based on the relationship of parallax between the second image data different from the first image data and the first image data and adding the weighted values. The added image data is generated by weighting values of the first image data and the second image data based on the amount of parallax between the first image data and the second image data and adding the weighted values. Each of the first image data and the second image data is image data of different viewpoints.

More specifically, one of a pair of images is displayed based on data acquired by combining the first image data and the added image data. An image displayed based on the data acquired by combining the first image data and the added image data is formed by alternately arranging the element of the image of the first image data and the element of the image of the added image data in a stripe pattern.

FIG. 37 is a schematic diagram illustrating an operation of generating multiple viewpoint image display data according to the sixth embodiment.

In the first embodiment, the data $D_{S1}$ is associated with the viewpoint $A_1$ and the viewpoint $A_9$. In contrast to this, in the sixth embodiment, the data $D_{S1}$ is associated only with the viewpoint $A_1$, and sets of the image data $D_2$ to $D_9$ are directly associated with the viewpoint $A_2$ to the viewpoint $A_9$. Then, multiple viewpoint image display data is generated based on the flowchart illustrated in FIG. 14.

Since the configuration of the data $D_{S1}(j,k)$ shown in FIG. 37 has been described in the first embodiment, the description thereof is omitted.

Figures 38A, 38B:
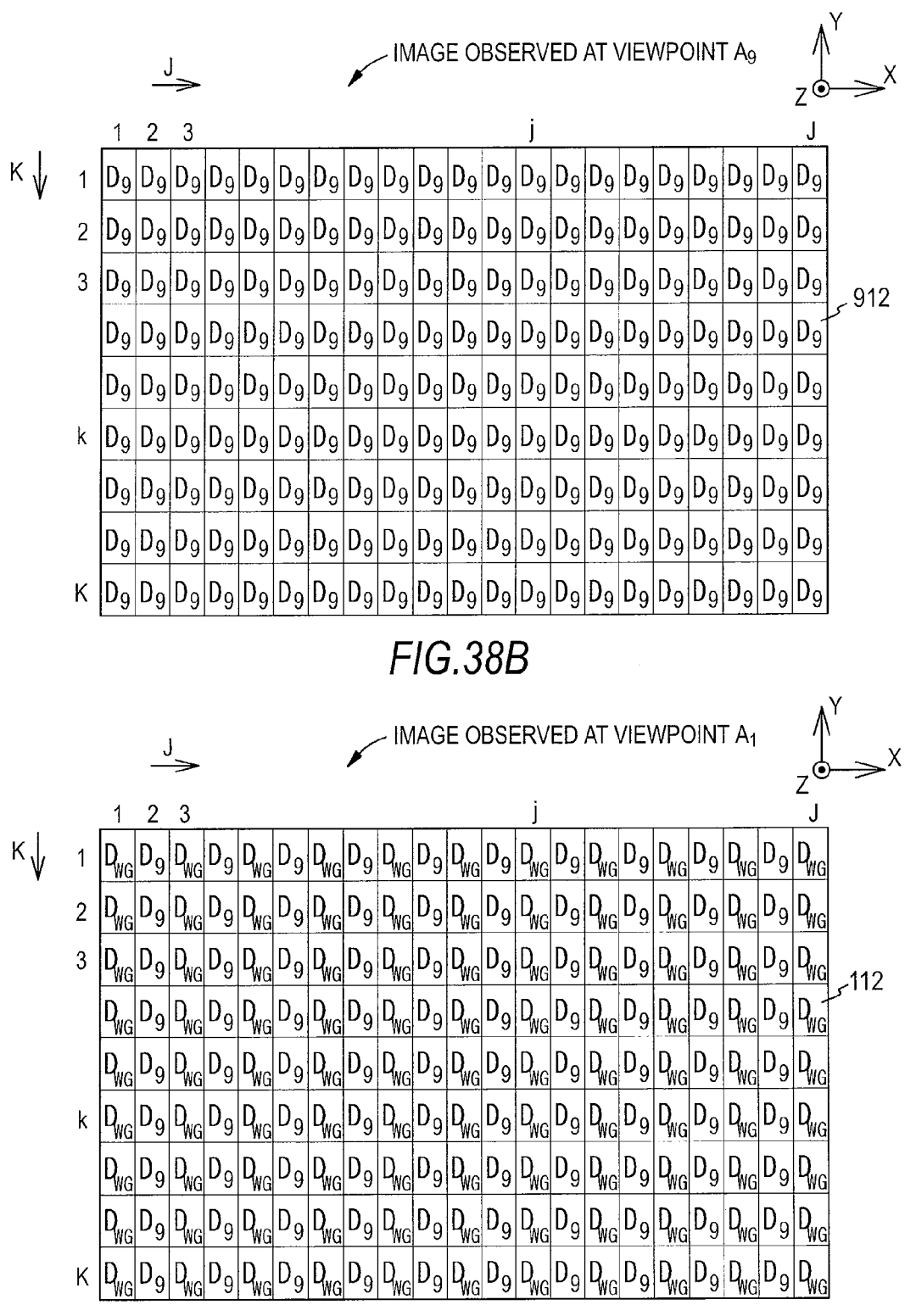

FIGS. 38A and 38B are schematic plan views illustrating an image observed in the left eye and an image observed in the right eye in a case where the left eye and the right eye of an image observer are positioned at viewpoints $A_9$ and $A_1$.

As illustrated in FIG. 38B, the image observed at the viewpoint $A_1$ is formed by alternately arranging the element of the image of the image data $D_9$ corresponding to the first image data and the element of the added image data $D_{WG}$ in a stripe pattern. Accordingly, compared to a case where the images illustrated in FIGS. 22A and 22B are observed, the degree of the reverse view is alleviated.

In addition, in the description presented above, although the data $D_{S1}$ is associated only with the viewpoint $A_1$, a configuration may be employed in which the data $D_{S1}$ is associated only with the viewpoint $A_9$. Alternatively, instead of the data $D_{S1}$, the data $D_{S2}$ described in the third embodiment may be used.

[Seventh Embodiment]

A seventh embodiment relates to an autostereoscopic image display device according to the present disclosure and a method of driving thereof. The seventh embodiment is a modification of the third embodiment.

Also in the seventh embodiment, one of a pair of images having the relationship of a reverse view near the end portion of the observation area is displayed by using first image data and added image data acquired by weighting values of the first image data and second image data based on the relationship of parallax between the second image data different from the first image data and the first image data and adding the weighted values. The added image data is generated by weighting values of the first image data and the second image data based on the amount of parallax between the first image data and the second image data and adding the weighted values. Each of the first image data and the second image data is image data of different viewpoints.

More specifically, one of the pair of images is displayed based on data acquired by combining the first image data and the added image data. An image displayed based on data acquired by combining the first image data and the added image data is formed by arranging the element of the image of the first image data and the element of the image of the added image data in a checkered pattern.

FIG. 39 is a schematic diagram illustrating an operation of generating multiple viewpoint image display data according to the seventh embodiment.

In the third embodiment, the data $D_{C1}$ is associated with the viewpoint $A_1$ and the viewpoint $A_9$. In contrast to this, in the seventh embodiment, the data $D_{C1}$ is associated only with the viewpoint $A_1$, and sets of the image data $D_2$ to $D_9$ are directly associated with the viewpoints $A_2$ to $A_9$. Then, multiple viewpoint image display data is generated based on the flowchart illustrated in FIG. 14.

In addition, since the configuration of the data $D_{C1}(j,k)$ shown in FIG. 39 has been described in the third embodiment, the description thereof is omitted.

FIGS. 40A and 40B are schematic plan views illustrating an image observed in the left eye and an image observed in the right eye in a case where the left eye and the right eye of an image observer are positioned at viewpoints $A_9$ and $A_1$.

As illustrated in FIG. 40B, the image observed at the viewpoint $A_1$ is formed by arranging the element of the image of the image data $D_9$ corresponding to the first image data and the element of the image of the added image data $D_{WG}$ in a checkered pattern. Accordingly, compared to a case where the images shown in FIGS. 22A and 22B are observed, the degree of the reverse view is alleviated.

In the description presented above, although the data $D_{C1}$ is associated only with the viewpoint $A_1$, a configuration may be employed in which the data $D_{C1}$ is associated only with the viewpoint $A_9$. Alternatively, instead of the data $D_{C1}$, the data $D_{C2}$ described in the fourth embodiment may be used.

[Eighth Embodiment]

An eighth embodiment relates to an autostereoscopic image display device according to the present disclosure and a method of driving thereof. The eighth embodiment is a modification of the fifth embodiment.

Also in the eighth embodiment, one of a pair of images having the relationship of a reverse view near the end portion of the observation area is displayed by using first image data and added image data acquired by weighting values of the first image data and second image data based on the relationship of parallax between the second image data different from the first image data and the first image data and adding the weighted values. The added image data is generated by weighting values of the first image data and the second image data based on the amount of parallax between the first image data and the second image data and adding the weighted values. Each of the first image data and the second image data is image data of different viewpoints.

More specifically, one of the pair of images is displayed based on data acquired by arithmetically averaging the first image data and the added image data.

FIG. 41 is a schematic diagram illustrating an operation of generating multiple viewpoint image display data according to the eighth embodiment.

In the fifth embodiment, the data $D_{av}$ is associated with the viewpoint $A_1$ and the viewpoint $A_9$. In contrast to this, in the eighth embodiment, the data $D_{av}$ is associated only with the viewpoint $A_1$, and sets of the image data $D_2$ to $D_9$ are directly associated with the viewpoints $A_2$ to $A_9$. Then, multiple viewpoint image display data is generated based on the flowchart illustrated in FIG. 14.

Since the configuration of the data $D_{av}(j,k)$ shown in FIG. 41 has been described in the fifth embodiment, the description thereof is omitted.

Figure 42A:
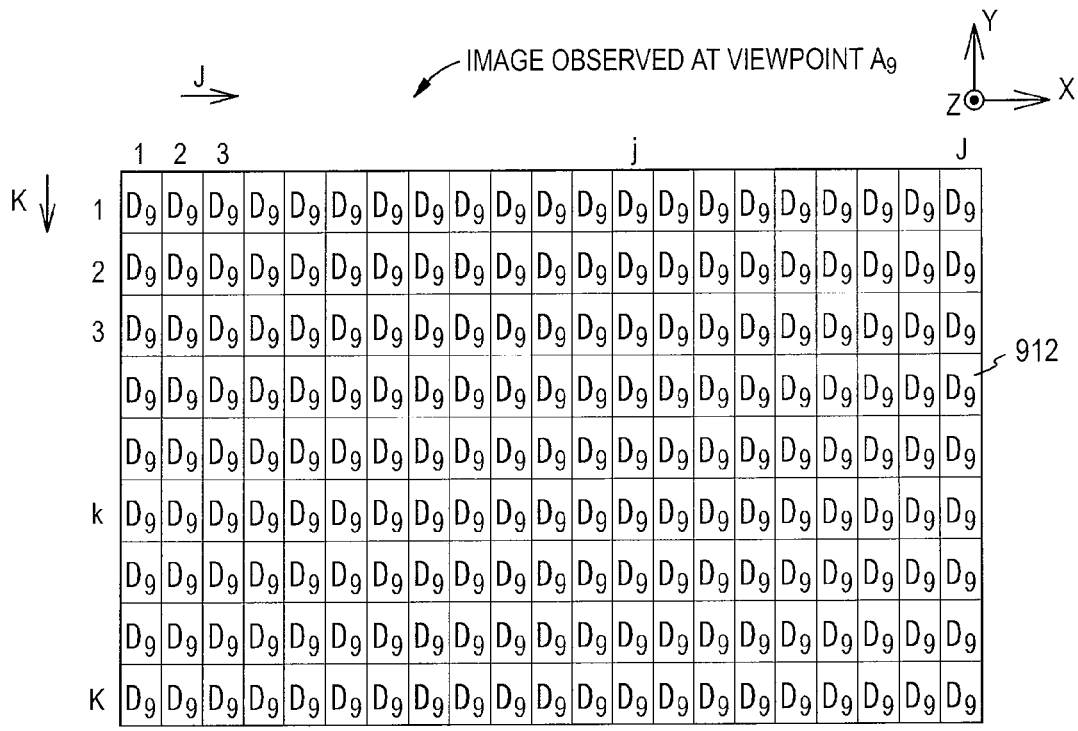
FIGS. 42A and 42B are schematic plan views illustrating an image observed in the left eye and an image observed in the right eye in a case where the left eye and the right eye of an image observer are positioned at viewpoints $A_9$ and $A_1$.
Figure 42B:
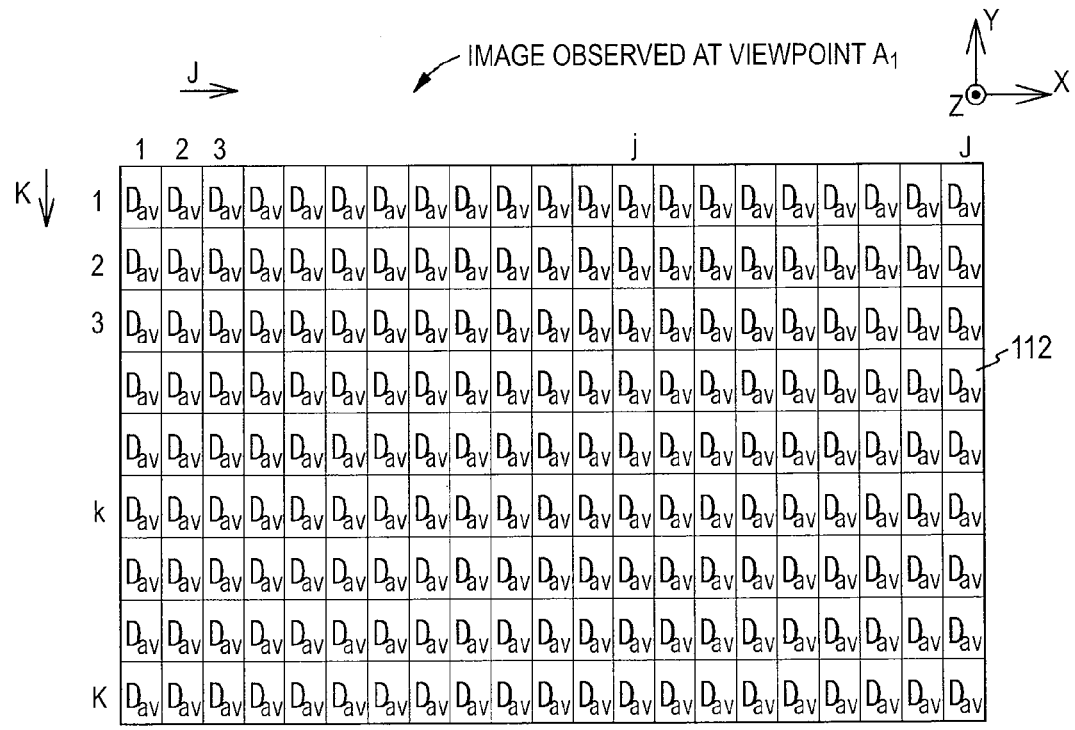

FIGS. 42A and 42B are schematic plan views illustrating an image observed in the left eye and an image observed in the right eye in a case where the left eye and the right eye of an image observer are positioned at viewpoints $A_9$ and $A_1$.

In the image illustrated in FIG. 42B, the elements of two images for the viewpoint $A_1$ and the viewpoint $A_9$ are weighted-averaged. Accordingly, compared to a case where the images shown in FIGS. 22A and 22B are observed, the degree of the reverse view is alleviated.

In the description presented above, although the data $D_{av}$ is associated only with the viewpoint $A_1$, a configuration may be employed in which the data $D_{av}$ is associated only with the viewpoint $A_9$.

As above, the embodiments of the present disclosure have been described in detail. However, the present disclosure is not limited thereto, but may be variously changed based on the technical concept of the present disclosure.

For example, in a configuration in which the value of DP is set to 32.5 mm, as illustrated in FIG. 43, in a case where the left eye is positioned at the viewpoint $A_8$, and the right eye is positioned at the viewpoint $A_1$ (Reverse View Relationship 1 illustrated in the figure) and a case where the left eye is positioned at the viewpoint $A_9$, and the right eye is positioned at the viewpoint $A_2$ (Reverse View Relationship 2 illustrated in the figure), the relationship of a reverse view occurs. In such a case, the operation described for the combination of the viewpoints $A_9$ and $A_1$ in the embodiments may be rephrased by appropriately replacing the above-described combination with a combination of the viewpoints $A_8$ and $A_1$ and a combination of the viewpoints $A_9$ and $A_2$.

Figure 44:
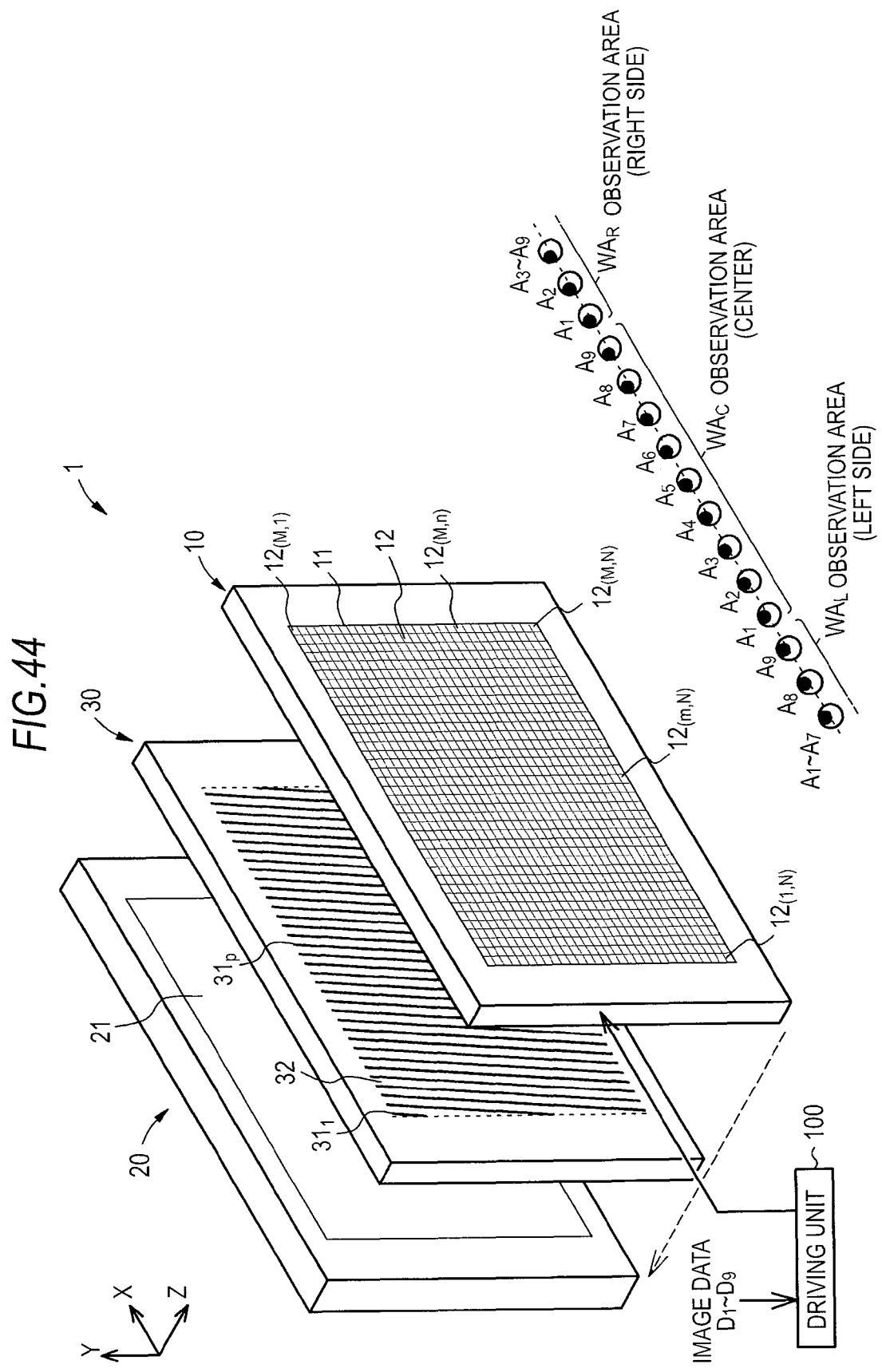
FIG. 44 is a schematic perspective view when an autostereoscopic image display device according to a modified example is virtually divided.
Figure 45:
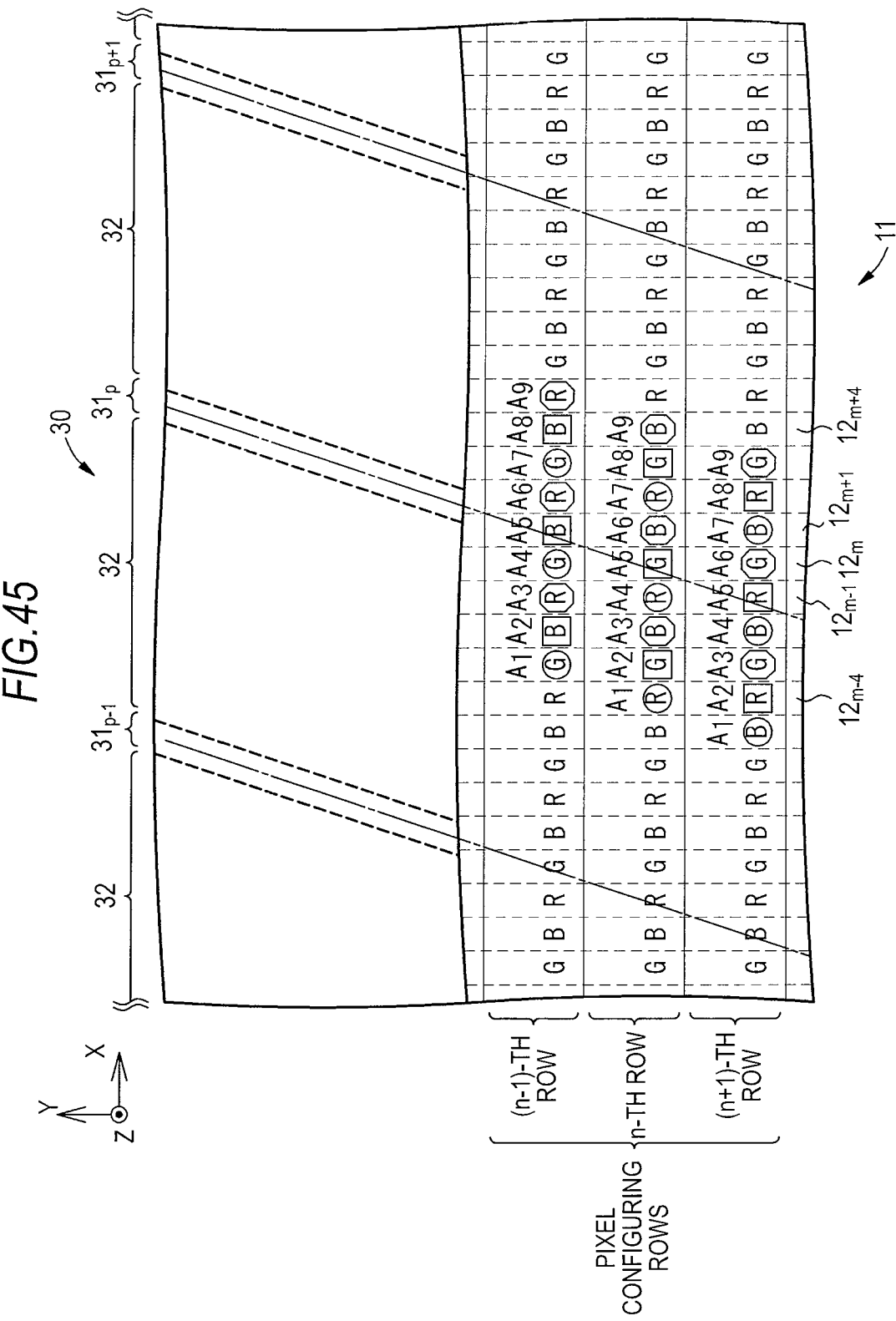
FIG. 45 is a schematic perspective view illustrating the arrangement relation between opening portions and sub pixels.

In addition, the autostereoscopic image display device, for example, as illustrated in FIG. 44, may have a configuration in which the opening portion of the optical splitting unit has a continuous slit shape. The arrangement relationship between the opening portions and the sub pixels are illustrated in FIG. 45.

Figure 46:
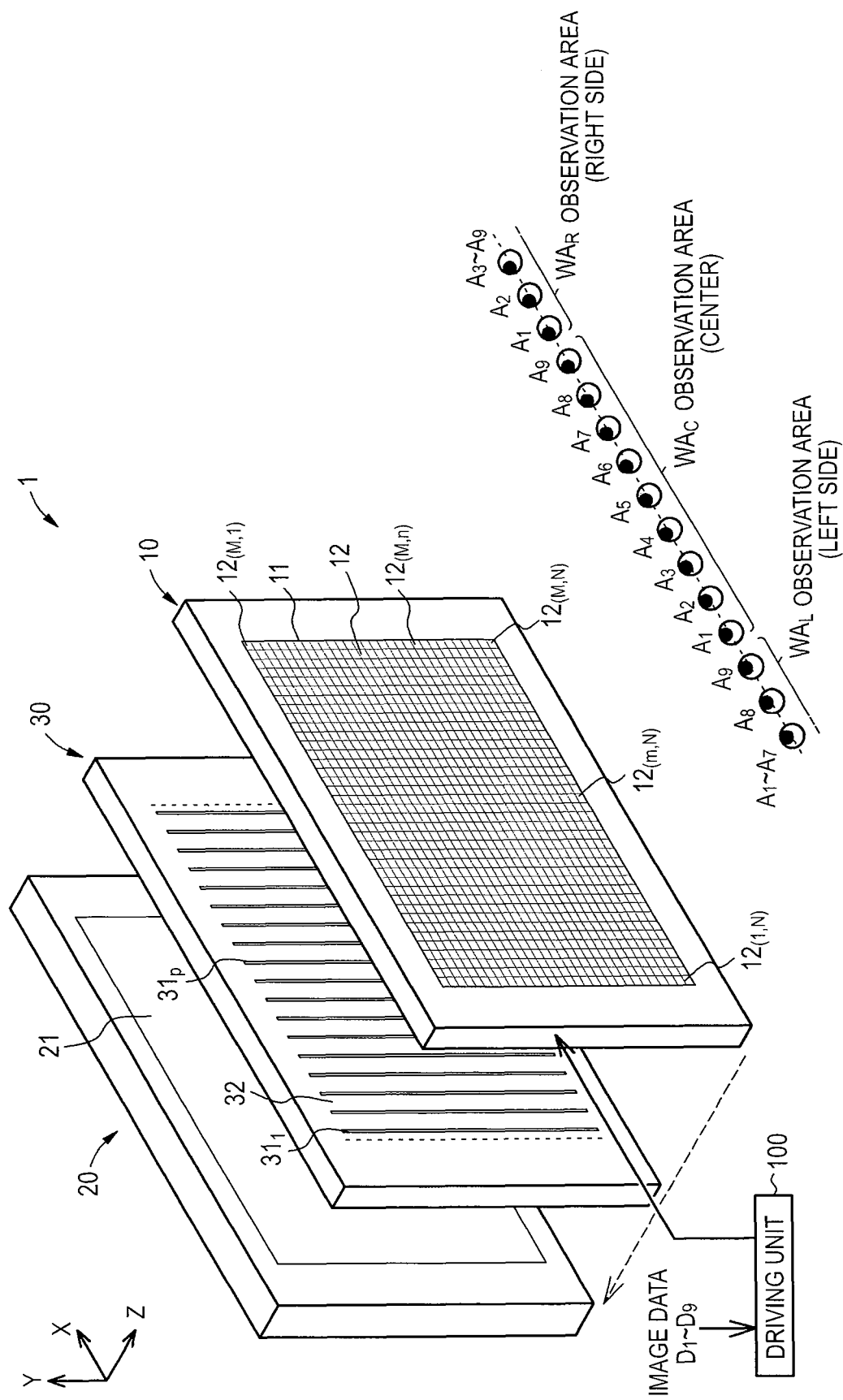
FIG. 46 is a schematic perspective view when an autostereoscopic image display device according to a modified example is virtually divided.
Figure 48A:
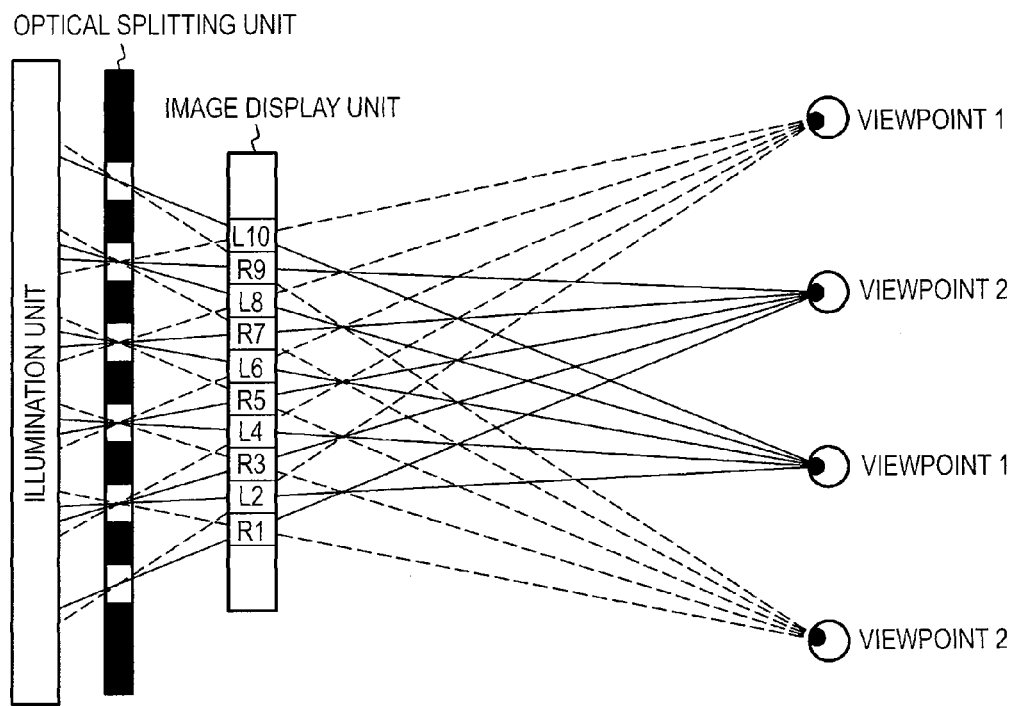
FIGS. 48A and 48B are conceptual diagrams of an autostereoscopic image display device in which an optical splitting unit is arranged between an image display unit and an illumination unit.
Figure 48B:
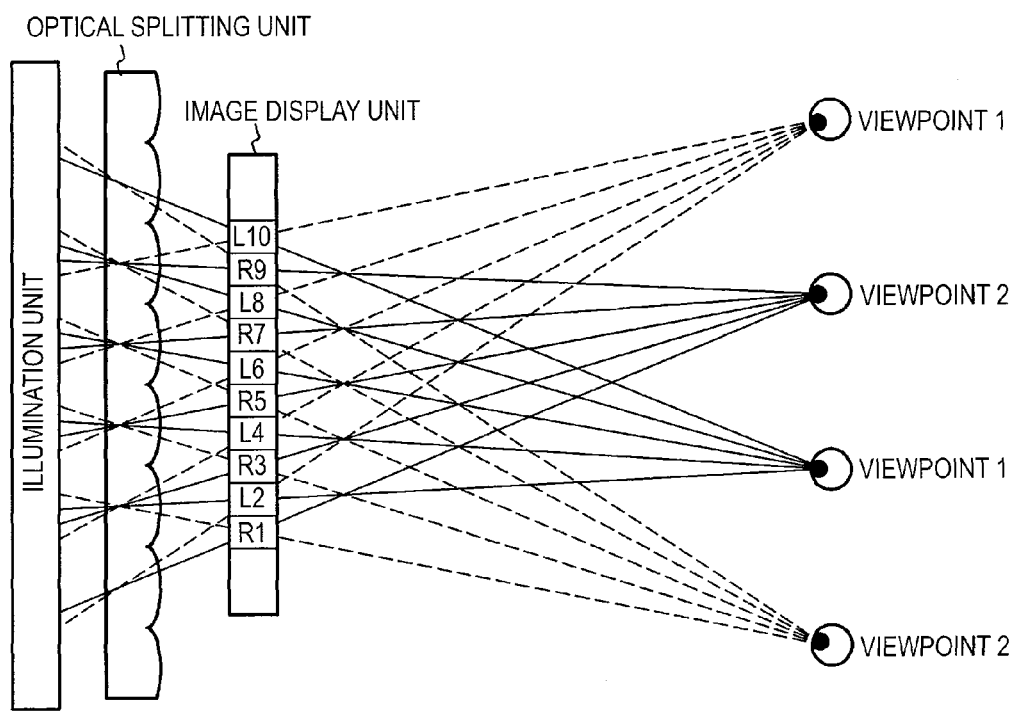
Figure 49A:
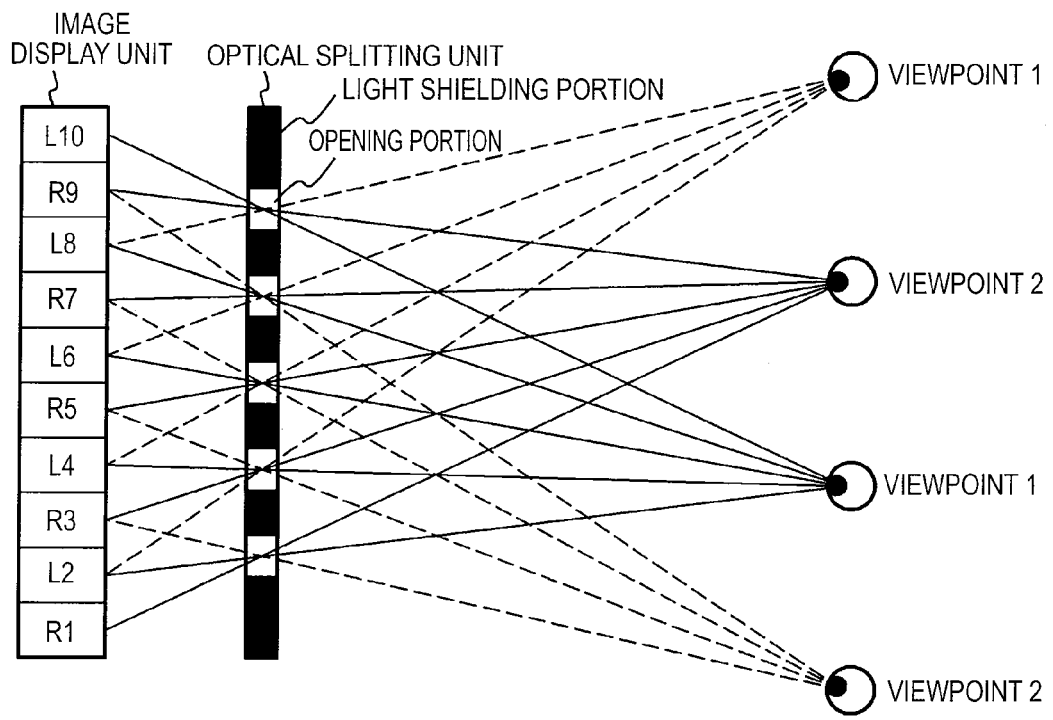
FIGS. 49A and 49B are conceptual diagrams of an autostereoscopic image display device in which an optical splitting unit is arranged between an image display unit and an image observer.
Figure 49B:
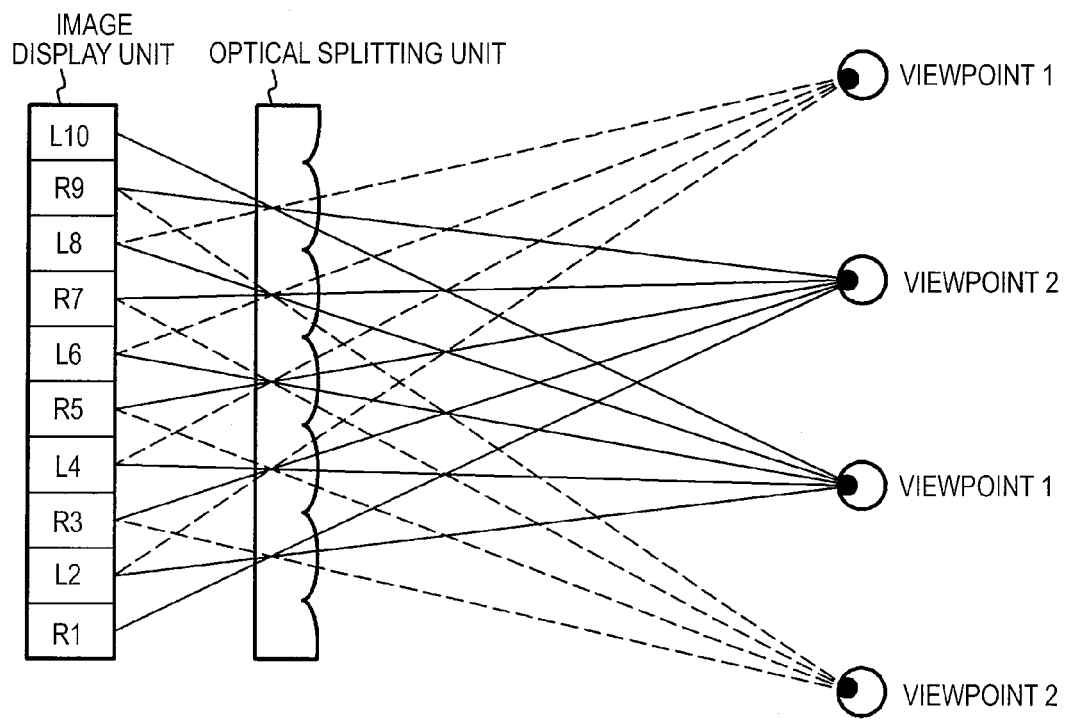

Alternatively, as illustrated in FIG. 46, the opening portion of the optical splitting unit may be configured so as to grow in the vertical direction. In such a configuration, the pixel of an image for each viewpoint is configured by three sub pixels aligned in the row direction. The arrangement relationship between the opening portions and the sub pixels in such a case is illustrated in FIG. 47.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed:

1. An autostereoscopic image display device in which an image of each viewpoint can be observed in each one of a plurality of observation areas,
    wherein one or both of a pair of images having relationship of a reverse view near an end portion of the observation area are displayed by using a combined data acquired by combining first image data and added image data after the added image data is acquired based on the first image data and second image data, and wherein the added image data is acquired by weighting values of the first image data and the second image data based on relationship of parallax between the second image data different from the first image data and the first image data and adding the weighted values, and wherein the added image data is the first image data when the parallax is zero and the added image data is the second image data when the parallax is equal to or larger than a predetermined threshold value.

2. The autostereoscopic image display device according to claim 1, wherein the added image data is generated by weighting the values of the first image data and the second image data based on an amount of parallax between the first image data and the second image data and adding the weighted values.

3. The autostereoscopic image display device according to claim 1, wherein each of the first image data and the second image data is image data for different viewpoints.

4. The autostereoscopic image display device according to claim 1, wherein one or both of a pair of images is displayed based on data acquired by combining the first image data and the added image data.

5. The autostereoscopic image display device according to claim 4, wherein the image that is displayed based on the data acquired by combining the first image data and the added image data is formed by alternately arranging an element of an image of the first image data and an element of an image of the added image data in a stripe pattern.

6. The autostereoscopic image display device according to claim 4, wherein the image that is displayed based on the data acquired by combining the first image data and the added image data is formed by arranging an element of an image of the first image data and an element of an image of the added image data in a checkered pattern.

7. The autostereoscopic image display device according to claim 1, wherein one or both of a pair of images is displayed based on data acquired by averaging the first image data and the added image data.

8. A display device in which a plurality images can be observed in accordance with an observation position, wherein at least one image is displayed by using a combined data acquired by combining first image data and added image data after the added image data is acquired based on the first image data and second image data, and wherein the added image data is acquired by weighting a value of the first image data and a value of the second image data based on relationship of parallax between the second image data different from the first image data and the first image data and adding the weighted values, and wherein the added image data is the first image data when the parallax is zero and the added image data is the second image data when the parallax is equal to or larger than a predetermined threshold value.

* * * * *